(12) United States Patent
Merg et al.

(10) Patent No.: US 11,144,888 B2
(45) Date of Patent: Oct. 12, 2021

(54) METHOD AND SYSTEM FOR AUGMENTING REAL-FIX TIPS WITH ADDITIONAL CONTENT

(71) Applicant: Snap-on Incorporated, Kenosha, WI (US)

(72) Inventors: Patrick S. Merg, Hollister, CA (US); Jacob G. Foreman, San Jose, CA (US); Joshua C. Covington, San Juan Bautista, CA (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

(21) Appl. No.: 14/874,287

(22) Filed: Oct. 2, 2015

(65) Prior Publication Data

US 2017/0098199 A1 Apr. 6, 2017

(51) Int. Cl.
*G06Q 10/00* (2012.01)
*G06F 3/0481* (2013.01)
(Continued)

(52) U.S. Cl.
CPC ........... *G06Q 10/20* (2013.01); *G06F 3/0482* (2013.01); *G06F 3/04812* (2013.01);
(Continued)

(58) Field of Classification Search
CPC .. G06F 11/079; G06F 3/04812; G06F 3/0482; G06F 3/04842; G06F 3/04847;
(Continued)

(56) References Cited

U.S. PATENT DOCUMENTS 5,058,044 A 10/1991 Stewart et al.
5,778,381 A 7/1998 Sandifer
(Continued)

FOREIGN PATENT DOCUMENTS

WO WO-02101555 A2 * 12/2002 ............. G06N 5/022
WO 2004/092918 A2 10/2004
(Continued)

OTHER PUBLICATIONS

Larry Carley, "Decoding On-Board Diagnostics" www.AA1car.com, copyright 2003, retrieved from WayBack Machine, http://web.archive.org/web/20030804195537/http://www.aa1car.com/library/cm40122.htm, archive date of Aug. 4, 2003.*
(Continued)

*Primary Examiner* — Gerardo Araque, Jr.
(74) *Attorney, Agent, or Firm* — McDonnell Boehnen Hulbert & Berghoff LLP

(57) ABSTRACT

A method and system for generating and outputting a real-fix tip (RFT) augmented with a pointer to additional content. The additional content may be relevant to any of a complaint, vehicle, cause of complaint, how the cause for complaint was discovered, and service-operation performed on the vehicle to resolve the complaint. The RFT may include a complaint, cause, and correction, and may be stored within a database containing repair orders that include complaints, causes, and corrections regarding various vehicles. A processor may generate the RFT after determining a threshold number of RO with a common complaint, vehicle, cause, and correction. A processor may search the database for the RFT based on a complaint and vehicle, display a list of RFT located during the search, display an RFT selected from the list, obtain additional content pointed to by a pointer in the RFT, and output the additional content to a display.

24 Claims, 29 Drawing Sheets

(51) Int. Cl.
*G06F 3/0482* (2013.01)
*G06F 3/0484* (2013.01)
*G07C 5/02* (2006.01)
*G07C 5/08* (2006.01)
*G06Q 10/10* (2012.01)

(52) U.S. Cl.
CPC ...... *G06F 3/04842* (2013.01); *G06F 3/04847* (2013.01); *G06Q 10/10* (2013.01); *G07C 5/02* (2013.01); *G07C 5/08* (2013.01)

(58) Field of Classification Search
CPC .... G06Q 30/016; G06Q 10/20; G06Q 30/012; G06Q 30/014; G06Q 10/10; G07C 5/02; G07C 5/08
USPC .................................................. 705/302–305
See application file for complete search history.

(56) References Cited

U.S. PATENT DOCUMENTS

| | | | |
|---|---|---|---|
| 5,913,215 A | 6/1999 | Rubinstein et al. | |
| 5,950,169 A | 9/1999 | Borghesi et al. | |
| 6,263,322 B1 | 7/2001 | Kirkevold et al. | |
| 6,308,120 B1 | 10/2001 | Good | |
| 6,311,162 B1 | 10/2001 | Reichwein et al. | |
| 6,381,587 B1 | 4/2002 | Guzelsu | |
| 6,487,479 B1 | 11/2002 | Nelson | |
| 6,609,050 B2 | 8/2003 | Li | |
| 6,768,935 B1 | 7/2004 | Morgan et al. | |
| 6,785,582 B2 | 8/2004 | Araujo | |
| 6,804,589 B2 | 10/2004 | Foxford et al. | |
| 6,845,307 B2 | 1/2005 | Rather | |
| 6,941,514 B2 | 9/2005 | Bradford | |
| 7,092,937 B2 | 8/2006 | Morgan et al. | |
| 7,171,372 B2 | 1/2007 | Daniel et al. | |
| 7,209,817 B2 | 4/2007 | Abdel-Malek et al. | |
| 7,373,225 B1 | 5/2008 | Grier et al. | |
| 7,373,226 B1 | 5/2008 | Cancilla et al. | |
| 7,444,216 B2 | 10/2008 | Rogers et al. | |
| 7,551,993 B1 | 6/2009 | Cancilla et al. | |
| 7,613,627 B2 | 11/2009 | Doyle et al. | |
| 8,140,411 B2 | 3/2012 | Staats | |
| 8,290,833 B2 | 10/2012 | Yang et al. | |
| 8,600,610 B2 | 12/2013 | Bertosa et al. | |
| 8,977,423 B2 | 3/2015 | Merg et al. | |
| 2001/0032114 A1* | 10/2001 | Sinex ................... | G06Q 10/025 701/32.7 |
| 2002/0007237 A1 | 1/2002 | Phung et al. | |
| 2002/0007289 A1 | 1/2002 | Malin et al. | |
| 2002/0128874 A1 | 9/2002 | McIntosh et al. | |
| 2002/0138185 A1 | 9/2002 | Trsar et al. | |
| 2003/0004624 A1 | 1/2003 | Wilson et al. | |
| 2003/0050830 A1 | 3/2003 | Troyer | |
| 2003/0130966 A1 | 7/2003 | Thompson et al. | |
| 2003/0195681 A1 | 10/2003 | Rather | |
| 2004/0176885 A1 | 9/2004 | Quinn | |
| 2004/0199542 A1 | 10/2004 | Morgan et al. | |
| 2005/0027694 A1 | 2/2005 | Sauermann | |
| 2005/0049912 A1 | 3/2005 | Troyer et al. | |
| 2005/0065678 A1 | 3/2005 | Smith et al. | |
| 2005/0085964 A1 | 4/2005 | Knapp et al. | |
| 2005/0154749 A1 | 7/2005 | Snow et al. | |
| 2005/0187834 A1 | 8/2005 | Painter et al. | |
| 2006/0095230 A1 | 5/2006 | Grier et al. | |
| 2006/0106797 A1 | 5/2006 | Srinivasa et al. | |
| 2006/0142907 A1 | 6/2006 | Cancilla et al. | |
| 2006/0161313 A1 | 7/2006 | Rogers et al. | |
| 2007/0043487 A1 | 2/2007 | Krzystofczyk et al. | |
| 2007/0293997 A1 | 12/2007 | Couch | |
| 2008/0004764 A1 | 1/2008 | Chinnadurai et al. | |
| 2008/0183351 A1 | 7/2008 | Grier et al. | |
| 2008/0208609 A1 | 8/2008 | Preece et al. | |
| 2009/0006476 A1 | 1/2009 | Andreasen et al. | |
| 2009/0062977 A1 | 3/2009 | Brighenti | |
| 2009/0169092 A1 | 7/2009 | McCleary et al. | |
| 2009/0216493 A1 | 8/2009 | Underdal et al. | |
| 2009/0295559 A1 | 12/2009 | Howell et al. | |
| 2009/0307027 A1 | 12/2009 | Charbeneau et al. | |
| 2010/0005010 A1 | 1/2010 | Chenn | |
| 2010/0057290 A1 | 3/2010 | Brillhart et al. | |
| 2010/0063668 A1 | 3/2010 | Zhang et al. | |
| 2010/0138242 A1 | 6/2010 | Ferrick et al. | |
| 2010/0138701 A1 | 6/2010 | Costantino | |
| 2010/0174446 A1 | 7/2010 | Andreasen et al. | |
| 2011/0010656 A1 | 1/2011 | Mokotov | |
| 2011/0118905 A1 | 5/2011 | Mylaraswamy et al. | |
| 2011/0172874 A1 | 7/2011 | Patnaik et al. | |
| 2011/0238258 A1 | 9/2011 | Singh et al. | |
| 2011/0289055 A1 | 11/2011 | Pothering et al. | |
| 2012/0136802 A1* | 5/2012 | McQuade ........... | G06Q 30/0282 705/347 |
| 2012/0245791 A1 | 9/2012 | Yun et al. | |
| 2012/0265707 A1* | 10/2012 | Bushnell ............... | G06Q 50/08 705/342 |
| 2012/0303205 A1 | 11/2012 | Subramania et al. | |
| 2013/0124032 A1 | 5/2013 | Singh et al. | |
| 2013/0304306 A1 | 11/2013 | Selkirk et al. | |
| 2013/0325541 A1 | 12/2013 | Capriotti et al. | |
| 2014/0032422 A1 | 1/2014 | Jones | |
| 2014/0074343 A1 | 3/2014 | Fish et al. | |
| 2014/0207515 A1* | 7/2014 | Merg ..................... | G06Q 10/20 705/7.27 |
| 2014/0207771 A1* | 7/2014 | Merg ..................... | G06Q 10/20 707/731 |
| 2016/0104123 A1* | 4/2016 | Viswanath ............ | G06Q 10/20 705/305 |

FOREIGN PATENT DOCUMENTS

| | | |
|---|---|---|
| WO | 2013/063232 A1 | 5/2013 |
| WO | 2014/001799 A1 | 1/2014 |

OTHER PUBLICATIONS

Albin Moore, "The 10 Modes of OBDII", Mar. 18, 2013, SearchAutoParts.com, https://www.searchautoparts.com/motorage/technicians/drivability/10-modes-obdii?page=0,1 (Year: 2013).*

Wikipedia, "OBD-II PIDs", Oct. 19, 2011, Wikepedia.com, https://web.archive.org/web/20111019114024/https://en.wikipedia.org/wiki/OBD-II_PIDs (Year: 2011).*

S. Stephenson, "Guided diagnostics: Taking OBD to the next level," Motor Age, vol. 122, (6), p. 161, Jun. 2003. Available: https://dialog.proquest.com/professional/docview/223218423?accountid=131444. (Year: 2003).*

Ben-Bassat, Moshe, et al., Workflow Management Combined with Diagnostic and Repair Expert System Tools for Maintenance Operations, AUTOTESTCON '93, San Antonio, TX, Sep. 20-23, 1993, IEEE, pp. 367-375 (9 pages).

Consortium on Cognitive Science Instruction, Introduction to Natural Language Processing, downloaded from the World Wide Web at http://www.mind.ilstu.edu/curriculum/protothinker/natural_language_processing.php on Oct. 21, 2013 (32 pages).

Dickinson, Markus, Linguistics 362: Introduction to Natural Language Processing, PowerPoint slides, Jul. 1, 2012 (48 pages).

Jain, Anil K., et al., Artificial Neural Networks: A Tutorial, Mar. 1996, IEEE, pp. 31-44 (14 pages).

Jain, Anil K., et al., Data Clustering: A Review, Sep. 1999, ACM Computing Surveys, vol. 31, No. 3, pp. 264-323 (60 pages).

Müller, Tobias Carsten, et al., A Heuristic Approach for Offboard-Diagnostics in Advanced Automotive Systems, SAE World Congress 2009, Apr. 20, 2009, Detroit, MI, SAE Doc. No. 2009-01-1027 (9 pages).

Snap-On Incorporated, Ask-a-Tech FAQ, downloaded from the World Wide Web at http://web.archive.org/web/20110920223204/http://www.askatech.com/AskATechLive/faq.aspx as archived on Sep. 20, 2011 (10 pages).

Snap-On Incorporated, ShopKey Pro, Now Even Smarter, to Make Your Shop Look Even Smarter, Apr. 13, 2012 (4 pages).

(56) References Cited

OTHER PUBLICATIONS

The Stanford NLP Group, The Stanford Natural Language Processing Group, downloaded from the World Wide Web at http://nlp.stanford.edu/software/index.shtml on Oct. 17, 2014 (3 pages).
The Stanford NLP Group, The Stanford Natural Language Processing Group, Stanford CoreNLP, downloaded from the World Wide Web at http://nlp.stanford.edu/software/corenlp.shtml on Oct. 17, 2014 (8 pages).
World Intellectual Property Organization, International Search Report, International Application No. PCT/US2016/054502, dated Nov. 25, 2016 (4 pages).
World Intellectual Property Organization, Written Opinion of the International Searching Authority, International Application No. PCT/US2016/054502, dated Nov. 25, 2016 (6 pages).

* cited by examiner

| Service/Correction | Time | Rate | Cost | | Part Description | Part # | Price |
|---|---|---|---|---|---|---|---|
| Check battery condition. (C45) _190_ | 0.3 | $100 | $30 | | Starter switch | 6012980 | $89.99 |
| Check starter/ignition system. (C117) | 0.5 | $100 | $50 | | Oil Filter | 6043011 | $19.99 |
| Switch hard to turn. Replace starter switch. (R458) | 1.0 | $100 | $100 | | ECT sensor | 6563772 | $73.99 |
| Verify repair. (V18) | 0.2 | $100 | $20 | | | Sub-total | $183.97 |
| Change engine oil and filter (C085) _191_ | 0.5 | $50 | $25 | | | Labor | $335.00 |
| Lubricate chassis. (C086) | 0.2 | $50 | $10 | | | Tax | $51.90 |
| Check DTC. Diagnose DTC 117 (C100) _192_ | 0.4 | $100 | $40 | | | Total | $570.87 |
| Coolant sensor short. R/R coolant sensor (R199) | 0.4 | $100 | $40 | | | | |
| Verify repair (V18) | 0.2 | $100 | $20 | | | | |

RTR Car Repair, Tuscaloosa, Alabama    February 18, 2013 — 181, 182

Customer: C. N. Saban — 183

Vehicle: 2012 Cadillac Escalade, 6.2 L, Automatic Trans. VIN: 1GYS3BEFXCR123456 — 184

Complaint: Car won't start. Check engine light on.

Change oil and filter — 185

| A | B | C | D | E | F | G |
|---|---|---|---|---|---|---|
| RO ID | LINE NO. | YEAR | MAKE | MODEL | ENGINE | SYSTEM |
| 100200 | 1 | 2012 | CADILLAC | ESCALADE | 6.2 L | AUTO |
| 100200 | 3 | 2012 | CADILLAC | ESCALADE | 6.2 L | AUTO |

211 → SYSTEM column
213 → row 1 (AUTO)
215 → row 2 (AUTO)

| H | I | J | K | L | M | N |
|---|---|---|---|---|---|---|
| CONTEXT | RFT | DTC | COMP. | SRV DATE | LOCATION | LOC |
| MECH. | NULL | NULL | IGNITION SWITCH | 2-18-13 | TUSCALOOSA AL | R458 |
| ELEC. | NULL | P0117 | COOLANT TEMPERATURE SENSOR | 2-18-13 | TUSCALOOSA AL | R199 |

211 → LOC column
213 → row 1 (R458)
215 → row 2 (R199)

FIG. 22

| | A | B | C | D | E |
|---|---|---|---|---|---|
| 0 | RO TERM 1 | RO TERM 2 | RO TERM N | PHRASE | RFT APPLICABILITY |
| 1 | DTC P0101 | MAF SENSOR | NA | % DTC %, REPLACED THE %COMPONENT NAME%. | TITLE |
| 2 | DTC P0101 | MAF SENSOR | NA | P0101, REPLACED THE MAF SENSOR. | TITLE |
| 3 | DTC P0300 | INJECTOR | CUSTOMER REPORTS CHECK ENGINE LIGHT IS ON | CUSTOMER REPORTS CHECK ENGINE LIGHT IS ON AND THE CAR RUNS ROUGH. | COMPLAINT |
| 4 | DTC P0101 | MAF SENSOR | CHECK ENGINE LIGHT ON | CUSTOMER REPORTS CHECK ENGINE LIGHT IS ON. | COMPLAINT |
| 5 | DTC P0101 | MAF SENSOR | NA | % DTC %, %COMPONENT NAME% DEFECTIVE. | CAUSE |
| 6 | DTC P0101 | MAF SENSOR | NA | REPLACED MAF SENSOR. CLEARED CODES AND ROAD TESTED TO CONFIRM CHECK ENGINE LIGHT DID NOT TURN ON. | CORRECTION |
| 7 | DTC P0301 | INJECTOR | NA | P0301, CYLINDER 1 MISFIRE DETECTED. INJECTOR FOR CYLINDER 1 DEFECTIVE. | CAUSE |
| 8 | DTC P0301 DTC P0304 | COIL PACK | NA | P0301, CYLINDER 1 MISFIRE DETECTED, AND P0304, CYLINDER 4 MISFIRE DETECTED. COIL PACK FOR CYLINDERS 1 AND 4 DEFECTIVE. | CAUSE |

251 — DETERMINING, BY AT LEAST ONE PROCESSOR FOR GENERATING A RFT PERTAINING TO A COMPLAINT AND A VEHICLE, FIRST TEXT DESCRIBING AT LEAST ONE OF A CAUSE OF THE COMPLAINT AND HOW THE CAUSE FOR THE COMPLAINT WAS DISCOVERED, AND SECOND TEXT DESCRIBING A SERVICE-OPERATION PERFORMED ON THE VEHICLE TO RESOLVE THE COMPLAINT

252 — DETERMINING, BY THE AT LEAST ONE PROCESSOR, AT LEAST ONE OF (i) FIRST ADDITIONAL CONTENT RELEVANT TO THE COMPLAINT, THE VEHICLE, AND A PORTION OF THE FIRST TEXT, AND (ii) SECOND ADDITIONAL CONTENT RELEVANT TO THE COMPLAINT, THE VEHICLE, THE CAUSE, AND A PORTION OF THE SECOND TEXT

253 — GENERATING, BY THE AT LEAST ONE PROCESSOR, A FIRST RFT, WHEREIN THE FIRST RFT INCLUDES A FIRST FILE COMPRISING THE FIRST TEXT, THE SECOND TEXT, AND A RESPECTIVE POINTER TO THE AT LEAST ONE OF THE FIRST ADDITIONAL CONTENT AND THE SECOND ADDITIONAL CONTENT

254 — STORING, BY THE AT LEAST ONE PROCESSOR, THE FIRST RFT WITHIN A CRM

255 — RECEIVING, BY THE AT LEAST ONE PROCESSOR, A REQUEST FOR A RFT PERTAINING TO THE COMPLAINT AND THE VEHICLE

256 — OUTPUTTING, BY THE AT LEAST ONE PROCESSOR IN RESPONSE TO THE REQUEST, THE FIRST FILE STORED WITHIN THE CRM

FIG. 25 — 250

METHOD AND SYSTEM FOR AUGMENTING REAL-FIX TIPS WITH ADDITIONAL CONTENT

BACKGROUND

Many products produced by manufacturers occasionally have to be repaired. As the complexity of products increases, the complexity of the data relied on by repair technicians to repair the products may also increase.

The repair technicians may be located in various locations, such that a first repair technician located at first location is not aware of a repair made by a second repair technician at second location. It may be beneficial, if the second repair technician could obtain information regarding the repair made by the first technician. It may be even more beneficial, if the second repair technician could receive the information, regarding the repair made by the first repair technician, knowing that a third party has confirmed that information regarding the repair is for a repair that successfully fixed a complaint or malfunction of the product worked on by the first repair technician. Searching for repair information desired by a repair technician may be very time consuming.

OVERVIEW

Example embodiments are described herein. Viewed from a first aspect, an example embodiment may take the form of a method comprising: (i) determining, by at least one processor for generating a real-fix tip pertaining to a complaint and a vehicle, first text describing at least one of a cause of the complaint and how the cause for the complaint was discovered, and second text describing a service-operation performed on the vehicle to resolve the complaint, (ii) determining, by the at least one processor, at least one of (a) first additional content relevant to the complaint, the vehicle, and a portion of the first text, and (b) second additional content relevant to the complaint, the vehicle, the cause, and a portion of the second text, (iii) generating, by the at least one processor, a first real-fix tip, wherein the first real-fix tip includes a first file comprising the first text, the second text, and a respective pointer to the at least one of the first additional content and the second additional content, (iv) storing, by the at least one processor, the first real-fix tip within a computer-readable medium, (v) receiving, by the at least one processor, a request for a real-fix tip pertaining to the complaint and the vehicle, and (vi) outputting, by the at least one processor in response to the request, the first file stored within the computer-readable medium.

Viewed from a second aspect, an example embodiment may take the form of a system comprising: a computer-readable medium, and at least one processor coupled to the computer-readable medium and programmed to (i) determine, for generating a real-fix tip pertaining to a complaint and a vehicle, first text describing at least one of a cause of the complaint and how the cause for the complaint was discovered, and second text describing a service-operation performed on the vehicle to resolve the complaint, (ii) determine at least one of (a) first additional content relevant to the complaint, the vehicle, and a portion of the first text, and (b) second additional content relevant to the complaint, the vehicle, the cause, and a portion of the second text, (iii) generate a first real-fix tip, wherein the first real-fix tip includes a first file comprising the first text, the second text, and a respective pointer to the at least one of the first additional content and the second additional content, (iv) store the first real-fix tip within the computer-readable medium, (v) receive a request for a real-fix tip pertaining to the complaint and the vehicle, and (vi) output, in response to the request, the first file stored within the computer-readable medium.

In some embodiments viewed from the first or second aspect, the respective pointer to the at least one of the first additional content and the second additional content includes a first pointer pointing to one of the first additional content and the second additional content. The method may further comprise: receiving, by the at least one processor after outputting the first file, a selection of the first pointer; obtaining, by the at least one processor in response to receiving the selection of the first pointer, the one of the first additional content and the second additional content pointed to by the first pointer; and outputting, by the at least one processor, the one of the first additional content and the second additional content pointed to by the first pointer.

In some embodiments viewed from the first or second aspect, the respective pointer to the at least one of the first additional content and the second additional content includes a second pointer pointing to one of the first additional content and the second additional content not pointed to by the first pointer. The method may further comprise: receiving, by the at least one processor after outputting the first file, a selection of the second pointer; obtaining, by the at least one processor in response to receiving the selection of the second pointer, the one of the first additional content and the second additional content pointed to by the second pointer but not by the first pointer; and outputting, by the at least one processor, the one of the first additional content and the second additional content pointed to by the second pointer but not by the first pointer.

In some embodiments viewed from the first or second aspect, each respective pointer includes a hyperlink within the first file. In some embodiments, wherein the vehicle indicates a particular vehicle year, make, and model, determining the first text and the second text includes determining, by the at least one processor, a quantity of repair orders that identify the cause and the service-operation for the complaint and the particular vehicle year, make, and model, and the quantity of repair orders equals or exceeds a threshold quantity of repair orders.

In some embodiments viewed from the first or second aspect, the at least one of the first additional content and the second additional content includes content selected from the group consisting of an image, a measurement instruction executable by a data processing machine to perform a measurement, a vehicle data request executable by the data processing machine to request data from the vehicle, and a textual test description.

Viewed from a third aspect, an example embodiment may take the form of a method comprising (i) outputting, by at least one processor, a request for a real-fix tip pertaining to a complaint and a vehicle, wherein the request includes an identifier of the complaint and an identifier of the vehicle, (ii) receiving, by the at least one processor after outputting the request, a first file of a first real-fix tip pertaining to the complaint and the vehicle, (iii) outputting, by the at least one processor to a display connected to the at least one processor, first text and second text of the first file, wherein the first text describes at least one of a cause of the complaint and how the cause of the complaint was discovered, wherein the second text describes a service-operation performed on the vehicle to resolve the complaint, wherein one of the first text and the second text includes a first pointer pointing to first additional content, wherein if the first text includes the first pointer, the first additional content includes content relevant to the complaint, the vehicle, and a portion of the first text, and wherein if the second text includes the first pointer, the first additional content includes content relevant to the complaint, the vehicle, the cause, and a portion of the second text, (iv) receiving, by the at least one processor, a selection of the first pointer while displayed by the display, and (v) outputting, by the at least one processor to the display, the first additional content pointed to by the first pointer.

Viewed from a fourth aspect, an example embodiment may take the form of a system comprising: a display, and at least one processor coupled to the display and programmed to: (i) output a request for a real-fix tip pertaining to a complaint and a vehicle, wherein the request includes an identifier of the complaint and an identifier of the vehicle, (ii) receive, after outputting the request, a first file of a first real-fix tip pertaining to the complaint and the vehicle, (iii) output, to the display, first text and second text of the first file, wherein the first text describes at least one of a cause of the complaint and how the cause of the complaint was discovered, wherein the second text describes a service-operation performed on the vehicle to resolve the complaint, wherein one of the first text and the second text includes a first pointer pointing to first additional content, wherein if the first text includes the first pointer, the first additional content includes content relevant to the complaint, the vehicle, and a portion of the first text, and wherein if the second text includes the first pointer, the first additional content includes content relevant to the complaint, the vehicle, the cause, and a portion of the second text, (iv) receive a selection of the first pointer while displayed by the display, and (v) output, to the display, the first additional content pointed to by the first pointer.

In some embodiments viewed from the third or fourth aspect, outputting the first additional content includes outputting the first additional content overlaid upon at least a portion of the first text and second text of the first file.

In some embodiments viewed from the third or fourth aspect, the first additional content output to the display includes a measurement selection for a first measurement the at least one processor may perform. The method may further comprise: receiving, by the at least one processor, an input selecting the measurement selection; performing, by the at least one processor, the first measurement; and outputting to the display a value determined by performing the first measurement.

In some embodiments viewed from the third or fourth aspect, the first additional content displayed by the display includes a parameter identifier associated with vehicle data the at least one processor may request. The method may further comprise: receiving, by the at least one processor, an input selecting the vehicle data parameter identifier; requesting, by the at least one processor, the vehicle data associated with the parameter identifier; receiving, by the at least one processor, the vehicle data requested by the at least one processor; and outputting to the display a value determined from the vehicle data received by the at least one processor.

In some embodiments viewed from the third or fourth aspect, outputting the value includes outputting a status of whether a diagnostic trouble code is active.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the drawings.

FIGS. 2, 3, and 4 show additional content viewers in accordance with the example embodiments.

FIGS. 8, 9, 10, 11, 12, 13, 14, 15, 16, 17, 18, and 19 show graphical user interfaces in accordance with the example embodiments.

FIG. 20 shows an example RO in accordance with the example embodiments.

FIG. 22 shows data record field names and data records in accordance with the example embodiments.

FIG. 23 is a table including phrase data storable in a computer-readable medium in accordance with the example embodiments.

FIGS. 24, 25, and 26 are flowcharts depicting functions that may be carried out in accordance with the example embodiments.

DETAILED DESCRIPTION

I. Introduction

This description describes several example embodiments including example embodiments regarding repair orders (ROs) and real-fix tips (RFTs). A real-fix tip (RFT) may be generated by a data processing machine (DPM) or one or more processors of a DPM. An RFT may be based on data that is on or within one or more ROs. An RFT may be augmented with pointers that point to content within a content database. Selection of such a pointer may result in retrieval and displaying of the content. An RFT may be referred to by other terms, such as a "field-fix tip," a "prior-service tip," or by another term.

An RFT may be generated and associated with one or more RO. In one respect, a person using a coordinator DPM may access an RO and generate an RFT for subject matter which that person is considered to be an expert. In another respect, an RFT DPM may generate an RFT. After an RFT is generated for a given RO, other RO that pertain to the RFT may be classified as a duplicate RO of the given RO. An RFT may be stored in a database storing the RO and RFT or may be stored in a separate database storing RFT without the RO. Repair technicians may access the stored ROs and RFTs to assist them in diagnosing or repairing a repairable item, such as a vehicle. Hereafter, the example embodiments are described by referring to a vehicle. A person skilled in the art will understand that the example embodiments are applicable to other repairable items as well.

In this description, the articles "a," "an" or "the" are used to introduce elements of the example embodiments. The intent of using those articles is that there is one or more of the elements. The intent of using the conjunction "or" within a described list of at least two terms is to indicate any of the listed terms or any combination of the listed terms. For example, in a list of terms recited as "A, B, or C," the combinations indicated by that list of terms include "A and B," "A and C," "B, and C," and "A, B, and C." Each individual term A, B, and C in the list of terms may exist independently without any other term in the list. The use of ordinal numbers such as "first," "second," "third" and so on is to distinguish respective elements rather than to denote a particular order of those elements unless the context of using those terms explicitly indicates otherwise.

Figure 5:
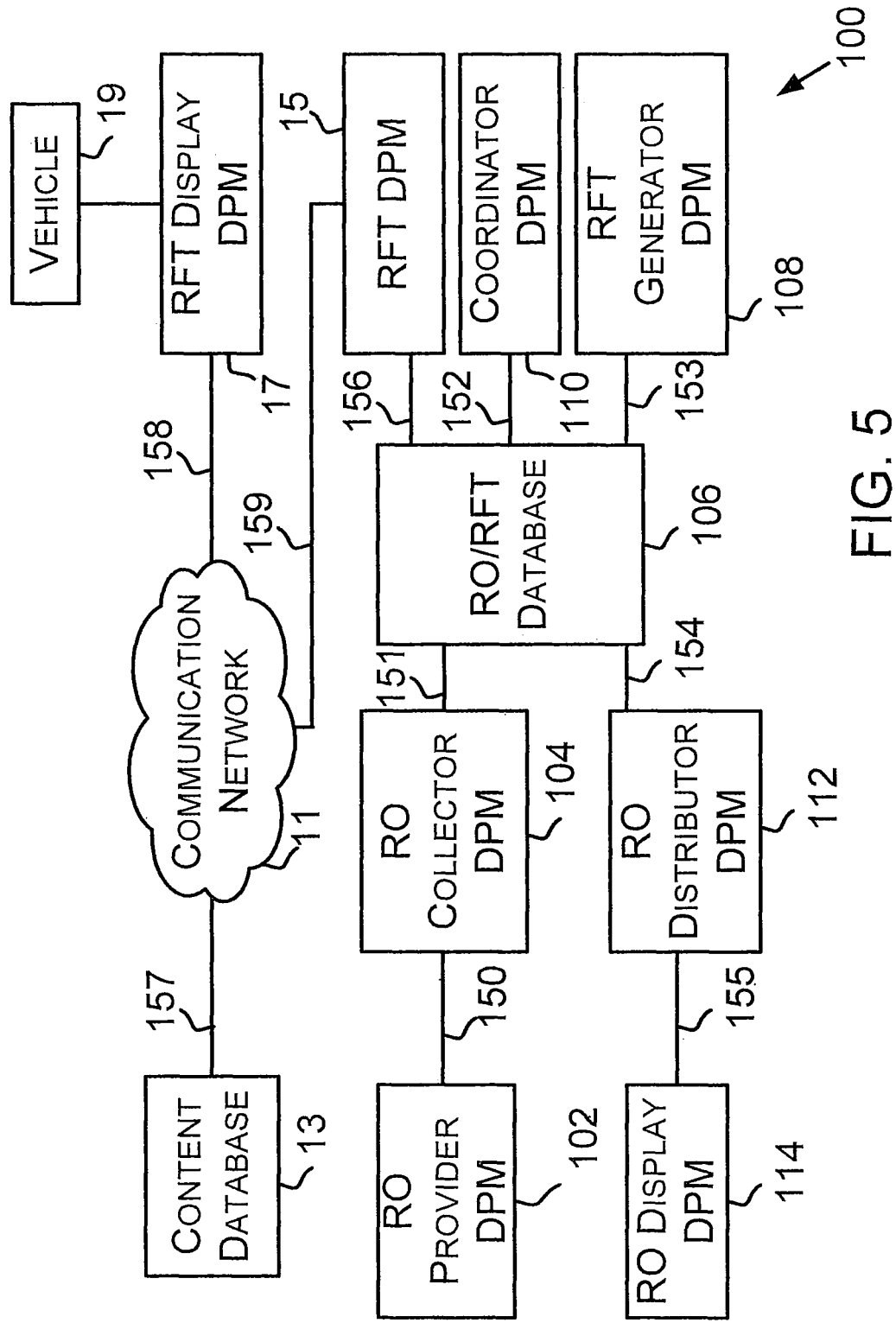
FIG. 5 is a block diagram of a system in accordance with the example embodiments.

The following abbreviations or acronyms are used in the description.
CRPI—Computer-readable program instructions
DPM—Data Processing Machine
DTC—Diagnostic Trouble Code
e.g.,—for example
FIG.—Figure
GPS—Global Positioning System
GUI—Graphical User Interface
HVAC—heating, ventilation, and air conditioning
L—Liter
LAN—Local Area Network
LOC—Labor operation code
NA—non-applicable
NST—Non-standard Terms
OCR—Optical Character Recognition
OCR'd—Optical Character Recognized
PDF—portable document format
QC—Quality Control
RO—Repair Order
RFT—Real fix tip
SPL—Standard Phrase List
SQL—Structured Query Language
ST—Standard Terms
VIN—Vehicle Identification Number
XML—Extensible Markup Language
YMM—Year/Make/Model
YMME—Year/Make/Model/Engine
YMMES—Year/Make/Model/Engine/System At least some of the example embodiments refer to a vehicle. A vehicle, such as a vehicle 19 shown in FIG. 5, is a mobile machine that may be used to transport a person, people, or cargo. As an example, any vehicle described herein may be driven or otherwise guided along a path (e.g., a paved road or otherwise) on land, in water, or in the air or outer space. As another example, any vehicle described herein may be wheeled, tracked, railed or skied. As yet another example, any vehicle described herein may include an automobile, a motorcycle, an all-terrain vehicle (ATV) defined by ANSI/SVIA-1-2007, a snowmobile, a personal watercraft (e.g., a JET SKI® personal watercraft), a light-duty truck, a medium-duty truck, a heavy-duty truck, a semi-tractor, or a farm machine. As still yet another example, any vehicle described herein may include or use any appropriate voltage or current source, such as a battery, an alternator, a fuel cell, and the like, providing any appropriate current or voltage, such as about 12 volts, about 42 volts, and the like. As still yet another example, any of the vehicles described herein may include or use any desired system or engine. Those systems or engines may include items that use fossil fuels, such as gasoline, natural gas, propane, and the like, electricity, such as that generated by a battery, magneto, fuel cell, solar cell and the like, wind and hybrids or combinations thereof. As still yet another example, any vehicle described herein may include an electronic control unit (ECU), a data link connector (DLC), and a vehicle communication link that connects the DLC to the ECU. At least some of the example embodiments may be used to carry out functions for diagnosing a vehicle or some other repairable item.

The block diagrams, GUI, and flow charts shown in the figures are provided merely as examples and are not intended to be limiting. Many of the elements illustrated in the figures or described herein are functional elements that may be implemented as discrete or distributed components or in conjunction with other components, and in any suitable combination and location. Those skilled in the art will appreciate that other arrangements and elements (e.g., machines, interfaces, functions, orders, or groupings of functions) may be used instead. Furthermore, various functions described as being performed by one or more elements may be carried out by a processor executing computer-readable program instructions or by any combination of hardware, firmware, or software.

II. Example RFT Augmented with Pointer

Figure 1:
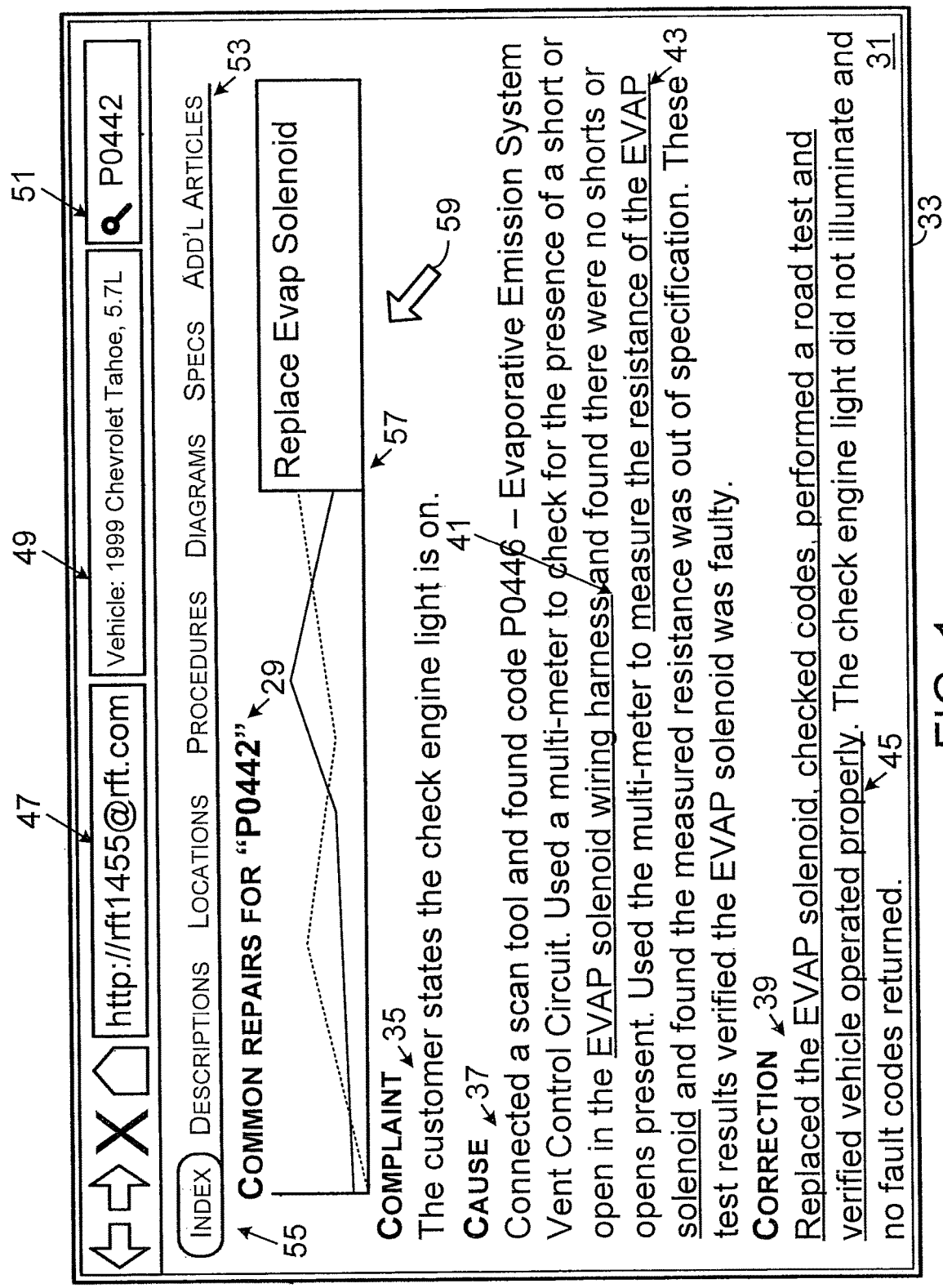
FIG. 1 shows an example real-fix tip augmented with pointers to additional content.

FIG. 1 shows a real-fix tip 31 displayed on a display 33. The RFT 31 includes a complaint field 35, a cause field 37, and a correction field 39. The RFT described in this description may include a pointer to additional content. The pointer may be associated with a portion of the text within an RFT. The cause field 37 includes a pointer 41 that is associated with the text "EVAP solenoid wiring harness" and a pointer 43 associated with the text "measure the resistance of the EVAP solenoid." The correction field 39 includes a pointer 45 associated with the first sentence of the correction field 39. The pointers 41, 43, and 45 are shown as underlined text. The pointers 41, 43, and 45 may include a hypertext link in accordance with a hypertext markup language (HTML). The text of a pointer may indicate the type of additional content associated with the pointer. For instance, the text "EVAP solenoid wiring harness" of the pointer 41 indicates the additional content is a schematic/wiring diagram. Selection of a pointer within an RFT can cause an additional content viewer (ACV) to be displayed.

FIG. 1 shows other displayable elements that may be displayed on the display 33 while an RFT is displayed on the display 33. For example, while the display 33 is displaying the RFT 31, the display 33 may display a search box 47 to display a uniform resource locator (URL), such as a URL of an RFT being displayed on the display 33 or a new URL of a next web page or RFT. As another example, while the display 33 is displaying the RFT 31, the display 33 may display a vehicle type box 49 to display which vehicle type has been selected or to select a new vehicle type.

As another example, while the display 33 is displaying the RFT 31, the display 33 may display a search box 51 to display the subject of a search. For instance, the subject of the search may include a DTC identifier or a customer complaint regarding a vehicle. As shown in FIG. 1, "P0442" represents a DTC identifier.

As another example, while the display 33 is displaying the RFT 31, the display 33 may display a set of tabs 53 and a current tab 55 indicating which tab is currently selected or being displayed. As shown in FIG. 1, an "INDEX" tab is currently selected. In one respect, the augmented RFT may be displayed only under the INDEX tab. In another respect, the augmented RFT may display under the INDEX tab and at least one other tab of the set of tabs 53.

As another example, while the display 33 is displaying the RFT 31, the display 33 may display a graph 57 pertaining to the subject search entered into the search box 51 and the vehicle type entered into the vehicle type box 49. As yet another example, while the display 33 is displaying the RFT 31, the display 33 may display a selector 59 to indicate a selector controllable by a user interface to select elements displayed on the display 33. As still yet another example, while the display 33 is displaying the RFT 31, the display 33 may display a title field 29 of the RFT 31. Although not shown in FIG. 1, one or more of the title field 29 and the complaint filed 35 may include a pointer to additional content.

Figure 2:
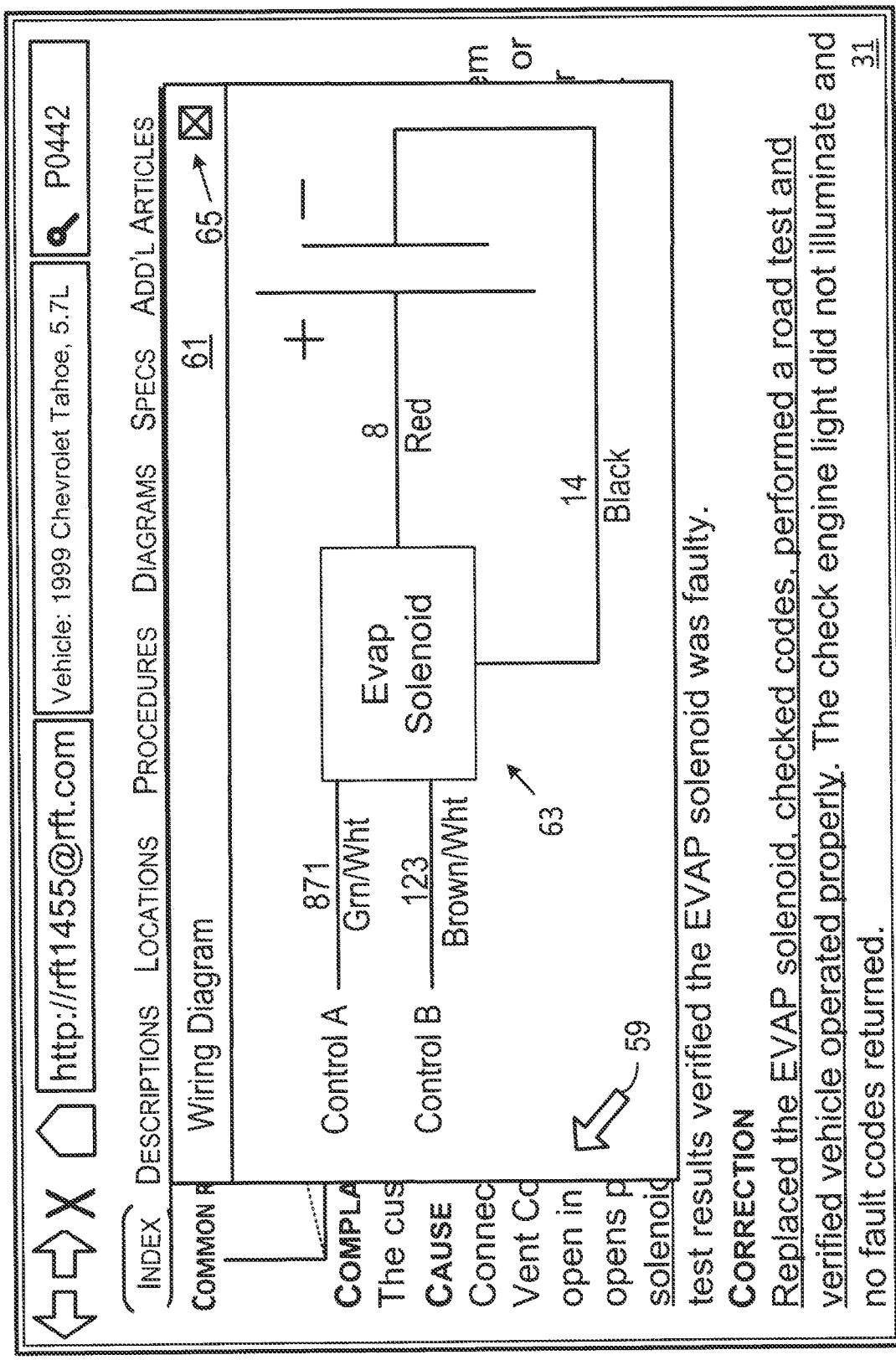

FIG. 2 shows an ACV 61 displaying additional content (i.e., a wiring diagram 63) and a close viewer box 65. The ACV 61 may be displayed in response to a selection of the pointer 41 shown in FIG. 1. FIG. 2 shows the ACV 61 displayed upon (e.g., overlaid on) the RFT 31.

Figure 3:
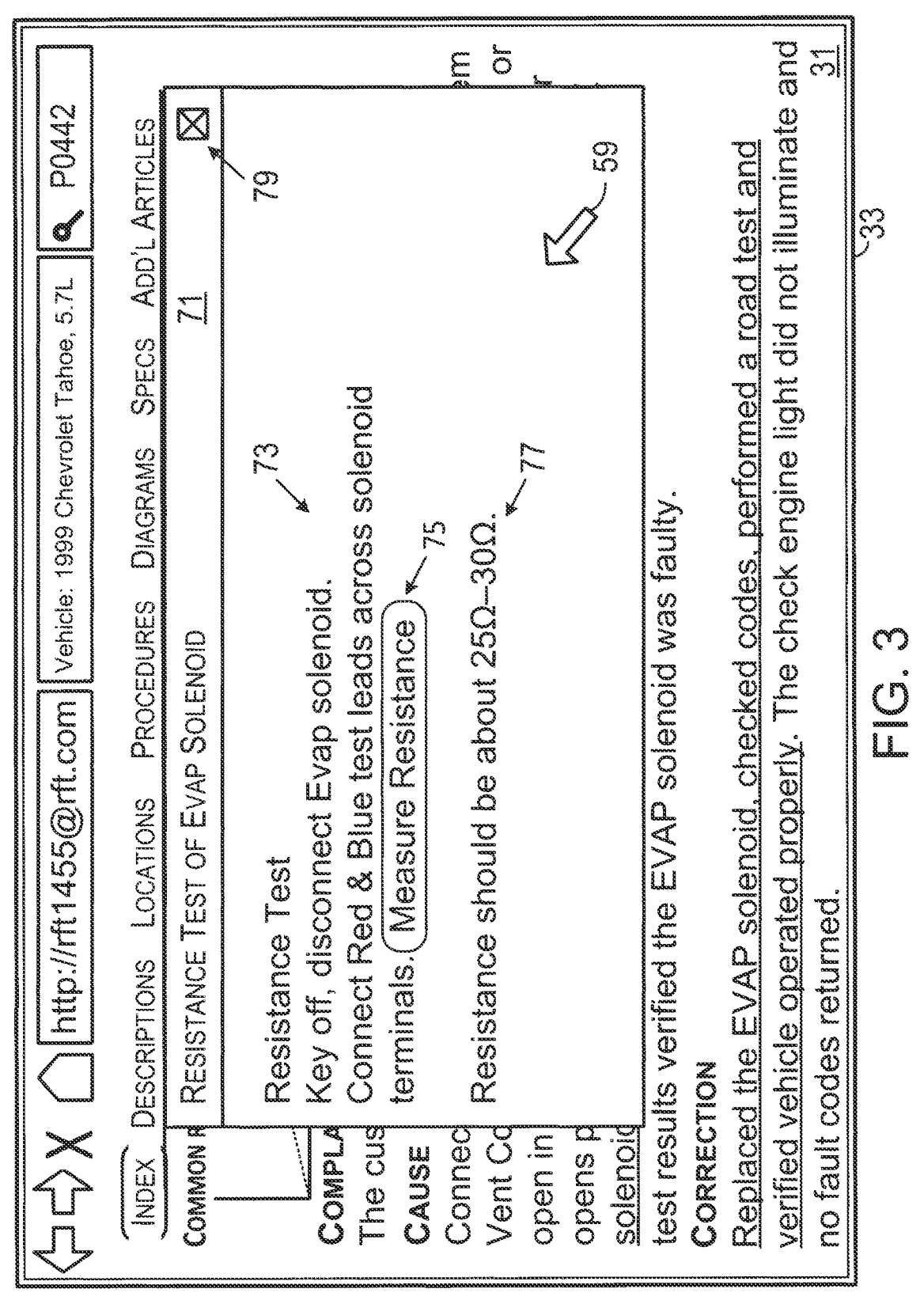

FIG. 3 shows an ACV 71 displaying additional content (i.e., a text description of a resistance test 73, an automated function selector 75, and a specification 77) and a close viewer box 79. The ACV 71 may be displayed in response to a selection of the pointer 43 shown in FIG. 1. FIG. 3 shows the ACV 71 displayed upon (e.g., overlaid on) the RFT 31. The selector 59 may be used to select the automated function selector 75 to cause a DPM to perform a function pertaining to the additional content. In accordance with the example embodiment shown in FIG. 3, the DPM may include functionality to measure resistance of a circuit. The text description 73 described where two test leads should be connected. In response to selection of the automated function selector 75, the DPM may measure the resistance of the circuit and cause a value of resistance determined by the measurement to be displayed on the display (e.g., within the ACV 71).

Figure 4:
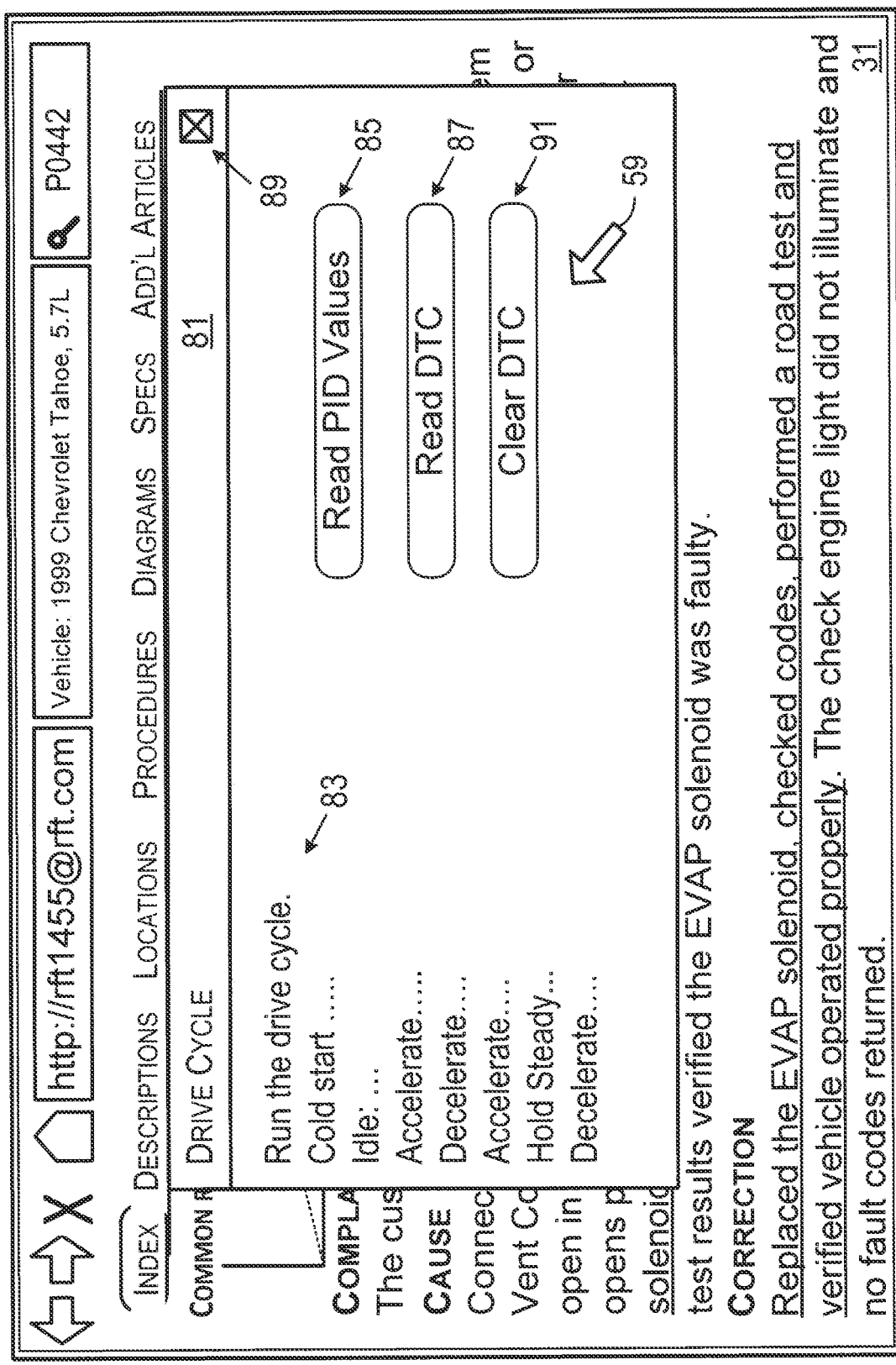

FIG. 4 shows an ACV 81 displaying additional content (i.e., a text description of a drive cycle test 83, automated function selectors 85, 87, and 91) and a close viewer box 89. The ACV 81 may be displayed in response to a selection of the pointer 45 shown in FIG. 1. FIG. 4 shows the ACV 81 displayed upon (e.g., overlaid on) the RFT 31. The selector 59 may be used to select the automated function selector 85 or 87 to cause a DPM to perform a function pertaining to the additional content. As an example, the DPM may include functionality to read data values of vehicle parameters from a vehicle when the automated function selector 85 is selected to read PID values. As another example, the DPM may include functionality to read DTC from a vehicle when the automated function selector 87 is selected to read DTC. As another example, the DPM may include functionality to clear DTC from the vehicle when the automated function selector 91 is selected. In response to selection of the automated function selector 85 or 87, the DPM may read the PID values or DTC, respectively, and cause the PID values or DTC to be displayed on the display (e.g., within the ACV 81). In response to selection of the automated function, the DPM may transmit a clear DTC message to the vehicle. Additionally, the DPM may transmit a read DTC message to the vehicle to confirm that the DTC have been cleared. The messages sent by the DPM to the vehicle may be directed to a particular ECU within the vehicle.

Each of the ACV 61, 71, and 81 is shown as overlaying only a portion of an RFT. The size of an ACV may be altered (e.g., made smaller or made larger) by use of a user interface. Altering the size of the ACV may include altering the ACV to cover the entire RFT. In an alternative arrangement, upon selecting a pointer to additional content, the display 33 may cause an ACV to be displayed in place of the RFT that included the selected pointer. A DPM including the display 33 can track which RFT was displayed when the pointer was selected such that the display 33 can display the same RFT after closing the ACV displayed in place of the RFT.

When an ACV covers only a portion of an RFT, the portion of the RFT still visible may be altered (e.g., by changing a background color of the display) to provide contrast between the RFT and the ACV. In FIGS. 2, 3, and 4, the visible portion of the RF has changed to have a gray background while the ACV 61, 71, and 81, respectively, are displayed on the display 33.

Other automated function selectors may be included within an ACV. In general, the automated functions selectors may include selectors for functions performed by a typical vehicle scan tool, such as an OBD scan tool.

In FIGS. 2, 3, and 4, the display 33 displays a selector 59 while the ACV 61, 71, and 81, respectively, are displayed. In one respect, the selector 59 may be used to select the close viewer box 65, 79, and 89 so as to cause the display 33 to stop displaying the ACV 61, 71, and 81, respectively. In another respect, the selector 59 may be used to select an area of the RFT 31 outside of the ACV 61, 71, and 81 so as to cause the display 33 to stop displaying the ACV 61, 71, and 81, respectively.

An ACV may include a pointer to additional content. For example, the words "Control A" in FIG. 2 may be a pointer to additional content regarding a device that provides some type of control signal to the EVAP solenoid via circuit number 871. The pointer may be identified by underlining the words "Control A." Selecting the pointer within an ACV (e.g., a first ACV) may cause the first ACV currently displayed on the display 33 to be replaced with a second ACV different than the first ACV. The second ACV includes the additional content pointed to by the content in the first ACV.

Figure 29:
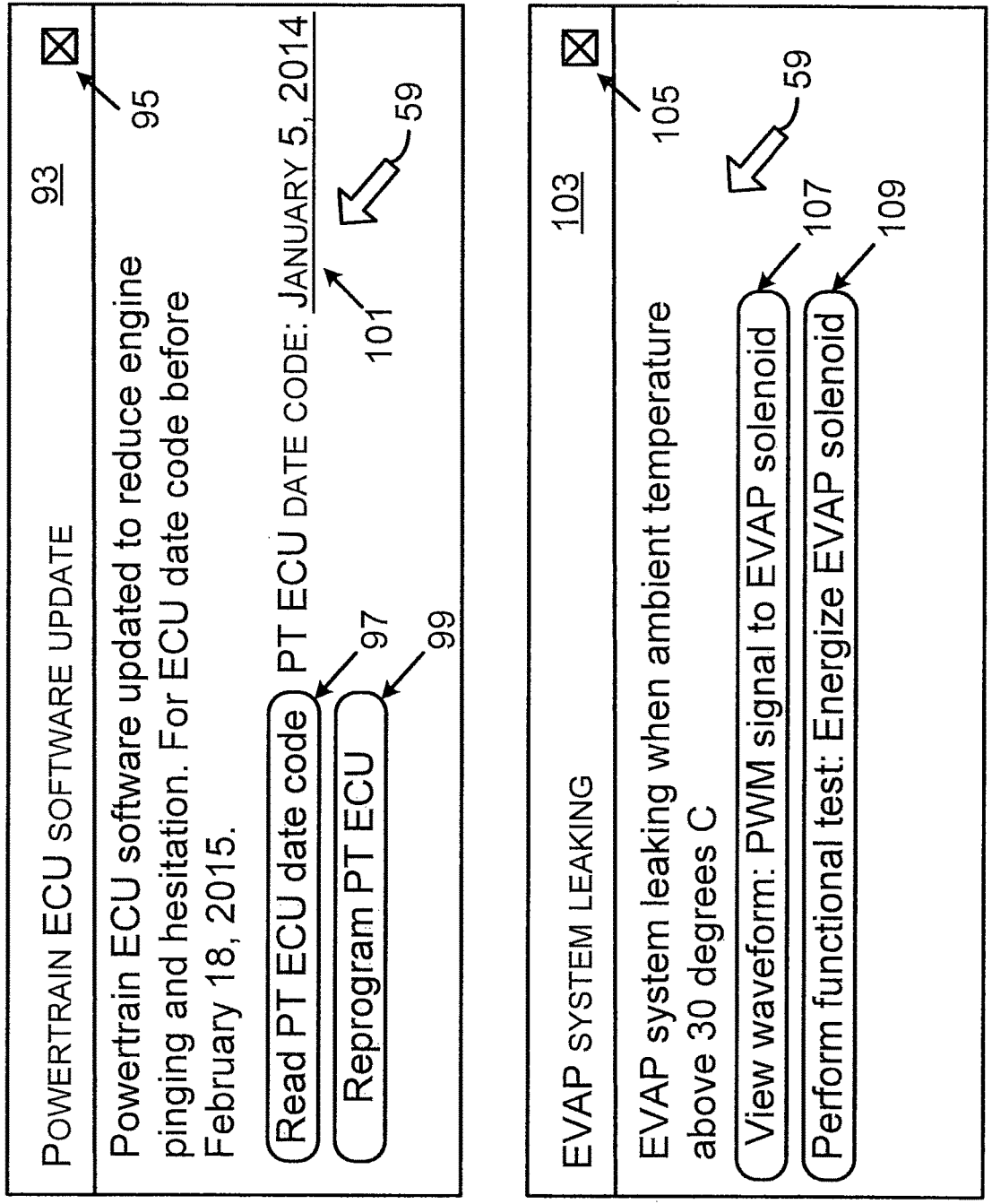
FIG. 29 shows additional content viewers with automated function selector.

FIG. 29 shows other ACV with automated function selectors. The upper half of FIG. 29 shows an ACV 93 regarding a powertrain ECU software update. As with other ACV, the ACV 93 may be displayed on the display 214 in response to selection of a pointer within an RFT. The ACV 93 includes automated function selectors 97 and 99 and a close viewer box 95. The selector 59 may be used to select the automated function selector 97 to request data from an ECU within the vehicle 19 and to display data 101 (e.g., a date code of software within a powertrain ECU) received in response to the request. The selector 59 may be used to select the automated function selector 99 to cause the DPM to reprogram an ECU within the vehicle with more current software. This may include re-flashing a EEPROM within the ECU. An automated function selector may allow for initially programming a new ECU installed within the vehicle 19 and relearning data values, such as data values to calibrate the ECU (e.g., a block learn fuel system calibration).

The lower half of FIG. 29 shows ACV 103 regarding the emission evaporator within the vehicle 19 leaking. As with other ACV, the ACV 103 may be displayed on the display 214 in response to selection of a pointer within an RFT. The ACV 103 includes automated function selectors 107 and 109 and a close viewer box 105. The selector 59 may be used to select the automated function selector 107 to request data from an ECU within the vehicle 19 and to display a waveform based on signals received in response to the request. The selector 59 may be used to select the automated function selector 109 to cause the DPM to perform a function test on the vehicle 19. The RFT display DPM 17 may include CRPI to send requests, such as an OBD II mode S08 request to control a component within the vehicle. For example, the EVAP solenoid within the vehicle 19 may be controlled in response to selecting the automate function selector 109. Other examples of automated function selectors displayed within an ACV are also possible.

III. Example Architecture

FIG. 5 is a block diagram of a system 100 in accordance with one or more of the example embodiments. The system 100 includes a communication network 11, a content database 13, an RFT DPM 15, an RFT display DPM 17, a vehicle 19, an RO provider DPM 102, an RO collector DPM 104, an RO/RFT database 106, an RFT generator DPM 108, a coordinator DPM 110, an RO distributor DPM 112, an RO display DPM 114, and network links 150, 151, 152, 153, 154, 155, 156, 157, 158, and 159.

The communication network 11 includes network links for communicatively coupling two or more devices to allow those devices to communicate with one another. The communication network 11 and one or more of the network links 150-159 may include a portion of the Internet, a portion of a local area network (LAN), a circuit-switched network, a packet-switched network, or a portion of some other network. One or more of the network links 150-159 may include or a system bus, such as a control bus, data bus, or address bus within a computing device, such as a DPM or a personal computer. One or more of the network links 150-159 may be configured to carry data between more than two network devices. One or more of the network links 150-159 may include a wireless link or a wired link.

The content database 13 may include a computer-readable medium storing additional content that is pointed to by a pointer in an RFT or an ACV. As an example, the additional content stored in the content database 13 may include original equipment manufacturer (OEM) content, such as content produced for or by an OEM of vehicles. As another example, the content stored in the content database 13 may include aftermarket content, such as content produced by or for an aftermarket vehicle service provider. As another example, the additional content may include any of the additional content described with respect to FIG. 1 to FIG. 4 or in the other described examples.

The RFT DPM 15 may perform various functions with respect to RFTs. For example, the RFT DPM 15 may generate RFTs, receive a request for an RFT, search for an RFT within the RO/RFT database 106, receive an RFT from the RO/RFT database 106, or output an RFT to the communication network 11 for transmission to another DPM, such as the RFT display DPM 17. The RFT DPM 15 may include the content database 13 and may access the content database 13 to search for content to be pointed to by a pointer of an RFT. The RFT DPM 15 may receive additional content located during a search of the content database 13 and provide the received content to the RFT display DPM 17.

The RFT generator DPM 108 may generate an RFT (or at least a portion of an RFT) for a group of one or more RO (hereinafter, an "RO group") and to provide the RFT to the RO/RFT database 106.

The RFT display DPM 17 may display a GUI to enter search parameters (e.g., a vehicle type identifier within the vehicle type box 49 and a complaint regarding a vehicle in the search box 51) and display an RFT that is returned in response to transmitting a request with the search parameters to the RFT DPM 15. The RFT display DPM 17 may display any RFT and any additional content viewer described in this description. The RFT display DPM 17 may display additional content received in response to selection of a pointer pointing to the additional content. The RFT display DPM 17 may include a transceiver connectable to the DLC of the vehicle 19 in order to carry out communications with the vehicle 19. As an example, the RFT display DPM 17 may transmit request for vehicle parameters or DTC from the vehicle 19. As another example, the RFT display 17 may receive vehicle parameters or DTC from the vehicle 19. The RFT display 17 may display data received from the vehicle 19. The RFT display DPM 17 may include CRPI executable by a processor to perform measurements on the vehicle 19. The processor may execute those CRPI to perform a measurement in response to selection of an automated function selector within an RFT displayed by the RFT display DPM 17.

The RO provider DPM 102 may generate repair orders and provide repair orders to the RO collector DPM 104. The RO provider DPM 102 may generate one or more types of RO including, but not limited to, RO printed on paper (hereinafter "paper RO") and computer-readable (e.g., electronic) RO. Each RO may include information pertaining to service operation performed on a repairable item, such as a vehicle. Additionally or alternatively, each RO may include other information such as information pertaining to performing preventative maintenance on the repairable item. Prior to providing the RO to the RO collector DPM 104, the RO generated by the RO provider DPM 102 may be considered an unpublished RO.

The RO/RFT database 106 may include a computer-readable medium to store RO that the RO collector DPM 104 receives from the RO provider DPM 102 and RFT generated by the RFT generator DPM 108. The RO/RFT database 106 may include a CRM storing an RO database including RO but not any RFT. The RO/RFT database 106 may include a CRM storing an RFT database including RFT but not any RO. The RO stored in the RO/RFT database 106 may include an original RO, a portion of an original RO, a copy of an original RO, a copy of a portion of an original RO, or some other RO. Each RO and RFT stored in the RO/RFT database 106 may pertain to a vehicle or another type of repairable item. Each RO stored within the RO/RFT database 106 may include RO data pertaining to a service-operation performed to a repairable item such as a preventive maintenance service-operation, a cleaning service-operation, or an adjustment service-operation.

An RO stored within the RO/RFT database 106 may be classified as a published RO that a repair technician may access from the RO/RFT database 106 or a non-published RO that the repair technician cannot access from the RO/RFT database 106. An original RO provided by an RO provider DPM may be referred to as an unpublished RO. After the unpublished RO is reviewed by a person operating the RFT generator DPM 108 or by a person operating the coordinator DPM 110, the unpublished RO may be published for access to the RO display DPM 114. Upon publication, the unpublished RO becomes a published RO. For any of a variety of reasons, a published RO may be reclassified as an unpublished RO that cannot be accessed by the RO display DPM 114 and then subsequently re-published such that the RO can be accessed by the RO display DPM 114.

In one respect, the RO/RFT database 106 may include a processor to search the RO/RFT database 106 and to store data (e.g., RO or RFT) within the RO/RFT database 106. In another respect, a processor that searches the RO/RFT database 106 or causes data to be stored within the RO/RFT database 106 may be within a DPM distinct from the RO/RFT database 106. For example, in accordance with embodiments in which RO collector DPM 104 is distinct from the RO/RFT database 106, the processor may be a part of the RO collector DPM 104. The RO/RFT database 106 may store real-fix tips and data that associate each RFT with one or more RO stored in the RO/RFT database 106.

In the embodiments in which the RO provider DPM 102 provides paper RO, the RO collector DPM 104 may include a scanner to generate scanned images of the paper RO and optical character recognition (OCR) computer-readable program instructions (CRPI) to generate searchable text representations of the paper RO. The data obtained from executing the OCR CRPI may be referred to as an optical character recognized (OCR'd) copy of the RO or a computer-readable RO.

The coordinator DPM 110 may display an RFT and RO stored in the RO/RFT database 106. The coordinator DPM 110 may provide selectors to select whether an RFT and the RO associated with the RFT are published for presentation to the RO display DPM 114 or the RFT display DPM 17. The coordinator DPM 110 may provide selectors to select whether to return an RFT to the RFT generator DPM 108 for revising the RFT.

In accordance with one or more example embodiments, the system 100 may include one or more additional RFT generator DPM configured like the RFT generator DPM 108. In accordance with those same embodiments or other embodiments, system 100 may include one or more additional coordinator DPM configured like coordinator DPM 110. A person having ordinary skill in the art will understand that an RFT generator DPM and a coordinator DPM may be co-located or integrated such that a single DPM may carry out the functions of both the RFT generator DPM 108 and the coordinator DPM 110. The RFT generator DPM 108 or the coordinator DPM 110 may be configured as a server or client device. For instance, a server (not shown) in the system 100 may serve applications executable by a processor of the RFT generator DPM 108 or the coordinator DPM 110. In that regard, the RFT generator DPM 108 or the coordinator DPM 110, acting as a client, may execute those applications to carry out the functions described herein as being performed by the RFT generator DPM 108 or the coordinator DPM 110, respectively. As an example, the RO collector DPM 104 or the RO distributor DPM 112 may be configured as a server.

The RO display DPM 114 may request and receive RO from the RO distributor DPM 112. The RO display DPM 114 may display RO via a display of a user interface. The RO display DPM 114 may include a display and audio speaker such that presenting an RO and RFT may occur visually or audibly. The RO display DPM 114 and RO provider DPM 102 may be separate machines, co-located or located remote from one another. Alternatively, the RO display DPM 114 and RO provider DPM 102 may be a single machine.

The RO distributor DPM 112 may receive requests for RO from the RO display DPM 114, access the requested RO from the RO/RFT database 106, and provide the requested RO accessed from the RO/RFT database 106 to the RO display DPM 114. The RO distributor DPM 112 may include a data server, such as a data server operated by Snap-On Incorporated, Kenosha, Wis., that serves webpages including Ask-a-Tech data. In accordance with that or those embodiments, the RO display DPM 114 may include a computing device, such as a laptop computer, a desktop computer, a tablet (e.g., an IPad by Apple, Inc.), or a vehicle diagnostic tool having an interface to the Internet. The RO distributor DPM 112 may maintain user-account data to confirm that a technician using the RO display DPM 114 has authorization to access RO and RFTs stored in the RO/RFT database 106.

Figure 6:
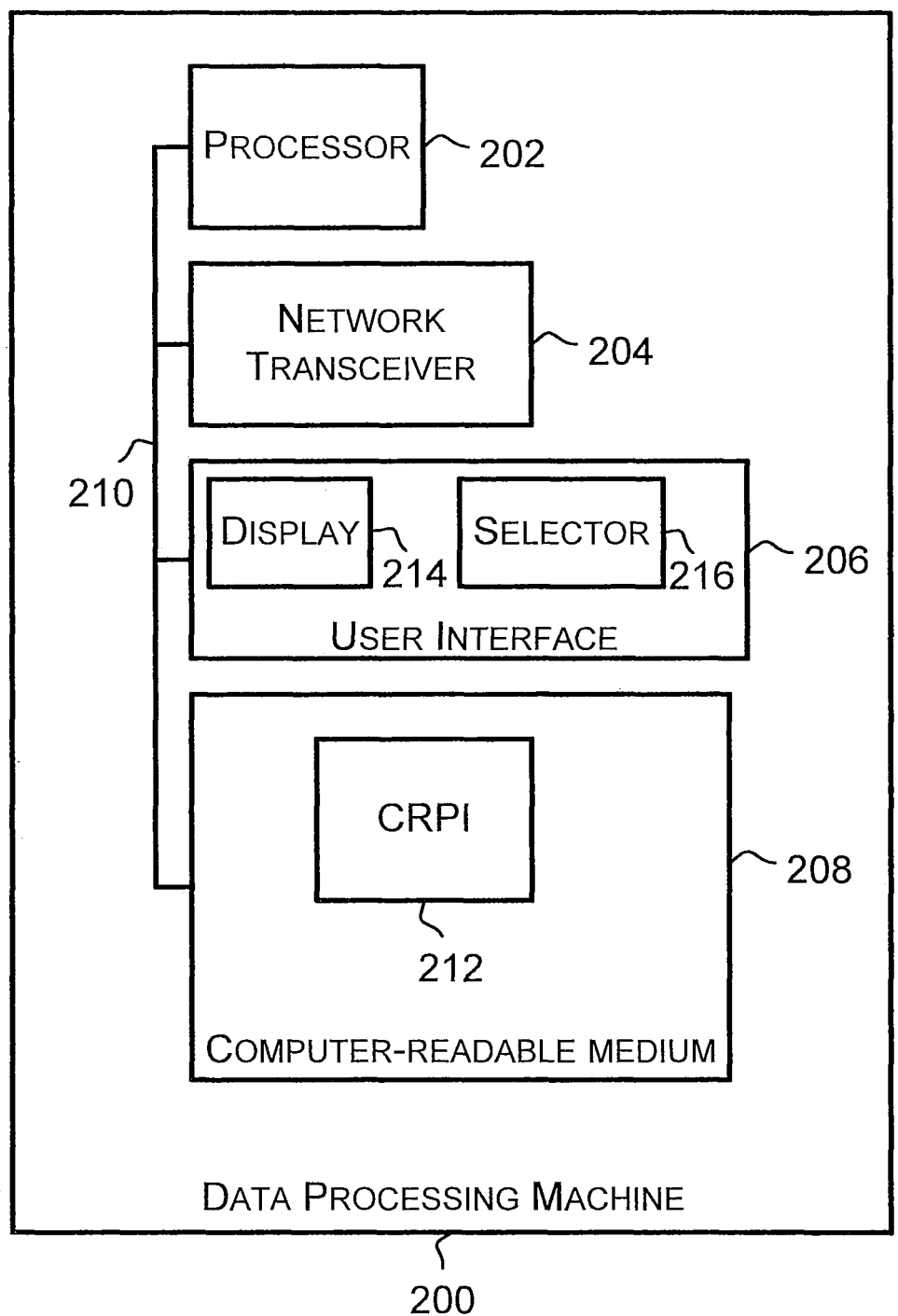
FIG. 6 is a block diagram of a data processing machine in accordance with the example embodiments.

Next, FIG. 6 is a block diagram of an example DPM 200 in accordance with one or more of the example embodiments described herein. As shown in FIG. 6, the DPM 200 includes a processor 202, a network transceiver 204, a user interface 206, and a computer-readable medium (CRM) 208, all of which may be linked together via a system bus, network, or other connection mechanism 210. One or more of the RFT DPM 15, the RFT display DPM 17, the RO collector DPM 104, the RFT generator DPM 108, the coordinator DPM 110, and the RO distributor DPM 112 may be arranged like DPM 200 or a like a portion of the DPM 200 (e.g., include one or more of the components of the DPM 200). Any DPM described herein may be referred to by another names, such as a "system," a "computing system," a "device," or a "machine."

A processor such as the processor 202 or any other processor discussed in this description may include one or more processors. A processor may include a general purpose processor (e.g., an INTEL® single core microprocessor or an INTEL® multicore microprocessor), or a special purpose processor (e.g., a digital signal processor or graphics processor). Additionally or alternatively, a processor may include an application specific integrated circuit (ASIC). A processor may be configured to execute computer-readable program instructions (CRPI). For example, the processor 202 can execute CRPI 212 stored in the CRM 208. A processor may be configured to execute hard-coded functionality in addition to or as an alternative to software-coded functionality (e.g., via CRPI).

A network transceiver such as the network transceiver 204 or any other network transceiver discussed in this description may include one or more network transceivers. Each network transceiver may include one or more transmitters configured to transmit data onto a communication network, such as the communication network 11, or a communication link of the communication network. Each network transceiver may include one or more network receivers configured to receive data carried over a communication network, such as the communication network 11, or a communication link of the communication network. The data transmitted or received by a network transceiver may include any of the RO or RFT discussed in this description.

A transmitter may transmit radio waves carrying data and a receiver may receive radio waves carrying data. A transceiver with that transmitter and receiver may include one or more antennas and may be referred to as a "radio transceiver," an "RF transceiver," or a "wireless network transceiver." The radio waves transmitted or received by a radio transceiver may be arranged in accordance with one or more wireless communication standards or protocols such as an Institute of Electrical and Electronics Engineers (IEEE) 802.15.1 standard for wireless personal area networks (PANs), a Bluetooth version 4.1 standard developed by the Bluetooth Special Interest Group (SIG) of Kirkland, Wash., or an IEEE 802.11 standard for wireless LANs (which is sometimes referred to as a Wi-Fi standard), or a cellular wireless communication standard such as a long term evolution (LTE) standard, a code division multiple access (CDMA) standard, an integrated digital enhanced network (IDEN) standard, a global system for mobile communications (GSM) standard, a general packet radio service (GPRS) standard, a universal mobile telecommunications system (UMTS) standard, an enhanced data rates for GSM evolution (EDGE) standard, or a multichannel multipoint distribution service (MMDS) standard.

Additionally or alternatively, a transmitter may transmit a signal (i.e., one or more signals or one or more electrical waves) carrying or representing data onto a cable (e.g., one or more cables or wires) and a receiver may receive from a cable a signal carrying or representing data over the cable. The cable may be part of a communication network, such as the communication network 11. The signal carried over a cable may be arranged in accordance with a wired communication standard such as a Transmission Control Protocol/Internet Protocol (TCP/IP), an IEEE 802.3 Ethernet communication standard for a LAN, a data over cable service interface specification (DOCSIS standard), such as DOCSIS 3.1, or some other wired communication standard. As an example, a cable may include a fiber optic cable, a coaxial cable, a twisted pair of cables, a CAT5, a CAT6 cable, or some other cable or wire.

The data transmitted by a transceiver may include a destination identifier or address of a DPM to which the data is to be transmitted. The data transmitted by a transceiver may include a source identifier or address of the DPM including the transceiver. The source identifier or address may be used to send a response to the DPM that includes the transceiver that sent the data.

The user interface 206 may include one or more user-input elements configured so that a user can input data to or for use by a processor or another component of the system including the user interface 206. As an example, the user-input elements may include a selector 216, such as a QWERTY keyboard, a computer mouse, or a touch screen. Additionally or alternatively, the user-input elements may include speech recognition circuitry and a microphone.

The user interface 206 may include one or more user-output elements by which data may be output (e.g., displayed) to one or more users. As an example, the user-output elements may include a display 214, a GUI, a touch screen display, an audible speaker, and electronic circuitry. The display 33 described with respect to FIGS. 1, 2, 3, and 4 may include or be configured like the display 214.

A computer-readable medium, such as the CRM 208 or any other computer-readable medium discussed in this description or included within a device, machine, database, or system described in this description, may include a non-transitory computer-readable medium, a transitory computer-readable medium, or both a non-transitory computer-readable medium and a transitory computer-readable medium. In one respect, a non-transitory computer-readable medium may be integrated in whole or in part with a processor. In another respect, a non-transitory computer-readable medium, or a portion thereof, may be separate and distinct from a processor.

A non-transitory computer-readable medium may include, for example, a volatile or non-volatile storage component, such as an optical, magnetic, organic or other memory or disc storage. Additionally or alternatively, a non-transitory computer-readable medium may include, for example, a random-access memory (RAM), a read-only memory (ROM), a programmable read-only memory (PROM), an erasable programmable read-only memory (EPROM), an electrically erasable programmable read-only memory (EEPROM), a compact disk read-only memory (CD-ROM), or another memory device that is configured to provide data or CRPI to a processor.

A transitory computer-readable medium may include, for example, CRPI provided over a communication link, such as a communication link which is connected to or is part of the network 11. The communication link may include a digital or analog communication link. The communication link may include a wired communication link or a wireless communication link.

A computer-readable medium may be referred to by other terms such as a "computer-readable storage medium," a "data storage device," a "memory device," a "memory," or a "computer-readable database." Any of those alternative terms may be preceded with the prefix "transitory" or "non-transitory."

Figure 7:
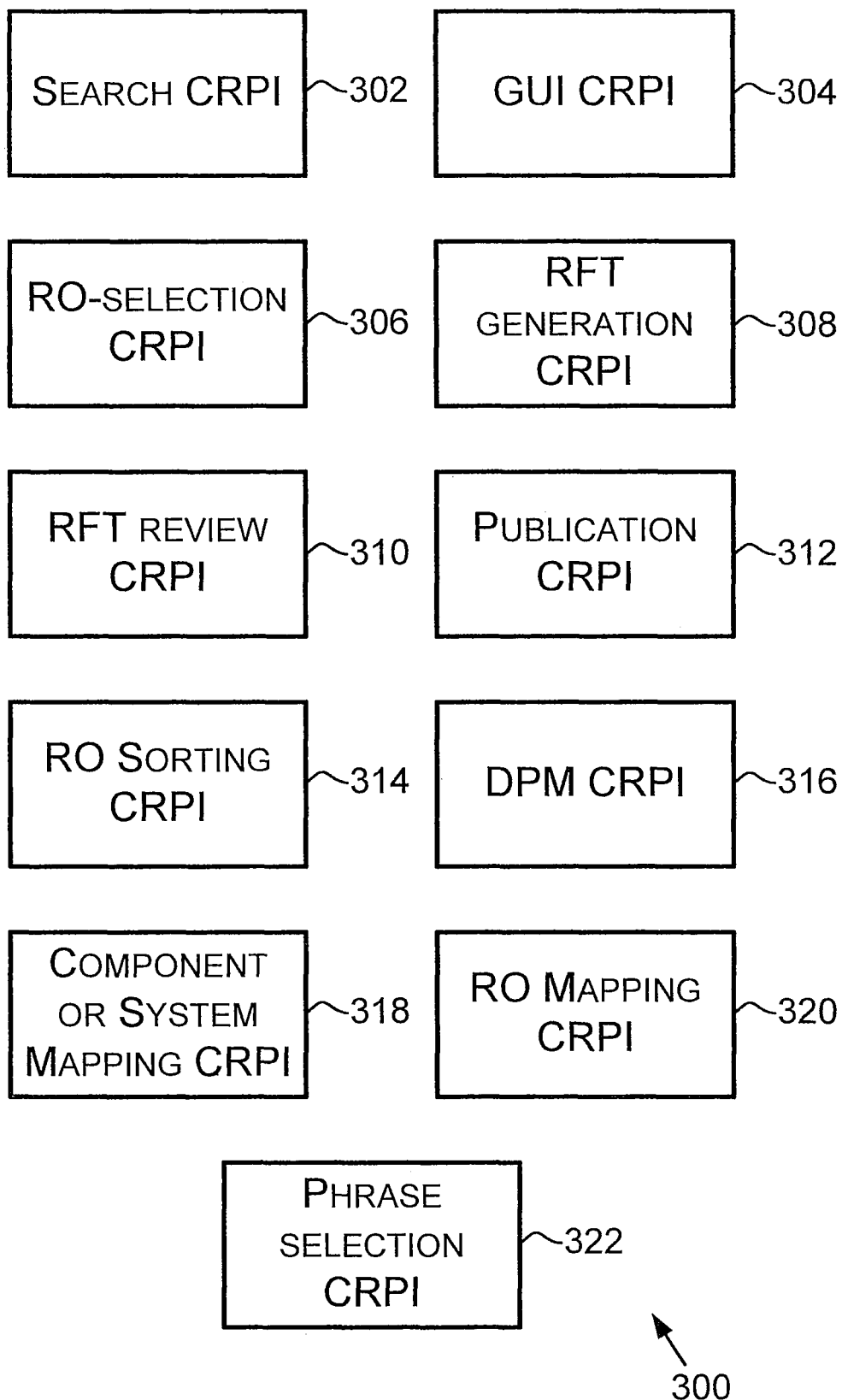
FIG. 7 depicts a suite of computer-readable program instructions in accordance with the example embodiments.

Next, FIG. 7 shows an example CRPI suite 300. CRPI suite 300 includes search CRPI 302, GUI CRPI 304, RO-selection CRPI 306, RFT generation CRPI 308, RFT review CRPI 310, publication CRPI 312, RO sorting CRPI 314, DPM CRPI 316, component or system mapping CRPI 318, RO mapping CRPI 320, and phrase selection CRPI 322. Descriptions of those CRPI, which are executable by a processor, such as processor 202, are described below.

The search CRPI 302 may include program instructions that are executable to search the RO/RFT database 106 and to select and return, to a processor executing the search CRPI 302, an RO, an RO group, or an RFT (published or un-published) stored within the RO/RFT database 106. The search CRPI 302 may base the search on search criteria selected or entered using the user interface 206. For embodiments in which the repairable item is a vehicle, the search criteria may include vehicle information, such as YMM, YMME, or YMMES, where YMM is year/make/model, YMME is year/make/model/engine, and YMMES is year/make/model/engine/system. The year may indicate a model year or the year the vehicle was manufactured. The make may indicate the manufacturer that manufactured the vehicle. The model may indicate a type of vehicle manufactured by the manufacturer. The engine may indicate an engine version within the vehicle. The system may indicate a system within the vehicle to distinguish the vehicle from other vehicles having the same YMME. As an example, the system may indicate whether the vehicle has an automatic or manual transmission.

The GUI CRPI 304 may include program instructions that are executable to generate a GUI displayable on the display 214. The GUI 500, 600, 700, 800, 900, and 1200 described below, may be generated by executing the GUI CRPI 304. Those or other GUI generated by executing the GUI CRPI 304 may include one or more of the selectors or text entry areas as described herein. Execution of the GUI CRPI 304 may cause the display 214 to display a GUI (such as a filter selection interface 1200 shown in FIGS. 8, 9, and 10) for entering search criteria to search the RO/RFT database 106, and to cause the processor 202 to receive the search criteria entered via the GUI 1200. As another example, execution of the GUI CRPI 304 may cause the display 214 to display a GUI (such as an RO-Group Selection-Interface 500 shown in FIG. 11) for entering a selection of an RO group located during a search of the RO/RFT database 106, and to cause the processor 202 to receive the selection of the RO group entered using the GUI 500. As yet another example, execution of the GUI CRPI 304 may cause the display 214 to display a GUI (such as an RFT creation-interface 600 shown in FIG. 12) for generating RFTs to be associated with an RO. Other examples of a GUI that may be generated by executing the GUI CRPI 304 are also possible.

The RO-selection CRPI 306 may include program instructions that are executable to select an RO from among the RO stored in the RO/RFT database 106. Selecting an RO may include selecting the RO from among an RO group comprising the RO. Selecting the RO may cause the RO to be displayed on the display 214. A user viewing that display may view the information entered onto or into the RO.

The RFT generation CRPI 308 may include program instructions that are executable to generate an RFT. In one respect, a processor of a DPM (e.g., the RFT DPM 15 or the RFT generator DPM 108) may execute the RFT generation CRPI 308 to automatically generate an RFT. Automatically generating an RFT may include the processor determining a threshold number of RO regarding vehicles with a common YMM, YMME, or YMMES have a common complaint, cause, and correction. Automatically generating an RFT may include the processor 202 selecting text for a complaint field, a cause field, and a correction field of the RFT. The processor 202 may enter the selected text into an RFT template including at least those fields. Automatically generating an RFT may include the processor 202 searching the content database 13 for content pertaining to text within one of the complaint, cause or correction sections and associating that text with a pointer to the content within the content database 13.

In another respect, a processor of a DPM (e.g., the RFT DPM 15 or the RFT generator DPM 108) may execute the RFT generation CRPI 308 to manually generate an RFT. Manually generating an RFT may include displaying GUI 600 and GUI 800 at which a user may enter a vehicle type, an RO number, standard text terms to be a part of the RFT, and a selection to submit the RFT for review at the coordinator DPM 110.

The RFT generation CRPI 308 may include an RFT template that includes the title field 39, the complaint field 35, the cause field 37, and the correction field 39. Execution of the RFT generation CRPI 308 to generate an RFT may include selecting phrases from phrase data 1916 using the automatic phrase selection as described in this description and inserting the selected phrases into the fields of the RFT template.

The RFT review CRPI 310 may include program instructions that are executable to review an RFT. Execution of the RFT review CRPI 310 may include selecting and receiving the RFT from the RO/RFT database 106, displaying the RFT using the display 214, receiving a selection to return the RFT for revision and coordinator notes indicating why the RFT is to be revised, and receiving a selection to submit the RFT for review prior to publication of the RFT. If the RFT is ready for publication after an initial submission for review, the selection to return the RFT may be skipped.

The publication CRPI 312 may include program instructions that are executable to cause an RFT to be stored in the RO/RFT database 106 as a published RFT. Storing the RFT in the RO/RFT database 106 as a published RFT may include storing the RFT in a portion of the RO/RFT database 106 designated for storing published RFTs and deleting the RFT from a portion of the RO/RFT database 106 for storing unpublished RFTs. Additionally or alternatively, storing the RFT in the RO/RFT database 106 as a published RFT may include storing data, associated with the RFT, that indicates the RFT is published.

The RO sorting CRPI 314 may include program instructions that are executable to identify repairable item information and to use the repairable item information to select an RO group in which a received RO should be included. If the RO group does not exist, the processor 202 may generate the RO group within the RO/RFT database 106. As an example, identifying the repairable item information may occur by the processor 202 reading text from a computer-readable RO. As another example, identifying the repairable item information may occur by receiving the information at the user interface 206. For embodiments in which the repairable item is a vehicle, the information may include YMM, YMME, or YMMES.

The DPM CRPI 316 may include program instructions that are executable to cause components of DPM 200 other than the processor 202 to carry out various functions. As an example, processor 202 may execute DPM CRPI 316 to (i) receive data transmitted to the network transceiver 204 via a network link, (ii) cause the network transceiver 204 to transmit data across a network link, (iii) store data into the CRM 208, (iv) logon to a website on the Internet to access an RO or an RFT from the RO/RFT database 106, (v) presenting data, such as an RO or RFT, via the user interface 206, and (vi) receiving data entered via the user interface 206.

The component or system mapping CRPI 318 may include program instructions that are executable to map a component of the vehicle or a symptom exhibited by the vehicle to an RFT. The component or system mapping CRPI 318 may be executed while an RFT is being generated. Generating the RFT may include populating the search criteria, used to locate an RO group for which the RFT is being generated, into the RFT. Executing the component or system mapping CRPI 318 may allow a component or symptom of the search criteria that was populated into the RFT to be changed. In that regard, a component or system populated into the RFT may be deleted from the RFT. A different component of system may be selected, e.g., from a list of components and symptoms, to replace the deleted component or symptom.

The RO mapping CRPI 320 may include program instructions that are executable to compare contents of an unmapped RO to mapping terms, standard terms, context terms, or data record fields, and to generate a searchable database record associated with the RO or a mapped RO. In one respect, the RO mapping CRPI 320 may be executed for each RO as that RO is received or shortly (e.g., within one minute or within one hour) after that RO is received by the RO collector DPM 104 or the RO/RFT database 106. In another respect, the RO mapping CRPI 320 may be executed for a group of RO at a designated time per day, per week, per month, or per year. A processor may refer to a schedule to determine the designated time(s) and then execute the RO mapping CRPI 320 upon occurrence of the designated time(s).

The phrase selection CRPI 322 may include program instructions that are executable to search phrase data based on an RO term (e.g., one or more RO terms) pertaining to a service-operation described on a computer-readable RO and to select a phrase that is associated with the RO term. The phrase data may be arranged like phrase data 1916 stored in a CRM (see FIG. 23). Phrase selection CRPI 322 may be executed at various times such as at a time before the computer-readable RO is selected for displaying at a DPM or in response to the computer-readable RO being selected for displaying at a DPM. The phrase selection CRPI 322 may be executed by the processor 202 in the RFT generation DPM 108 to generate an RFT.

For embodiments in which the RFT DPM 15, the RFT display DPM 17, the RO collector DPM 104, the RFT generator DPM 108, the coordinator DPM 110, or the RO distributor DPM 112 is configured as the DPM 200, the CRPI 212 in those DPM may include one or more of the CRPI of CRPI suite 300, but the CRPI 212 is not so limited as the CRPI 212 for any one or more of those DPM may include other CRPI as well. Table 1 illustrates CRPI usage for the RFT DPM 15, the RFT display DPM 17, the RO collector DPM 104, the RFT generator DPM 108, the coordinator DPM 110, and the RO distributor DPM 112. In Table 1, "Yes" indicates the CRPI is used in that DPM, whereas "No" indicates that the CRIP is not used in that DPM. Any one of the example DPM, or even the RO/RFT database 106, may include each CRPI of CRPI suite 300.

TABLE 1

| DPM | CRPI (302) | CRPI (304) | CRPI (306) | CRPI (308) | CRPI (310) | CRPI (312) | CRPI (314) | CRPI (316) | CRPI (318) | CRPI (320) | CRPI (322) |
|---|---|---|---|---|---|---|---|---|---|---|---|
| DPM (15) | Yes | Yes | Yes | Yes | Yes | Yes | Yes | Yes | Yes | Yes | Yes |
| DPM (17) | Yes | Yes | Yes | Yes | Yes | Yes | Yes | Yes | Yes | Yes | Yes |
| DPM (104) | Yes | Yes | No | No | No | No | Yes | Yes | No | Yes | Yes |
| DPM (108) | Yes | Yes | Yes | Yes | No | No | No | Yes | Yes | Yes | Yes |
| DPM (110) | Yes | Yes | No | No | Yes | Yes | No | Yes | Yes | Yes | Yes |
| DPM (112) | Yes | Yes | Yes | No | No | No | No | Yes | No | Yes | Yes |

IV. Example GUI

A processor within a DPM, such as the RFT DPM 15, the RFT display DPM 17, the RO display DPM 114, the RFT generator DPM 108, or the coordinator DPM 110, may execute the CRPI 212 to display a GUI on the display 214 to allow for selection of a vehicle and complaint. Those selections may be used when searching for an RO or an RFT.

Figure 8:
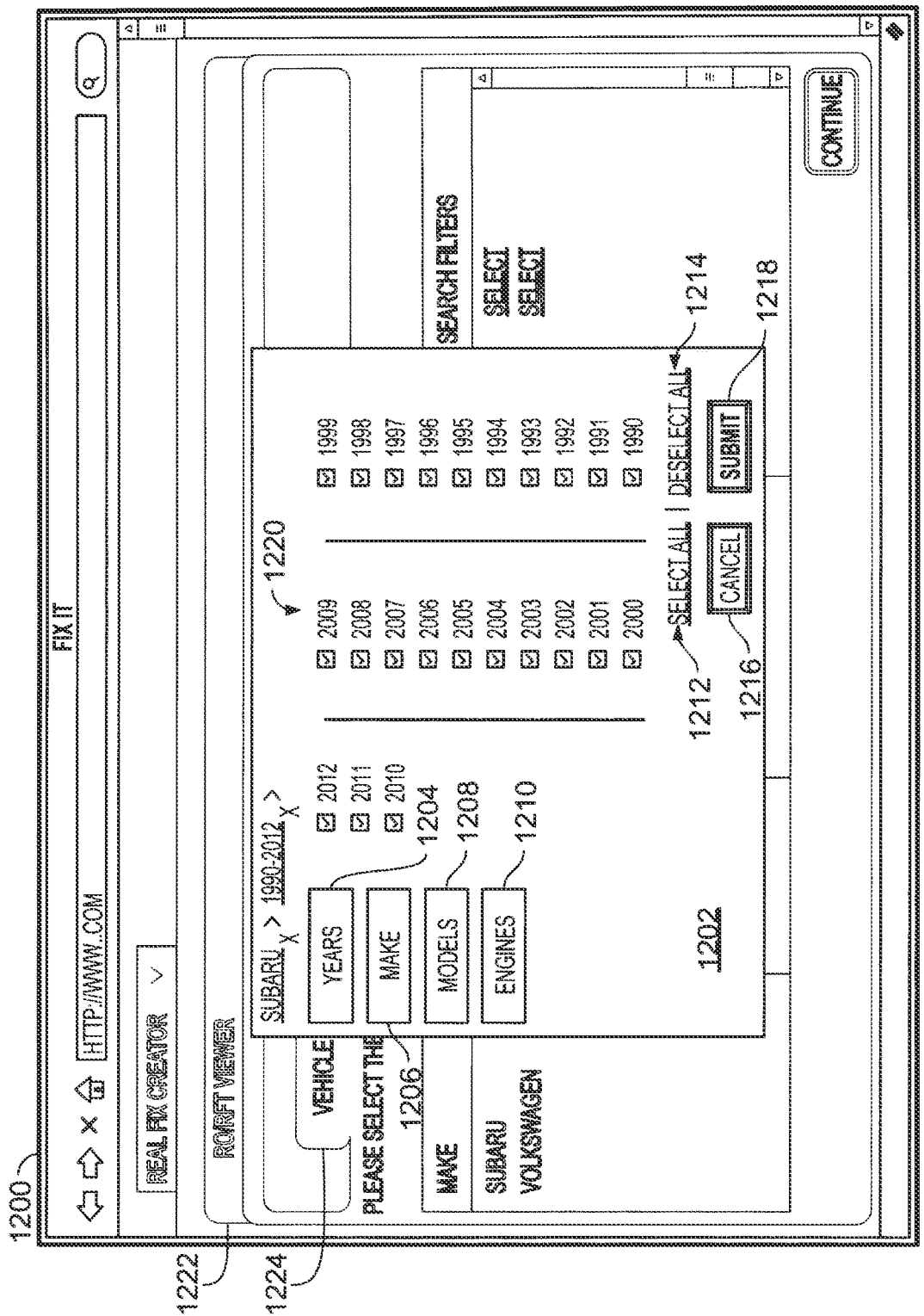
Figure 9:
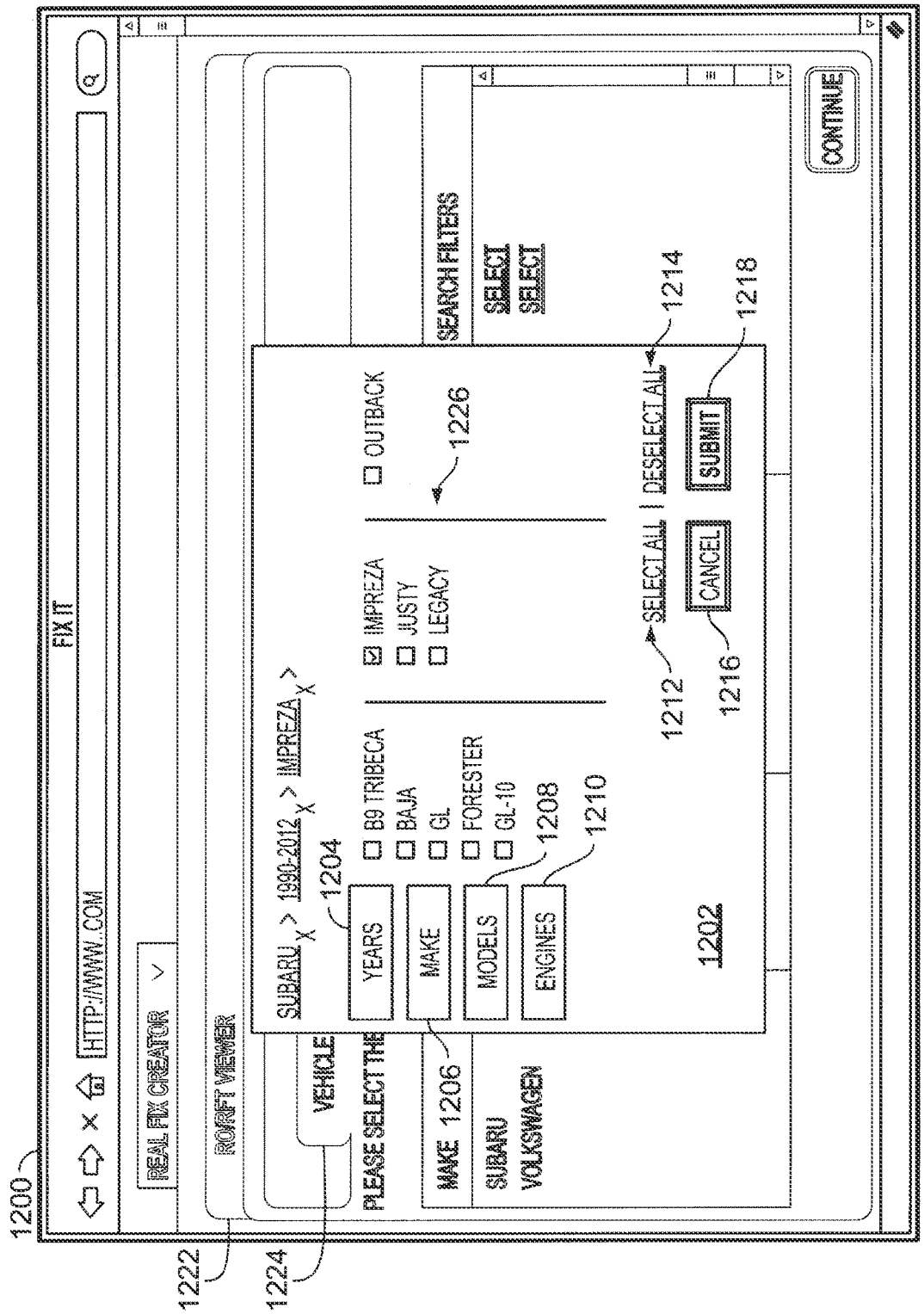
Figure 10:
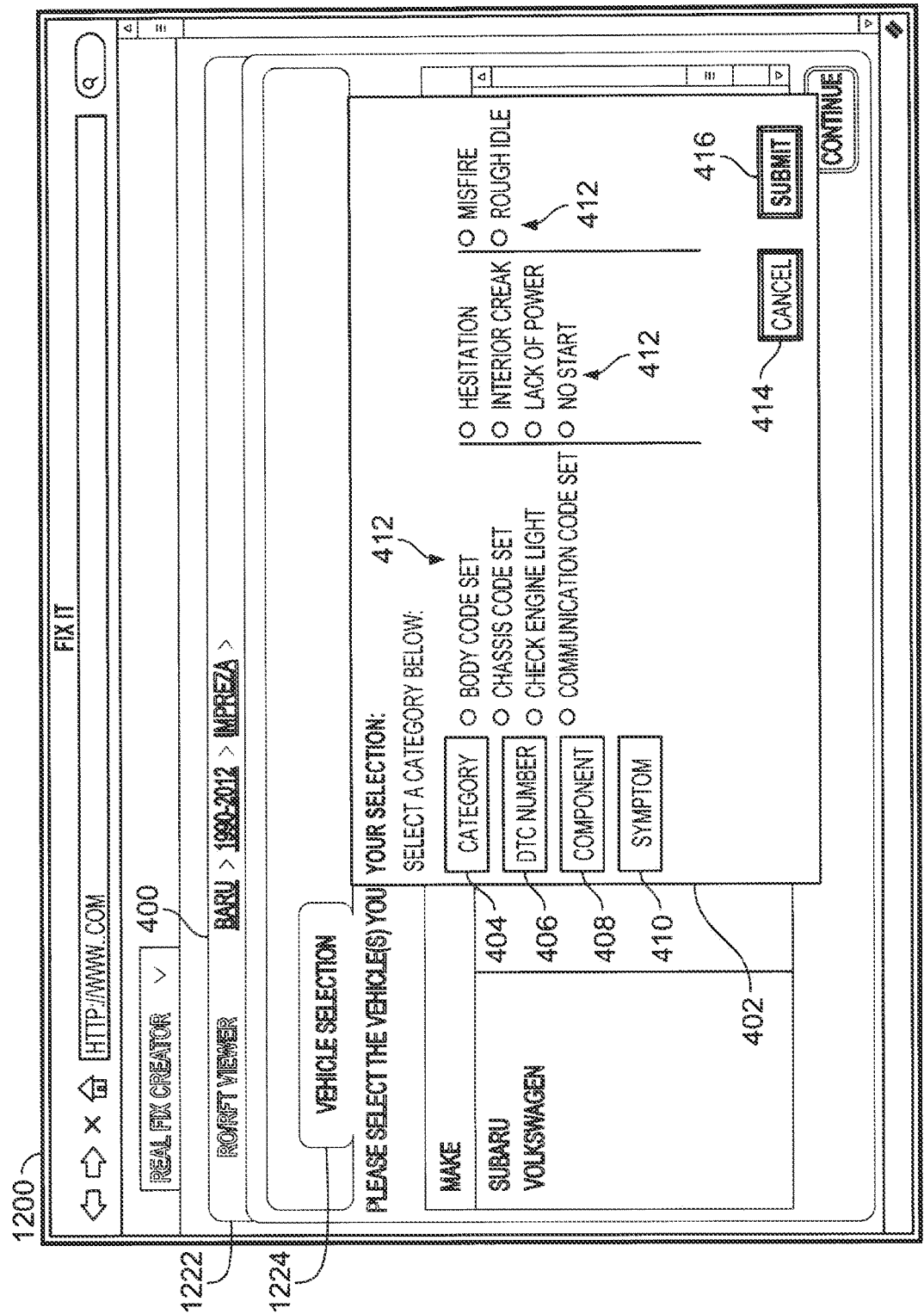

FIG. 8, FIG. 9, and FIG. 10 show an example GUI 1200 that may be displayed on the display 214. The GUI 1200 may be referred to as a filter selection GUI. A filter selection GUI may display one or more selection windows for selecting filter criteria. The filter criteria selected using the filter selection GUI may be used to search the RO/RFT database 106 to locate an RO, an RO group comprising RO that include data matching at least a portion of the selected filter criteria, or an RFT. The GUI 1200 may include an RO/RFT viewer-display 1222, a selection-tab 1224 to select filter criteria pertaining to a vehicle, and a filter-selection window 1202 (e.g., a pop-up window or viewer).

As shown in FIG. 8, a filter-selection window 1202 may include window selectors 1204, 1206, 1208, and 1210 and model year selectors 1220 for the model years 1990 through 2012. The model year selectors 1220 may include more or fewer years or different years than shown in FIG. 8. The filter-selection window 1202 may include a multi-selector 1212 to select, using a single selection, all of the filter criteria currently selectable individually via the filter-selection window 1202. The filter-selection window 1202 may include a de-selector 1214 to de-select, using a single selection, all filter criteria presently selected via the filter-selection window 1202. The filter-selection window 1202 may include a cancel selector 1216 to close the filter-selection window 1202 prior to submitting any filter criteria for searching the RO/RFT database 106, and a submit selector 1218 to enter selected filter criteria (such as model year, vehicle make, vehicle model, or engine identifier) for searching the RO/RFT database 106.

Selection of a window selector 1204, 1206, 1208 or 1210 may cause the filter-selection window 1202 to change from displaying first selectable filter criteria to displaying second selectable filter criteria. The remainder of this paragraph describes the selectable filter criteria that may be displayed upon selection of a window selector 1204, 1206, 1208 or 1210. Selection of the window selector 1204 may cause the filter-selection window 1202 to display the selectable model years selectors 1220. Selection of the window selector 1206 may cause the filter-selection window 1202 to display selectable vehicle make identifiers, such as Subaru, Toyota, Ford, Chevrolet, and Cadillac. Selection of the window selector 1208 may cause the filter-selection window 1202 to display selectable vehicle model identifiers, such as the selectable model identifiers 1226 shown in FIG. 9. Selection of the window selector 1210 may cause the filter-selection window 1202 to display selectable engine indicators that indicate engines used by a vehicle manufacturer. The engine identifiers may include an engine displacement size, such as 5.7 Liter (L), or an orientation, such as V6, inline 6, or V8.

FIG. 10 shows the GUI 1200 displaying the RO/RFT viewer-display 1222, the selection-tab 1224, filter criteria indicators 400, and a filter selection-window 402 to select additional filter criteria. As filter criteria are selected using the filter-selection window 1202 or the filter selection-window 402, the selected filter criteria may be presented using the filter criteria indicators 400. As shown in FIG. 10, the filter criteria indicators 400 indicate the following filter criteria have been selected: a vehicle make (Subaru), model years (1990-2012), and a vehicle model (Impreza). In accordance with example embodiments in which the repairable item is an item other than a vehicle, the selection-tab 1224 may indicate a selected repairable item other than a vehicle, and the category selection-window 402 may present selectable filter criteria associated with the repairable item rather than filter criteria associated with a vehicle.

The filter-selection window 402 may include filter-criteria category selectors 404, 406, 408, and 410. Selection of one of those selectors may cause category the selection-window 402 to display filter criteria selectable for searching the RO/RFT database 106. The filter criteria displayed using the category selection-widow 402 after selecting the category selector 404 may include vehicle systems within the selected vehicle, such as a vehicle braking system, a heating, ventilation and air conditioning (HVAC) system, an engine emissions system, a fuel system, a check engine light system or some other vehicle system. The filter criteria displayed using the category selection-widow 402 after selecting the category selector 406 may include diagnostic trouble code (DTC) numbers (such as P0149) with or without a description of the DTC numbers (such as Fuel Timing Error). The filter criteria displayed using the category selection-widow 402 after selecting the category selector 408 may include component identifiers of components located on, at, or within a selected vehicle. The filter criteria displayed using the category selection-widow 402 after selecting the category selector 410 may include symptom that may be exhibited in or by a selected vehicle. An example set of symptoms 412 that may be exhibited in or by the selected vehicle is shown in FIG. 10 within the filter-selection window 402.

The filter-selection window 402 may include a cancel selector 414 to close the filter-selection window 402 prior to submitting, using the filter-selection window 402, any filter criteria for searching the RO/RFT database 106, and a submit selector 416 to enter filter criteria, selected using the filter-selection window 402, for searching the RO/RFT database 106. Similar to the filter-selection window 1202, the filter-selection window 402 may include a multi-selector to select, using a single selection, all of the filter criteria currently selectable individually via the filter-selection window 402. Similar to the filter-selection window 1202, the filter-selection window 402 may include a de-selector 1214 to de-select, using a single selection, all filter criteria presently selected via the filter-selection window 1202.

Figure 11:
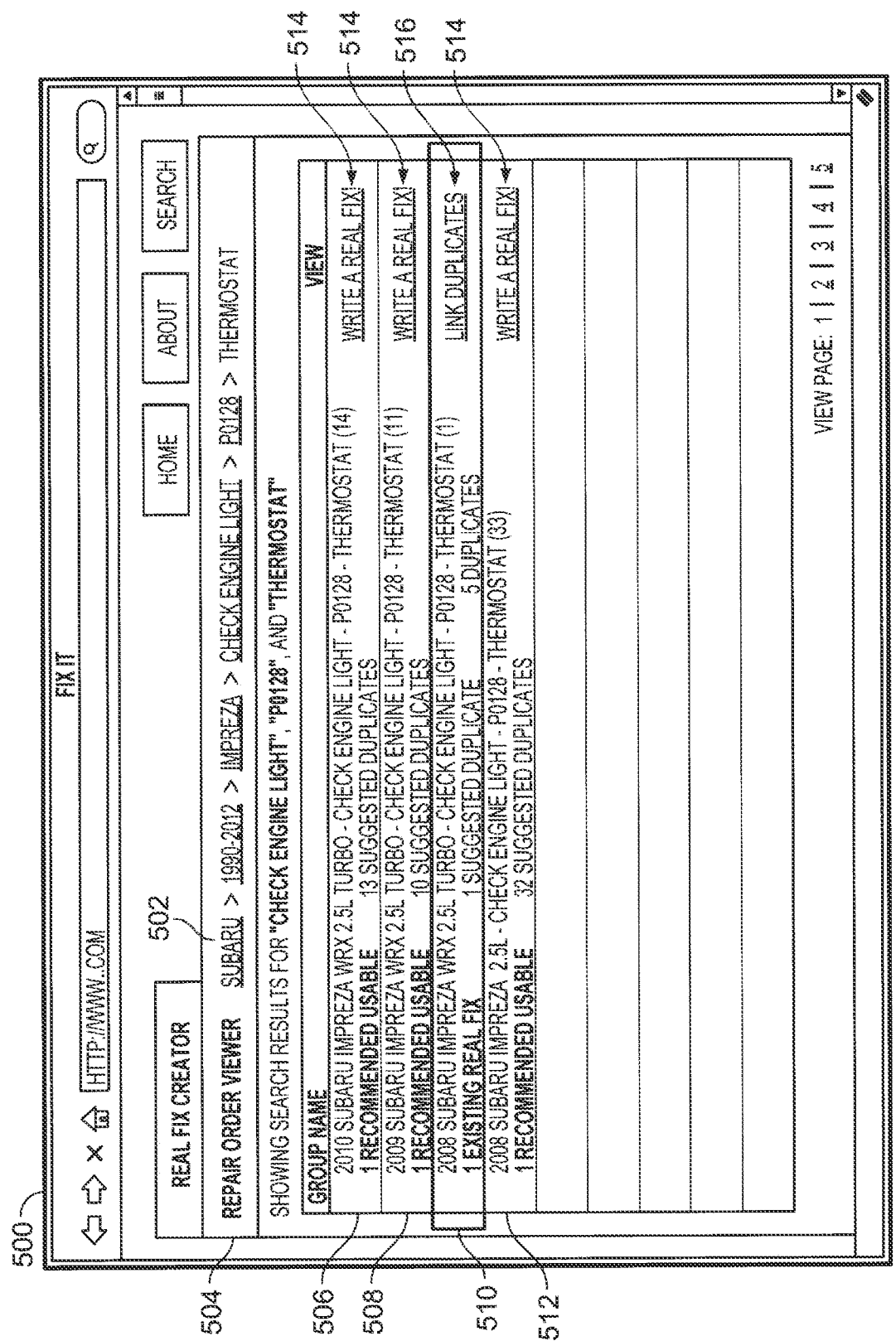
Figure 12:
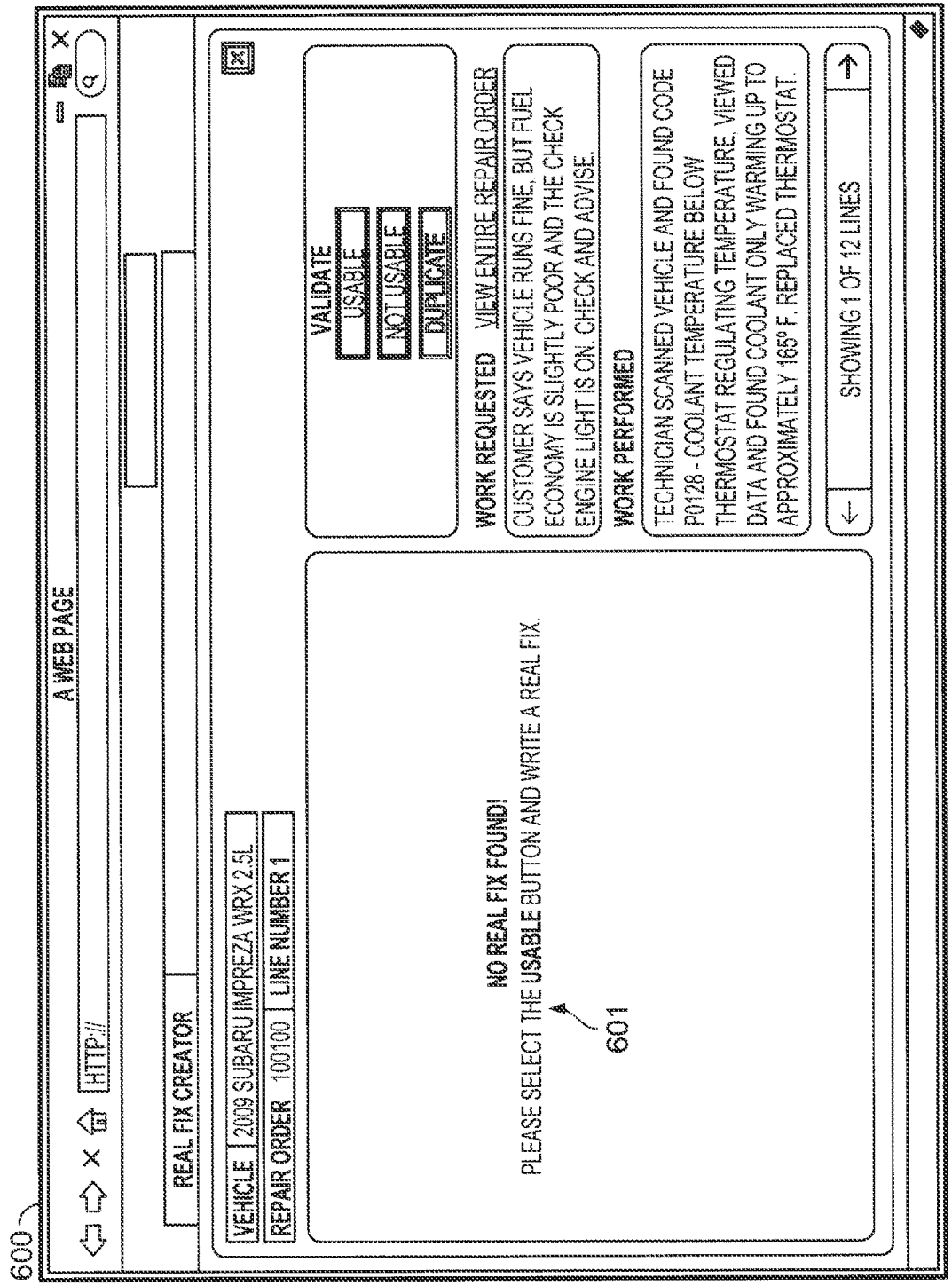

Next, FIG. 11 shows a GUI 500 in accordance with example embodiments in which four RO groups 506, 508, 510, and 512 were located during a search of the RO/RFT database 106 for search criteria comprising a vehicle make (Subaru), model years (1990-2012), a vehicle model (Impreza), a symptom (check engine light), a DTC (P1028), and a component (Thermostat). The RO groups 506, 508, and 510 are for Subaru Impreza WRX with 2.5 L turbocharged engine, model year 2010, 2009, and 2008, respectively. The RO group 512 is for Subaru Impreza with a 2.5 L non-turbo charged engine.

The GUI 500 may display a number of RO discovered for each RO-group during a search of the RO/RFT database 106. In FIG. 11, those numbers are shown in parenthesis. For instance thirty-three (33) RO were located for RO group 512. In accordance with an embodiment in which the RO provider DPM 102 includes multiple RO providers located throughout the United States and Canada, thirty-three distinct RO providers could each have provided one of the thirty-three RO located for the RO group 512. Alternatively, a single RO provider could have provided more than one of the thirty-three RO.

The GUI 500 may display indication that a recommended usable RO or an existing RFT has been located, and may display a number of suggested duplicate RO. If no suggested duplicate RO, recommended usable RO, or existing RFT is located for an RO group, the displayed RO group may indicate quantities of those items as "zero" or "0." The GUI 500 may also display a number of RO that have already been classified as duplicate RO. For instance, the GUI 500 indicates that five duplicate RO were located within the RO/RFT database 106 for the RO group 510.

The GUI 500 provides an interface to select an RO Group. In FIG. 11, selection interfaces 514 (Write a Real Fix) may be used to select an RO group in which an RFT has not yet been generated for the RO of that RO Group or for the RO discovered for the given search criteria used to locate the RO Group. Selecting an RO group via a selection interface 514 may cause the display 214 to display a GUI 600 (shown in FIG. 12) with a message 601 prompting a user to enter an RFT since no RFT was found for the selected RO group. In FIG. 11, a selection interface 516 (Link Duplicates) may be used to select an RO Group in which an RFT has been generated for the RO of that RO Group or for the RO discovered for the given search criteria used to locate the RO Group.

Duplicate RO lines within an RO group may be linked to an existing RFT. Doing so may increase the value of information available to repair technicians that access RO from the RO/RFT database 106. Multiple repair scenarios for a set of symptoms entered to search the RO/RFT database 106 may be retrieved from the RO/RFT database 106 and presented to the RO display DPM 114 or the RFT display DPM 17. Each of the repair scenarios may be a confirmed repair scenario from a usable or duplicate RO. This may be beneficial to a technician since the technician may weigh possible outcomes and probabilities of multiple repair scenario for the symptoms the repairable item, the technician is working on, is experiencing.

Figure 13:
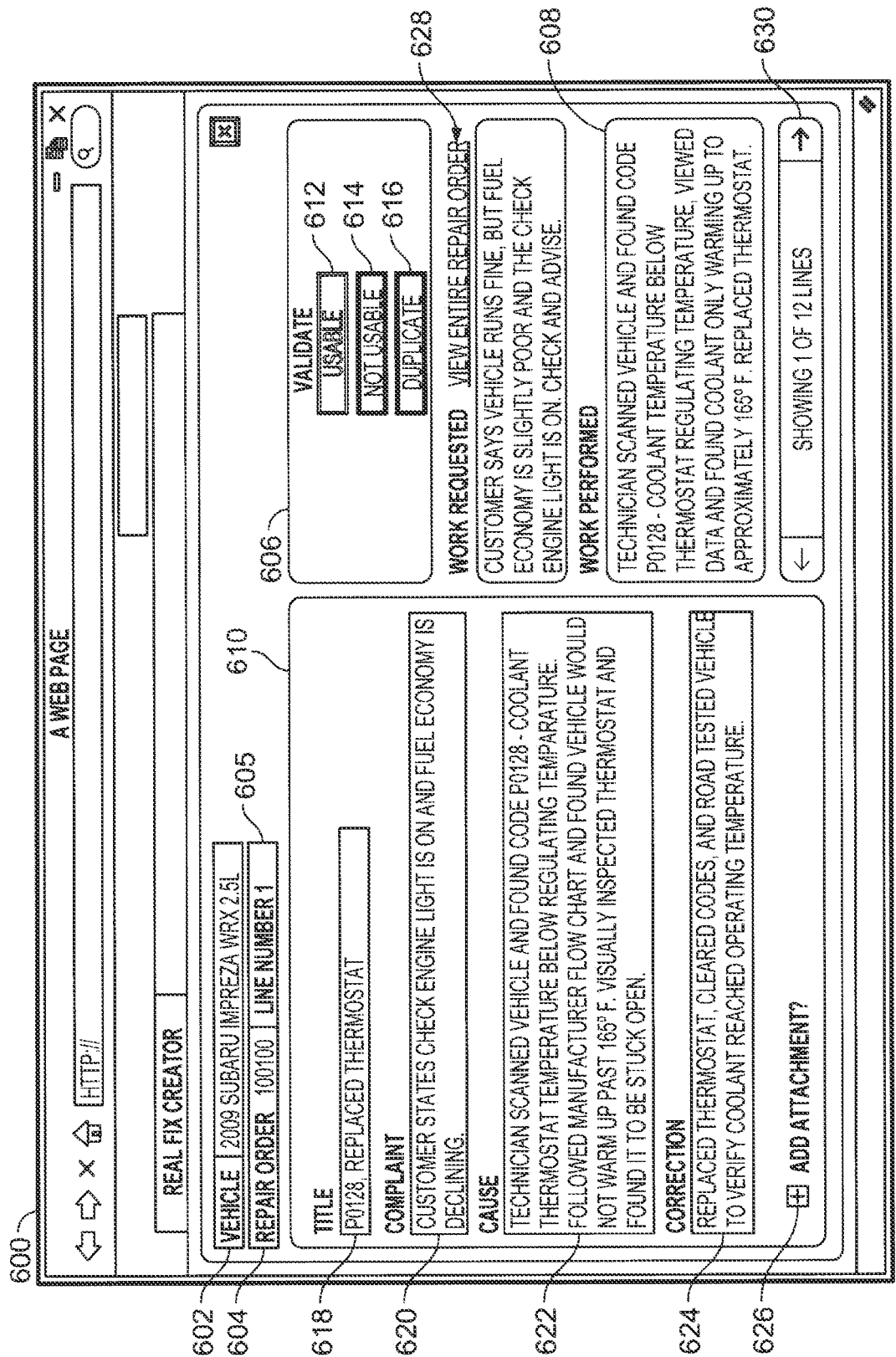

Next, FIG. 13 shows the GUI 600 in accordance with one or more of the example embodiments described herein. The GUI 600 may be referred to as an RFT creation GUI. The GUI 600 may include a repairable item description 602, an RO identifier 604, a line identifier 605, a validation selection area 606, an RO information area 608, and a text entry area 610. The GUI 600 may be used to enter text to generate an RFT or to generate at least a portion of the RFT. Search criteria for a given RO group may be included as part of the RFT or associated with the RFT.

The RFT may be associated with a subject RO. A subject RO may be stored within and retrieved from the RO/RFT database 106. For purposes of this description, a subject RO is an RO identified by the RO identifier 604 or the RO from which information is presented in the RO information area 608. In the latter, the information presented in the RO information area 608 may be service-operation information within a distinct section of the subject RO. To distinguish between multiple sections of subject ROs, each distinct section comprising service-operation regarding distinct service requests may be assigned a unique RO line number, or more simply a "line" or "line number." The assigned line number may be displayed at the line identifier 605. A single RO may be assigned one or more RO line numbers.

The GUI 600 may include a line selector 630 to cause the display 214 to switch between the RO within an RO group or between lines on a single RO. By way of example, the line selector 630 indicates "1 of 12" where the "1" indicates a first RO line among a number of RO lines within an RO group, and the "12" indicates the number of RO lines within the RO group.

A DPM in the system 100 may rank the RO lines within an RO group based on likelihood of each RO line being most suitable for generating an RFT, and the DPM may position the RO lines within the RO group according to that ranking. In accordance with at least some embodiments, an RO line displayed by the GUI 600 when the line selector 630 displays a low first number, in comparison to an RO line displayed by the GUI 600 when the line selector 630 display a greater first number, is more likely to be suitable for generating an RFT.

The likelihood of generating an RFT from an RO line may be based on a number of characters describing "work requested" or "work performed." A data record field, referred to below as "Field S," may be compared to similar fields to determine the likelihood of generating an RFT. In alternative embodiments, some or all of the line numbers of an RO group are not ranked. The line selector 630 may be used to select a next RO within the RO group. Selection of the next RO may occur after a validation selection from the validation selection area 606 occurs.

The repairable item description 602 describes a vehicle, in particular, a 2009 Subaru Impreza WRX 2.5 L, wherein "2009" is a model year of the vehicle, "Subaru" is a manufacturer of the vehicle, "Impreza WRX" is a model identifier for the vehicle, and "2.5 L" is an engine identifier for the vehicle. The repairable item description 602 may describe repairable items other than a vehicle. Information, other than model year, manufacturer, model identifier, or engine identifier, may be used to describe the other types of repairable items.

The RO information area 608 may include information that was entered onto the subject RO. The information entered onto the subject RO may include "Work Requested" and "Work Performed." As an example, a technician that worked on the repairable item or a service manager at a repair location may enter the information onto an RO. The RO information provided to the RO/RFT database 106 from the RO collector DPM 104 may indicate which information on the RO represents the "Work Performed" and which information represents the "Work Requested." An RO may include multiple Work Requested and Work Performed sections. Each pair of Work Requested and Work Performed sections may be identified as distinct lines on the RO.

The RO information area 608 may be arranged in various configurations. In addition to displaying the "Work Requested" and the "Work Performed" described on the subject RO, the RO information area 608 may include a selector 628 "View Entire Repair Order" that is selectable to view the subject RO in its entirety. The selector 628 may be a hyperlink. Selecting the selector 628 may cause the processor 202 to retrieve and display the subject RO or the subject RO line. In one respect, the retrieved and displayed RO may be an original un-mapped RO. In another respect, the retrieved and displayed RO may be a mapped RO that includes one or more standard terms that replaced one or more non-standard terms of the original un-mapped RO.

Retrieving the subject RO may include retrieving an SQL file or XML file that embodies the subject RO. Alternatively, retrieving the subject RO may include retrieving an image of the subject RO from the RO/RFT database 106. The display 214 may display the subject RO or subject RO line retrieved from the RO/RFT database 106. Another selector (not shown), displayed with the subject RO or the subject RO line, may be selected to cause the display 214 to switch from displaying the subject RO or subject RO line to displaying the GUI 600.

The validation selection area 606 includes the following validation selections: a usable RO selection 612, a non-usable RO selection 614, and a duplicate RO selection 616. The GUI 600 may receive a validation selection for a subject RO. A validation selection, selected for the subject RO, may be provided to the processor 202 for storing in the RO/RFT database 106 as a validation selection associated with the subject RO. A data record field, such as Field S described below, may record the validation selection.

Selecting the usable RO selection 612 for the subject RO may cause the GUI 600 to transition from a mode for selecting a validation selection to a mode for entering text to generate an RFT for the subject RO. That transition may include the display 214 switching from displaying the GUI 600 to displaying a GUI 800 (shown in FIG. 15). In accordance with one or more of the example embodiments, the usable RO selection 612 may be un-selectable if the processor 202 determines that the subject RO is a recommended duplicate RO for which an been generated.

Selecting the duplicate RO selection 616 for the subject RO may cause the GUI 600 to transition from the mode for selecting a validation selection to a mode for selecting a previously-generated RFT to associate with the subject RO. That transition may include the display 214 switching from displaying the GUI 600 to displaying the GUI 700 (shown in FIG. 14). In accordance with some example embodiments, the duplicate RO selection 616 may be un-selectable if the processor 202 determines that an RFT has not yet been generated for the subject RO or for any other RO within an RO Group including the subject RO.

Selecting the non-usable RO selection 614 for the subject RO may cause the processor 202 to store data that indicates the subject RO is not usable for the search criteria entered to locate the subject RO. Additionally, the processor 202 may cause the display 214 to transition from displaying the GUI 600 to displaying the GUI 1200 so that another subject RO may be selected for determining whether to classify the other subject RO as a usable RO, duplicate RO, or non-usable RO.

In accordance with at least some example embodiments, classifying the subject RO as a non-usable RO prevents the subject RO from being presented in search results of a search of the RO/RFT database 106 using the search criteria that were used to locate the subject RO, after the subject RO was classified as non-usable for those search criteria. However, if the subject RO includes multiple RO lines with distinct service-operation information, then selecting the non-usable RO selection 614 may cause the RO line with non-usable service-operation information to be classified as a non-usable RO line rather than classifying the entire RO as a non-usable RO. One or more other RO lines on that subject RO may include usable service-operation information.

The text entry area 610 may be arranged in any of a variety of configurations. In accordance with an example embodiment in which the subject RO pertains to a vehicle, the text entry area 610 may include a title text entry box 618 for entering a title for an RFT, a complaint text entry box 620 for entering text to identify a complaint for the RFT, a cause text entry box 622 for entering text to identify a cause for the RFT, a correction text entry box 624 for entering text to identify a correction for the RFT, and an attachment selector 626 for selecting to enter an attachment (e.g., a document saved in a portable document format (PDF)) for the RFT. Entering the complaint, cause and correction into the text entry area 610 may be referred to as entering real fix information as a 3C's real fix. A person skilled in the art will understand that the text entry area 610 may include one or more different text entry boxes for subject RO that pertain to repairable items other than vehicles. Text entered into a text entry box may be populated into a field of an RFT.

Figure 14:
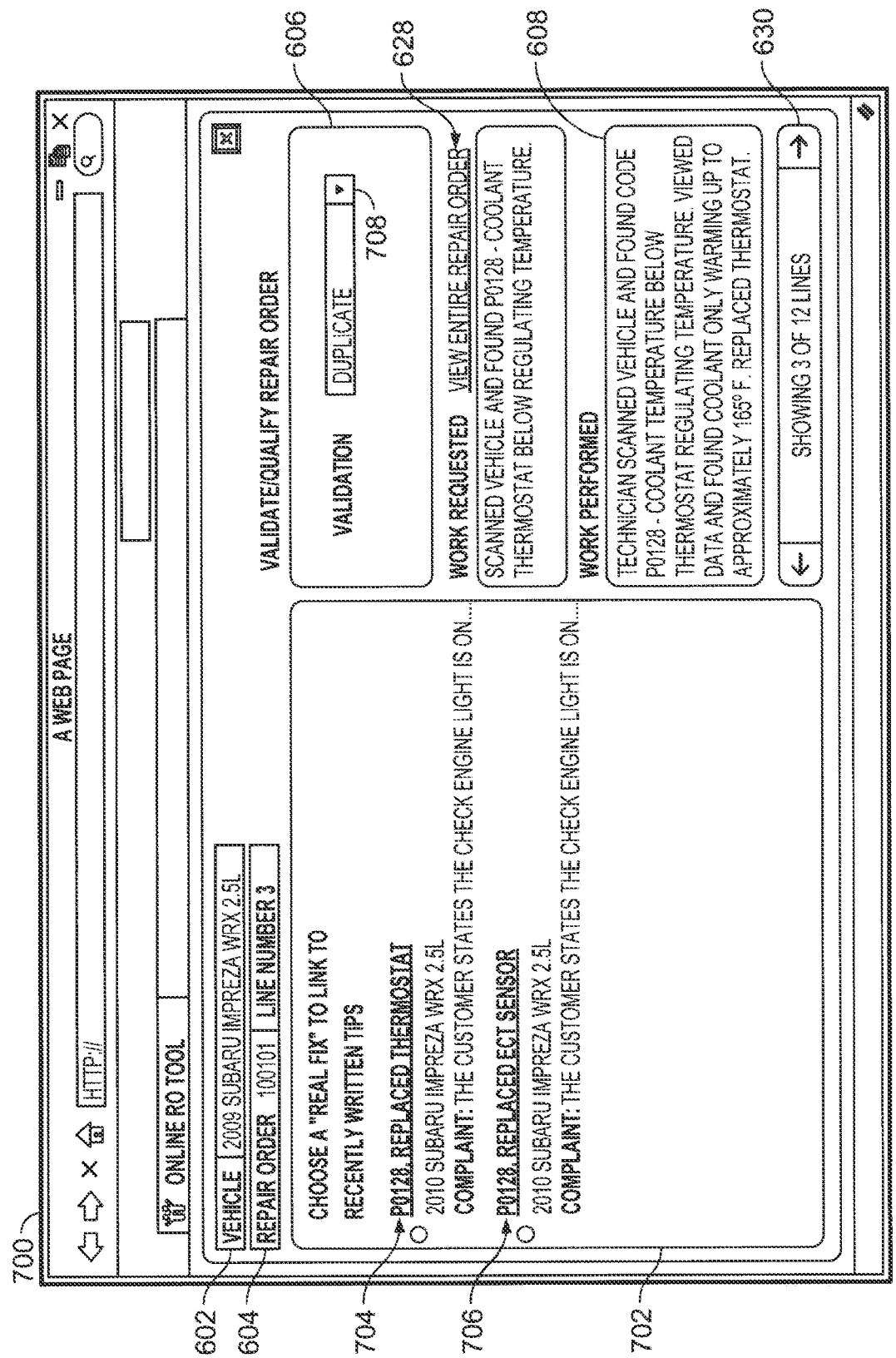

Next, FIG. 14 shows a GUI 700 in accordance with example embodiments in which a subject RO or a subject RO line was classified as a duplicate RO (e.g., by selecting the duplicate RO selection 616 for the subject RO or subject RO line). The GUI 700 includes an RFT selection area 702, and the validation selection area 606 may include a drop-down box 708 from which a validation selection may be selected.

The RFT selection area 702 includes selectable RFTs 704 and 706. A portion of each of those RFTs may be displayed. Alternatively, no portion of the RFTs or the entire RFTs may be displayed within RFT selection area 702. Either of the RFTs 704 and 706 may be selected to view the entire RFT prior to one of those two RFTs being selected as an RFT to associate with the subject RO. The processor 202 may receive a selection of an RFT and cause the RO/RFT database 106 to associate the subject RO with the selected RFT. As an example, each RFT may include or be associated with an identifier, such as a numeric identifier. The RO/RFT database 106 may store the RFT identifier along with the subject RO in order to associate the subject RO with the selected RFT. As an example, the RFT identifier may be stored in Field I of a data record associated with the subject RO.

As shown in the RO information area 608, the Work Performed Area indicates that a thermostat was replaced. The RFT 704 states P1028, Replaced Thermostat. Therefore, the RFT 704 may be an appropriate RFT for the subject RO 100101. The RFT 704 may be selected for display by the display 214 prior to confirming that the entirety of RFT is appropriate for associating with the subject RO.

Figure 15:
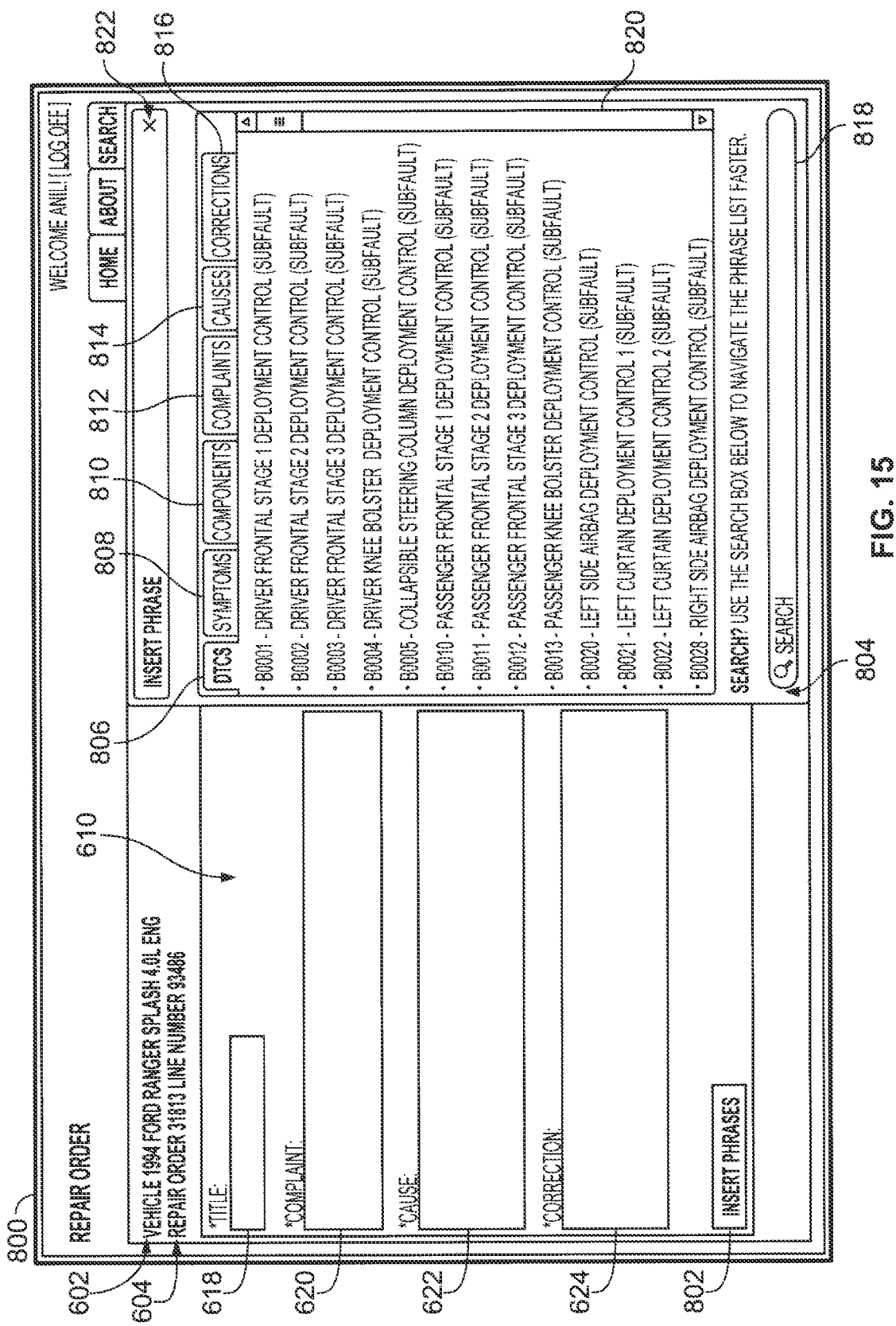

Next, FIG. 15 shows a GUI 800 in accordance with one or more example embodiments in which a subject RO was classified as a usable RO (e.g., by selecting the usable RO selection 612 for the subject RO). By way of example, the subject RO shown in FIG. 15 is assigned RO number 31813 and line number 93486, and pertains to a 1994 Ford Ranger Splash with a 4.0 L engine. GUI 800 may display RO that pertain to other repairable items.

The GUI 800 includes an insert phrases selector 802 that, upon selection, causes the display to display an insert phrases area 804 (e.g., a pop-up window on or within the GUI 800). The insert phrases area 804 may include standard phrases that are selectable from a standard phrase list (SPL) to fill out various fields in the text entry area 610.

The insert phrases area 804 may include multiple standard phrase lists (SPLs). Those SPLs may include a diagnostic trouble codes (DTCs) SPL 806, a symptoms SPL 808, a components SPL 810, a complaints SPL 812, a causes SPL 814, and a corrections SPL 816. The insert phrases area 804 may include a search box 818 for faster navigation of an SPL, a slider bar 820 to scroll up or scroll down an SPL displayed by insert phrases area 804, and an SPL exit selector 822 to cause the processor 202 to stop displaying the insert phrases area 804. The SPLs of the insert phrase area 804 may be populated with phrases stored within phrase data 1916 (shown in FIG. 21).

The DTCs SPL 806 may include standard DTC descriptions of DTCs settable by or within a repairable item. In FIG. 15, the GUI 800 is shown displaying standard DTC descriptions of DTCs ranging from B0001 to B0028. Standard DTC descriptions of other DTCs settable by or within the repairable item may be displayed by using the slider bar 820. Any one or more of those standard DTC descriptions displayed by the GUI 800 may be selected for entry into a field of the text entry area 610. As an example, the standard description of DTC B0011 may be selected for placement into the complaint text entry box 620.

Selecting a standard phrase for placement into a text entry box of the text entry area 610 for each subject RO that pertains to common repairable items having a common complaint may be beneficial to users of the system 100. One such benefit is that an increased number of RO are associated with a common complaint. A search of the RO/RFT database 106 using the common complaint as search criteria may lead to finding more RO in the RO/RFT database 106 that match the search criteria.

Figure 16:
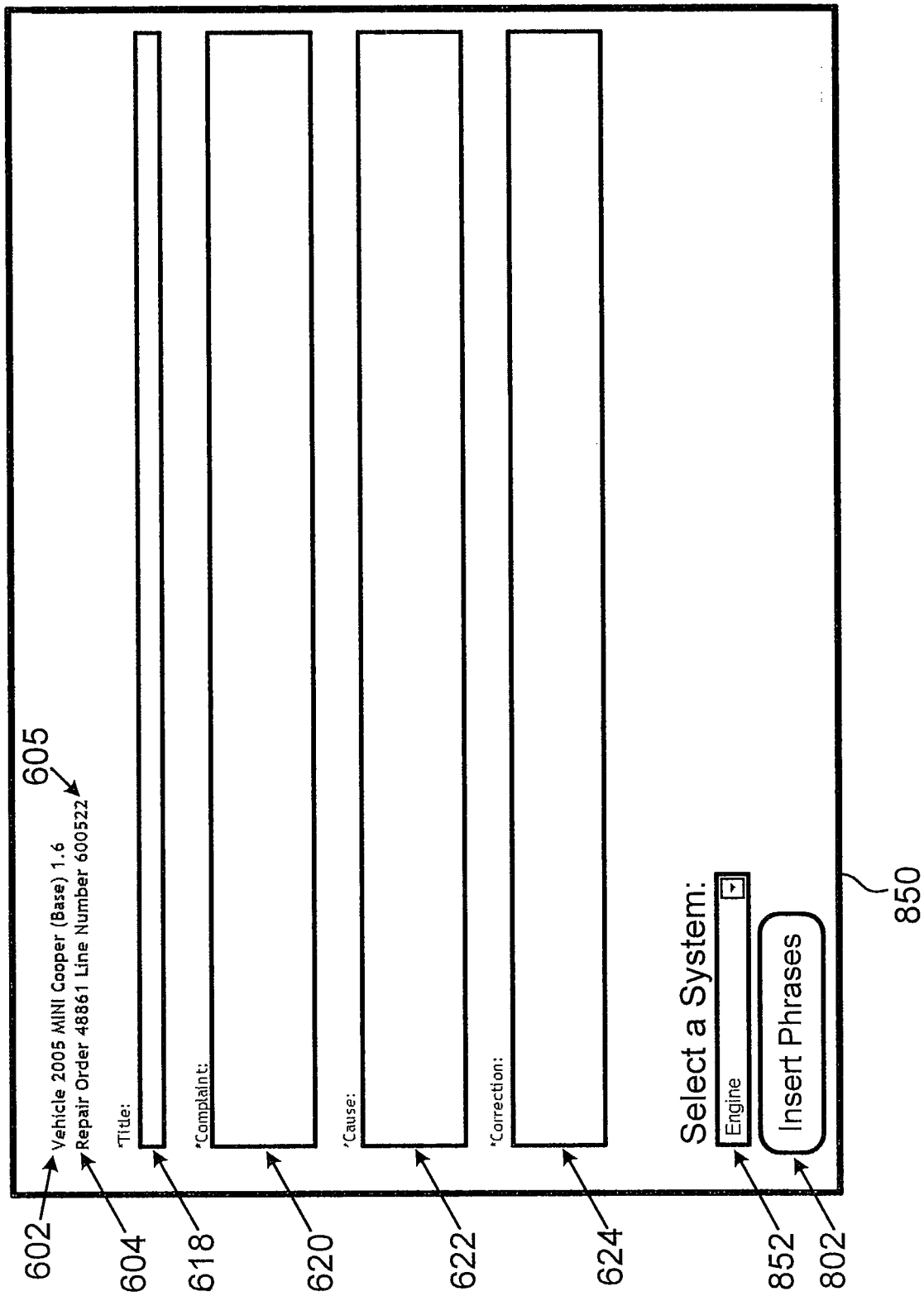
Figure 17:
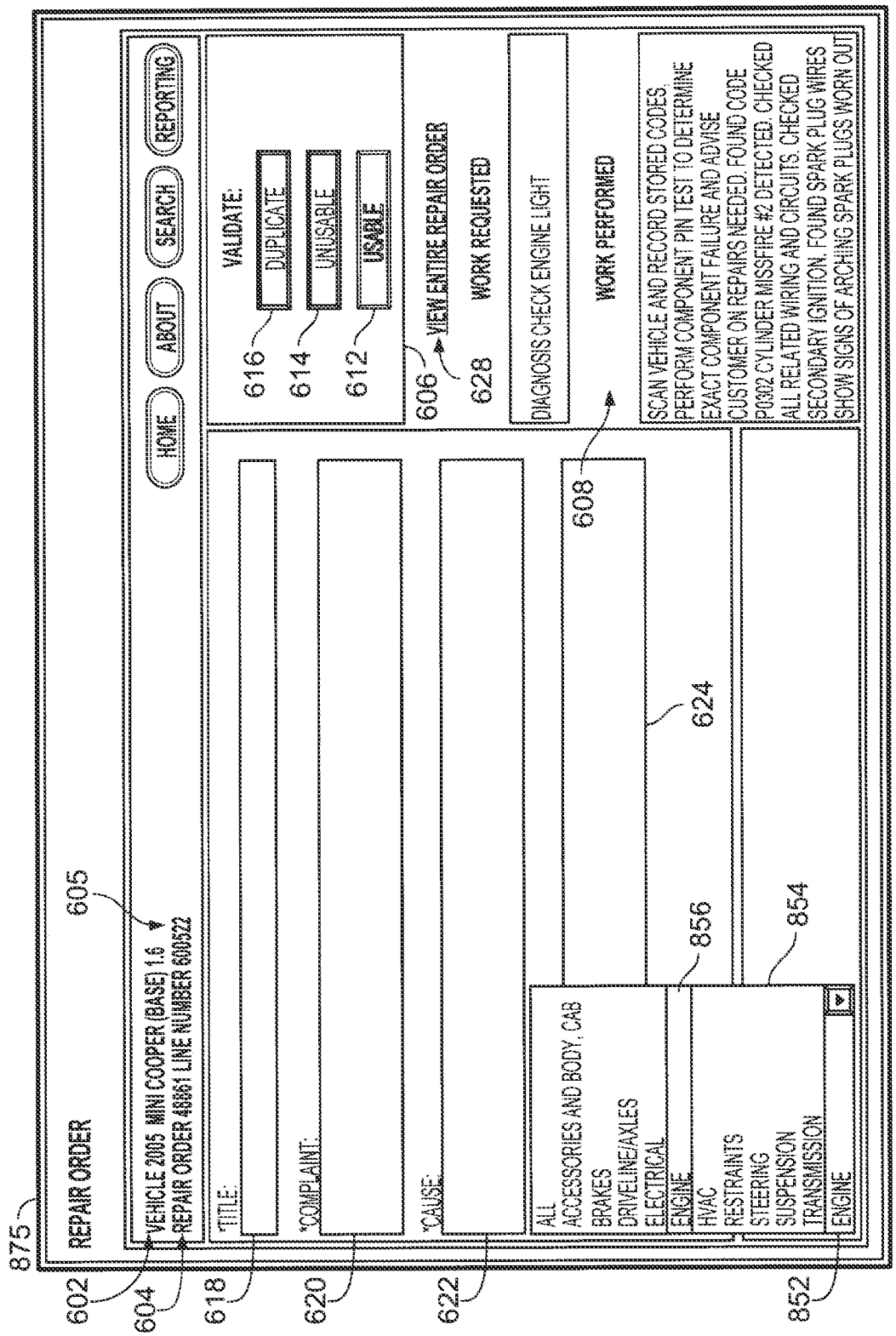

Next, FIG. 16 and FIG. 17 show a GUI 850 and a GUI 875, respectively, in accordance with one or more example embodiments in which an RO was classified as a usable RO. Those GUI display a subject RO that is assigned RO number 48861 and a line number 600522, and that pertains to a 2005 Mini Cooper (Base) with a 1.6 L four cylinder engine. Other RO may also be displayed by the GUI 850 or the GUI 875.

The GUI 850 includes a system selector 852. The system selector 852 may present selectable systems using a pop-up window or using some other arrangement, such as a set of check boxes. A system selected using the system selector 852 may be used to classify an RFT entered via the GUI 850. The system classification may indicate a publication class of RFTs under which the RFT should be published. FIG. 17 shows example publication classes other than engine. The GUI 850 also includes the repairable item description 602, the RO identifier 604, the line identifier 605, the title text entry box 618, the complaint text entry box 620, the cause text entry box 622, the correction text entry box 624, and the insert phrases selector 802. The GUI 850 may include other elements of the GUI 600, but those elements are not shown in FIG. 16.

The GUI 875 includes the system selector 852 and a pop-up window 854 presenting selectable systems. The selector 216 may trigger a selector bar 856 to move up or down within the pop-up window 854 to select a system. The GUI 875 also includes the repairable item description 602, the RO identifier 604, the line identifier 605, the validation selection area 606, the RO information area 608, the usable RO selection 612, the non-usable RO selection 614, the duplicate RO selection 616, the title text entry box 618, the complaint text entry box 620, the cause text entry box 622, the correction text entry box 624, and the selector 628. The GUI 875 may also include user navigation selectors, such as the "Home," "About," "Search," and "Reporting" selectors shown in the upper-right corner of the GUI 875.

Returning to FIG. 11, the GUI 500 may display numbers that indicate how many RO or RO lines are within each RO group. In FIG. 11, those numbers are shown within parenthesis. For example, eleven RO or RO lines are within the RO group 508. After validating each RO or RO line within an RO group, the validated RO group or an RFT generated for the RO group may be submitted for review and publishing. Submission of the RO group or the RFT may occur in various ways. For example, submission of the RO group may occur automatically when the validation selection of the last RO within the RO group is selected. As another example, a GUI, such as the GUI 500, 600, 700, 800 or 900, may include a submit-RO-group selector (not shown). The RO groups that have been submitted for review, but not yet published for presenting to the RO display DPM 114, may be shown on a GUI displayable at the coordinator DPM 110. A coordinator may select an RO group from that GUI in order to review a real-time fix or validation selections for RO within the selected RO group. That review may include displaying a quality control (QC) GUI.

The coordinator DPM 110 may display a cancel-submission selector on a GUI to allow a fix-generator to cancel submission of the RO group for review and publication. Use of the cancel-submission selector may be used if the fix-generator determines the need to revise a validation selection or the RFT for a submitted RO group. Canceling submission of a submitted RO group may cause that RO group to be returned to the RFT generator DPM 108 for revising by a fix-generator.

Figure 18:
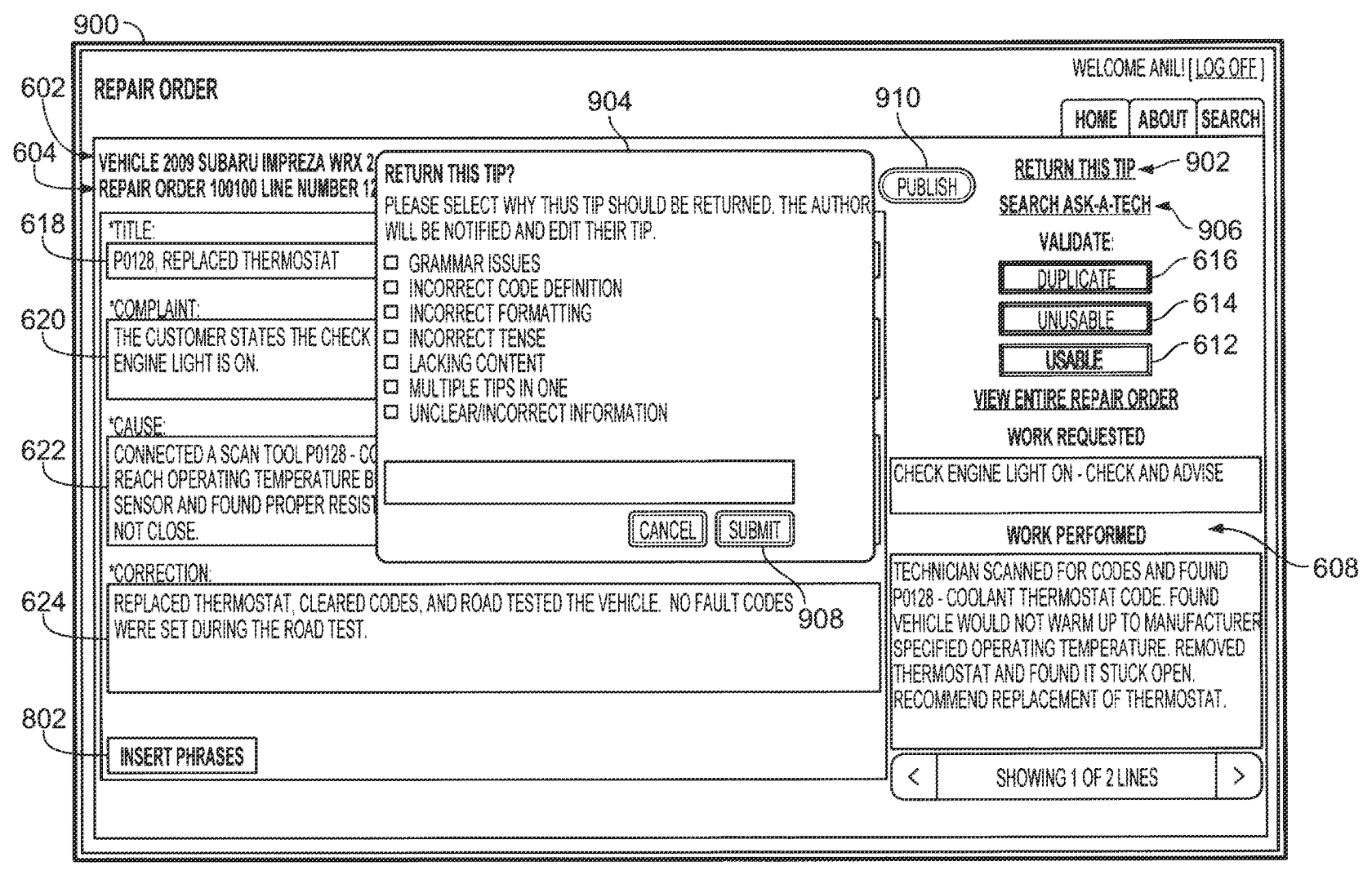

Next, FIG. 18 shows an example QC GUI 900 in accordance with one or more example embodiments described herein. The QC GUI 900 may be used for reviewing RFTs prior to the tips being published for presentation to the RFT display DPM 17 or the RO display DPM 114. The QC GUI 900 is not so limited though as it could be configured for reviewing RFTs after publication. A coordinator may be a person other than the person that generated the RFT using the system 100. The QC GUI 900 may display the fields of the text entry area 610 and the text entered into the fields.

The QC GUI 900 may include one or more of the validation selections, such as the usable RO selection 612, the non-usable RO selection 614, and the duplicate RO selection 616. Selecting the usable RO selection 612 for an RFT displayed by the QC GUI 900 may cause the processor 202 to associate that RFT with the subject RO or a group of RO including the subject RO. In accordance with one or more example embodiments, an RFT that has been selected, using the QC GUI 900, as a usable RO may be classified as a published RFT. Published RFTs may include RFTs that are presentable to the RFT display DPM 17 or the RO display DPM 114.

In addition to publishing the RFT, the subject RO and any duplicate RO of the subject RO may be published along with the RFT. For instance, if an RFT is published for the RO group 510, the RFT and each RO of the RO group 510 may be published concurrently with the RFT.

Selecting the non-usable RO selection 614 for an RFT displayed by the QC GUI 900 may cause a reviewer comment area 904 to become active. The reviewer comment area 904 may be within a pop-up window overlaid over a portion of the QC GUI 900. The reviewer comment area 904 is shown to have selectable pre-authored reasons why the RFT should be returned for revising the RFT. Spontaneous reasons may be entered using an Add Comment area of the reviewer comment area 904. Reasons other than the reasons shown in FIG. 18 or the Add Comment area may be included to input reasons why the RFT should be returned for revisions. Upon entering one or more reasons for returning an RFT prior to publication, a submit selector 908 may be selected to submit the reasons and to cause the subject RO or a group of RO including the subject RO to be returned to a person that generated the RFT along with a request to revise the RFT or to another fix-generator.

The RFT generator DPM 108 may generate, for display using the display 214, an RFT revision GUI (not shown) that identifies RFTs that have been returned from a coordinator using the QC GUI 900. The RFT revision GUI may display the reasons why the RFT was returned by a QC coordinator and text entry areas for revising the RFT. The RFT revision GUI may include a selector to re-submit the RFT for review using the QC GUI 900.

Selecting the duplicate RO selection 616 for an RFT displayed by the QC GUI 900 may cause the RFT to be flagged as an RFT to be compared to another RO associated with an RFT. In use, a coordinator (e.g., a reviewer) of the displayed RFT may suspect that an RFT has already been generated for another RO having data similar to the data in the text entry area 610 for the displayed RFT and a similar repairable item. The QC GUI 900 may include a search selector 906 to search for, among other things in the RO/RFT database 106, previously-entered RFTs. The search selector 906 may be referred to as a "Search Ask-a-Tech" selector, but is not so limited. In accordance with one or more of the example embodiments, the RFT generator DPM 108 may be configured to present a selector that allows a user to select the previously-generated RFT or the duplicate RFT as a tip to use for the subject RO and other RO duplicates of the subject RO.

The GUI 900 may include a publish selector 910 for entering a selection to publish the RFT. The publish selector 910 may cause the RFT to be stored in the RO/RFT database 106 as a published RFT, or data indicating the RFT is a published RFT.

V. Displayable Pages for Real-Fix Tips

Figure 27:
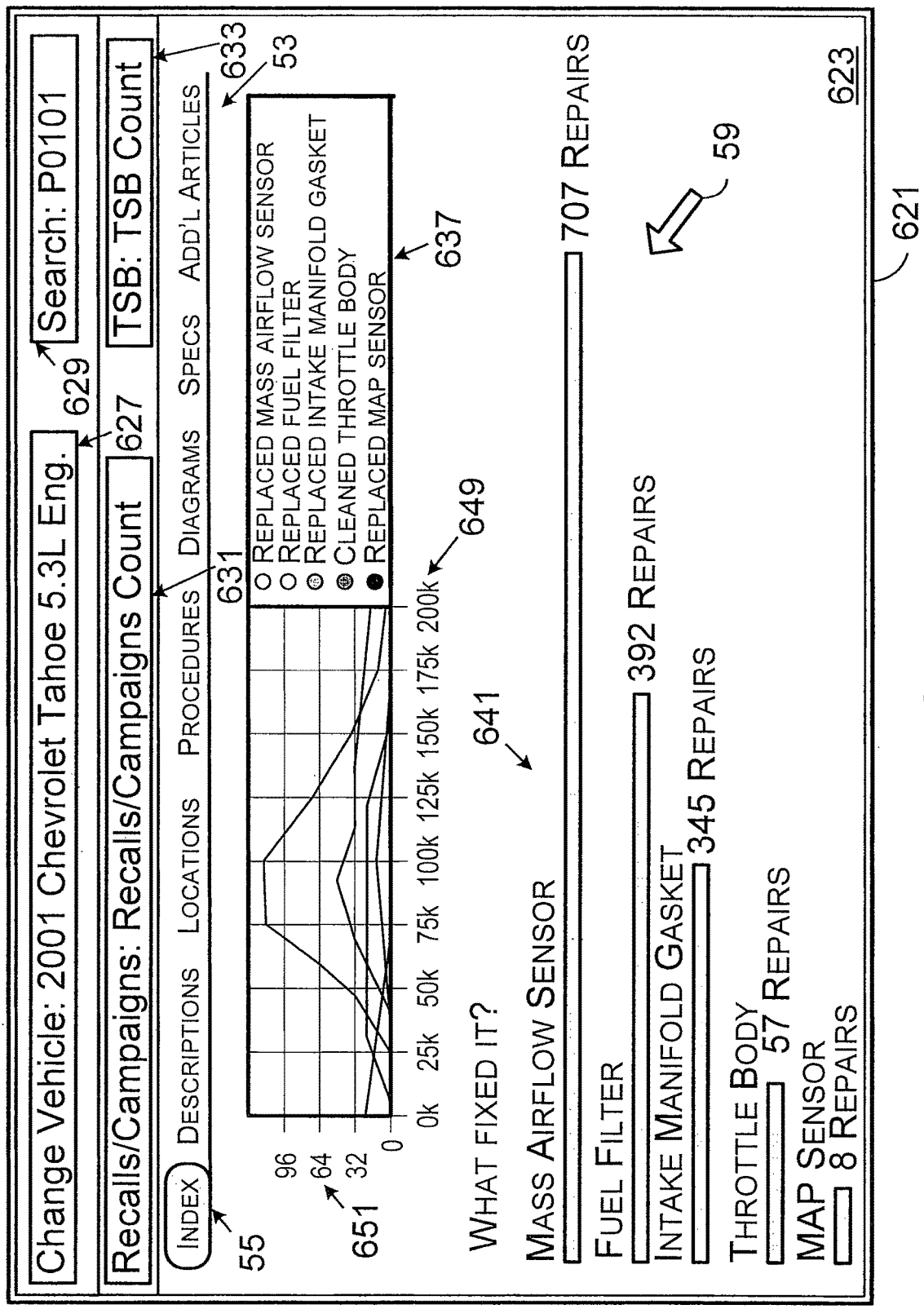
FIGS. 27 and 28 show displayable pages pertaining to real-fix tips.
Figure 28:
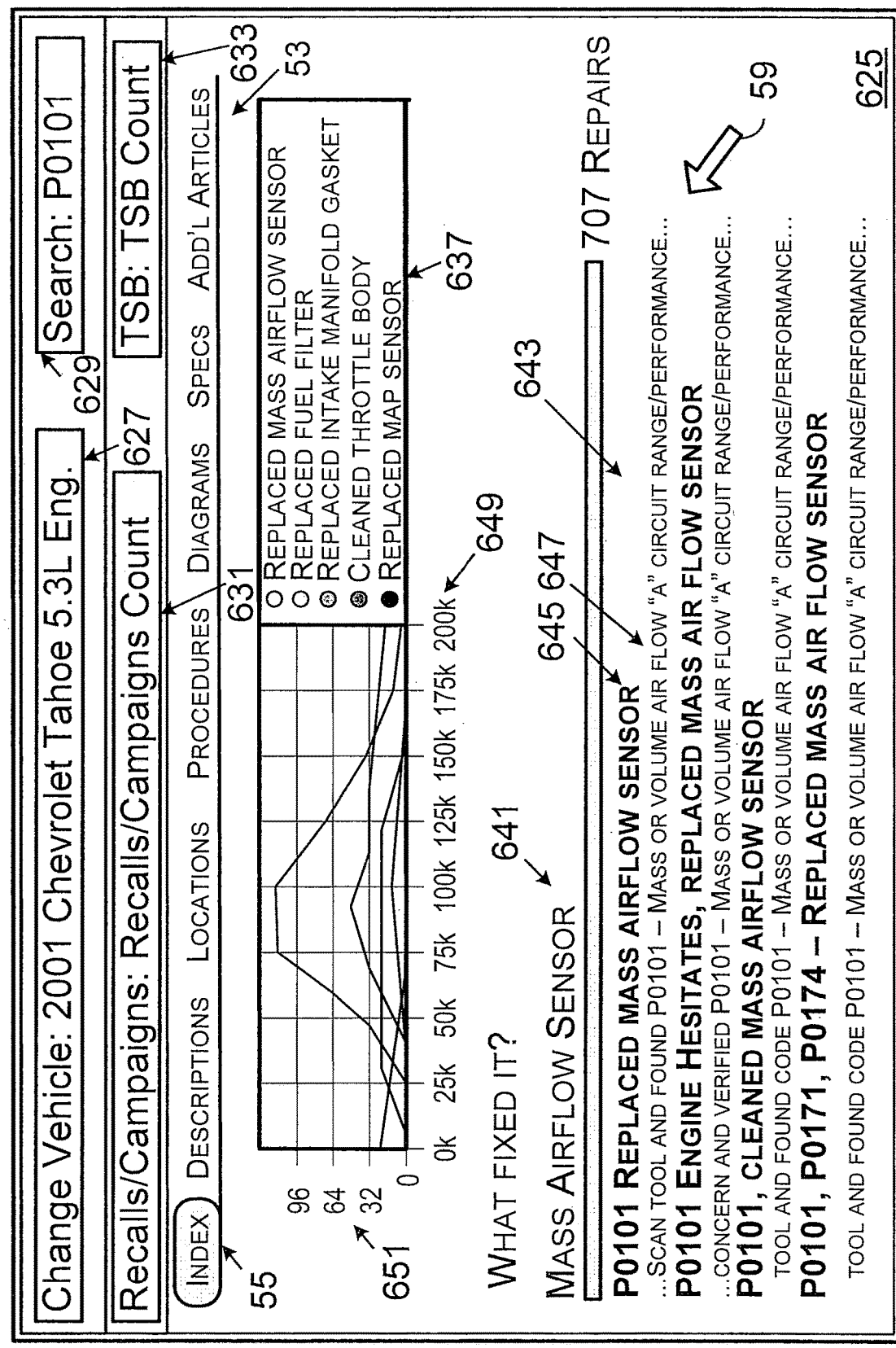

Next, FIGS. 27 and 28 show displayable pages pertaining to real-fix tips. FIGS. 27 and 28 show a display 621 (e.g., the display 214 in FIG. 6) displaying displayable pages 623 and 625, respectively. The displayable pages 623 and 625 include a vehicle search box 627 in which a vehicle identifier in the form of a YMM, YMME, YMMES vehicle identifier or in another form may be entered for searching for an RFT. The displayable pages 623 and 625 include a symptom search box 629 in which at least one of a vehicle symptom (e.g., a DTC or a term describing a vehicle symptom such as engine hesitates) and a component (e.g., mass airflow sensor) may be entered for searching for the RFT. The displayable pages 623 and 625 include the selector 59 to select or point to the items displayed on the displayable pages 623 and 625.

The displayable pages 623 and 625 include a recall display 631 and a bulletin display 633. After entering a vehicle and symptom (e.g., DTC P0101) as search criterion in the vehicle search box 627 and the search box 629 respectively, the RFT display DPM 17 may transmit a search request based on the search criterion and in response receive a list of components that were previously serviced to resolve the symptom on the vehicle, a list or quantity of recall or campaign notices from an OEM of the vehicle and pertaining to the vehicle and symptom, and a list or quantify of technical service bulletin (TSB) from an OEM of the vehicle and pertaining to the vehicle and symptom. The quantity of recall or campaign notices may be displayed in the recall display 631. The quantity of TSB may be displayed in the bulletin display 633. The selector 59 may be used to select the recall display 631 and the processor 202 may update the displayable page 623 or 625 to display the list of recall or campaign notices. The selector 59 may be used to select the bulletin display 633 and the processor 202 may update the displayable page 623 or 625 to display the list of TSB.

In another respect, after entering a vehicle and component (e.g., coil) as search criterion in the vehicle search box 627 and the search box 629 respectively, the RFT display DPM 17 may transmit a search request based on the search criterion and in response receive a list of symptoms on vehicles that were previously serviced to resolve the symptom (e.g., by servicing the searched component), a list or quantity of recall or campaign notices from an OEM of the vehicle and pertaining to the vehicle and component, and a list or quantify of technical service bulletin (TSB) from an OEM of the vehicle and pertaining to the vehicle and component.

In yet another respect, after entering a vehicle and a symptom and component as search criterion in the vehicle search box 627 and the search box 629 respectively, the RFT display DPM 17 may transmit a search request based on the search criterion and in response receive a list of symptoms or components on vehicles that were previously serviced to resolve the symptom (e.g., by servicing the searched component), a list or quantity of recall or campaign notices from an OEM of the vehicle and pertaining to the vehicle, symptom, and component, and a list or quantify of technical service bulletin (TSB) from an OEM of the vehicle and pertaining to the vehicle, symptom, and component.

The displayable pages 623 and 625 include the set of tabs 53 and the current tab 55 indicating which tab is currently selected or being displayed. In FIGS. 27 and 28, the "INDEX" tab is currently selected and displayed. In one respect, the displayable pages 623 and 625 may be displayed only under the INDEX tab. In another respect, the displayable pages 623 and 625 may be displayed under the INDEX tab or at least one other tab of the set of tabs 53.

The displayable pages 623 and 625 may include one or more graphical representations pertaining to the search criteria. For example, the displayable pages 623 and 625 include a graph 637 showing quantities of various components 651 with respect to distances 649 vehicle have been driven when a service-operation was performed on those components. As an example, the distances may be miles or kilometers. As another example, the displayable page 623 includes a bar chart 641 showing various component names of components previously serviced on vehicles matching the searched vehicle. The bar chart 641 is shown unexpanded in FIG. 27 such that more component names may be displayed on the displayable page 623. The component names may be listed in sequence from greatest to lowest quantity of service-operations or in another manner. The selector 59 may be used to select a component name within the bar chart 641. FIG. 28 shows that the mass airflow sensor component name has been selected such that the bar chart is expanded to show a list of RFT 643 corresponding to the selected component. The list of RFT 643 may include a title 645 of each RFT and text 647 from at least one of the complaint, cause or correction fields of each RFT. The ranking of RFT based on quantities of service-operations may be displayed without using a bar chart. For example, the ranking of RFT may be textual or a different type of graph such as a pie chart or histogram. A textual ranking may include text such as:

Mass Airflow Meter . . . 1000 Fixes—View Real Fixes
Fuel Filter . . . 0.33 Fixes—View Real Fixes
Intake Manifold Gasket . . . 25 Fixes—View Real Fixes,
where the underlined text is a pointer selectable by the selector 59 expand the list of RFT to display details of the RFT as shown in the following example text that may be displayed on the display 214.

Mass Airflow Meter . . . 1000 Fixes—View Real Fixes
P0101, Replaced Mass Airflow Sensor
. . . scan tool and found code P0101—Mass or Volume . . . .
P0101, Engine hesitates, Replaced Mass Airflow Sensor
. . . concern and verified P0101,—Mass or Volume . . . .
Fuel Filter . . . 0.33 Fixes—View Real Fixes
Intake Manifold Gasket . . . 25 Fixes—View Real Fixes.

The selector 59 may select an RFT from the RFT list 643 to cause the RFT display device 17 to display the selected RFT. Displaying the RFT in response to selecting the RFT from the RFT list may include the RFT display DPM displaying the title, complaint, cause, and correction fields of the RFT. Displaying the RFT in response to selecting the RFT from the RFT list may include displaying an RFT augmented with pointers to additional content (as shown in FIG. 1).

V. Example Operation

A. RFT Generation

FIG. 25 shows a flowchart depicting a set of functions 250 (or more simply "the set 250") that may be carried out in accordance with the example embodiments described in this description. The set 250 includes the functions shown in blocks labeled with whole numbers 251 through 256 inclusive. The following description of the set 250 refers to items shown in other figures of this description, but the functions of the set 250 are not limited to being carried out only by those items. A number of methods may be performed using all of the functions shown in the set 250 or any proper subset of the functions shown in the set 250. Any of those methods may be performed with other functions such as one or more of the other functions described in this description. Each or any function of the set 250 that is performed by the processor 202 may include the processor executing the CRPI 212, such as the program instructions within the CRPI suite 300. The CRPI 212 may include program instructions to perform each and any function of the set 250.

Block 251 includes determining, by at least one processor 202 for generating a RFT pertaining to a complaint and a vehicle, first text describing at least one of a cause of the complaint and how the cause for the complaint was discovered, and second text describing a service-operating performed on the vehicle to resolve the complaint. As an example, the processor 202 of the RFT DPM 15 may determine the complaint and the vehicle from a GUI, such as the GUI 1200. For this example, a user may enter the vehicle and complaint via the GUI 1200. As another example, the processor 202 of the RFT DPM 15 may determine the complaint and the vehicle from a group of RO, such as a group of mapped RO pertaining to a common vehicle type and a common complaint, and stored in the mapped RO 1902. For this example, the processor 202 may determine that the group of RO includes at least a threshold number of RO. Use of threshold provides a way ensure RFT are generated for vehicles and complaints that occur more often. As an example the threshold number of RO may be 100, 1000, 10,000 or some other number of RO.

The vehicle determined by the at least one processor 202 may be a vehicle indicated by a YMM, a YMME, or a YMMES. The YMM, YMME, or YMMES may be determined by a VIN entered into the GUI 1200. Additionally or alternatively, the YMM, YMME, or YMMES may be determined from the group of RO having a common complaint.

Block 252 includes determining, by the at least one processor 202, at least one of (i) first additional content relevant to the complaint, the vehicle, and a portion of the first text, and (ii) second additional content relevant to the complaint, the vehicle, the cause, and a portion of the second text.

The processor 202 may execute the search CRPI 302 to search the content database 13 based on at least the complaint, the vehicle, and the portion of the first text to determine whether the content database 13 includes additional content relevant to the complaint, the vehicle, and the portion of the first text. In a first case, a result of the search is that no additional content was located. In a second case, a result of the search is that additional content was located within the content database 13. The result in the second case may include a pointer to the additional content located during the search. The processor 202 may store the pointer for generation of a first RFT including the pointer. As an example, the content located during the search may include one or more of an image, a measurement instruction executable by a data processing machine to perform a measurement (e.g., a voltage, current or resistance measurement), a vehicle data request executable by the data processing machine to request data (e.g., PID values) from the vehicle, and a textual test description.

Block 253 includes generating, by the at least one processor 202, a first RFT, wherein the first RFT includes a first file comprising the first text, the second text, and a respective pointer to the at least one of the first additional content and the second additional content. Each pointer may include a hyperlink within the first file. The first file may be arranged as an extensible markup language (XML) file or as a different type of markup language file.

The first RFT may include other items in addition to the first file. For example, the first RFT may include metadata. The metadata may include information how to display the first RFT. Such information may be configured as a stylesheet or in another configuration. Furthermore, the file of any RFT including text for a cause and text for a correction may include one or more text describing a title of the RFT, text describing the complaint, and text describing the vehicle (e.g., the vehicle identifiers).

In a first case, the respective pointer to the at least one of the first additional content and the second additional content includes a first pointer pointing to one of the first additional content and the second additional content. In a second case, the respective pointer to the at least one of the first additional content and the second additional content includes a second pointer pointing to one of the first additional content and the second additional content not pointed to by the first pointer.

Block 254 includes storing, by the at least one processor 202, the first RFT within the computer-readable medium 208. The first RFT may be stored within the RO/RFT database 106, which may located at or within the RFT DPM 15 or separate from the RFT DPM 15. In particular, the first RFT may be stored within the RFT 1912.

Block 255 includes receiving, by the at least one processor 202, a request for a RFT pertaining to the complaint and the vehicle. The request may be generated at the RFT display DPM 17. The request may be transmitted over the communication network 11 by the network transceiver 204 of the RFT display DPM 17. The network transceiver 204 of the RFT DPM 15 may receive the request and provide the received request to one or more of the processor 202 and the CRM 208.

The RFT DPM 15 may search the RO/RFT database 106 based at least in part on the complaint and the vehicle to locate one or more RFT that pertain to the complaint and to the vehicle. As an example, the RFT DPM may locate the first RFT by searching the RO/RFT database 106. In a first case, the first RFT may be the only RFT discovered during the search. In a second case, the first RFT may include one of two or more RFT pertaining to the complaint and the vehicle discovered during the search.

Block 256 includes outputting, by the at least one processor 202 in response to the request, the first file stored within the CRM. As an example, outputting the first file may include the processor 202 providing the first file to the network transceiver 204. As another example, outputting the first file may include the processor 202 causing the network transceiver 204 to transmit the first file to the communication network 11. The communication network 11 may carry the first file to the RFT display DPM 17 for displaying on the display 214 of the RFT display DPM.

Outputting the first file may include outputting a network communication that includes the first file of the first RFT, a destination address of the RFT display DPM 17, and a source address of the RFT DPM 15. Outputting the first file may include outputting other items of the first RFT besides the first file, such as the metadata regarding the first RFT or the first file.

Additional functions can be performed in conjunction with one of more functions of the set 250. For example, the additional functions may include receiving, by the at least one processor 202 after outputting the first file, a selection of the first pointer (e.g., the pointer 41). Another function is obtaining, by the at least one processor 202 in response to receiving the selection of the first pointer, the one of the first additional content and the second additional content pointed to by the first pointer (e.g., the additional content shown in the ACV 61). The processor 202 may request that additional content from the content database 13. Thereafter, the at least one processor 202 may output the one of the first additional content and the second additional content pointed to by the first pointer. As an example, that additional content output by the RFT DPM 15 may be displayed on the display 214 (or the display 33 as shown in FIG. 2).

As another example, the additional functions may include receiving, by the at least one processor 202 after outputting the first file, a selection of the second pointer (e.g., the pointer 43). Another function is obtaining, by the at least one processor 202 in response to receiving the selection of the second pointer, the one of the first additional content and the second additional content pointed to by the second pointer but not by the first pointer (e.g., the additional content shown in the ACV 71). The processor 202 may request that additional content from the content database 13. Thereafter, the at least one processor 202 may output the one of the first additional content and the second additional content pointed to by the second pointer but not by the first pointer.

B. RFT Output

Figure 26:
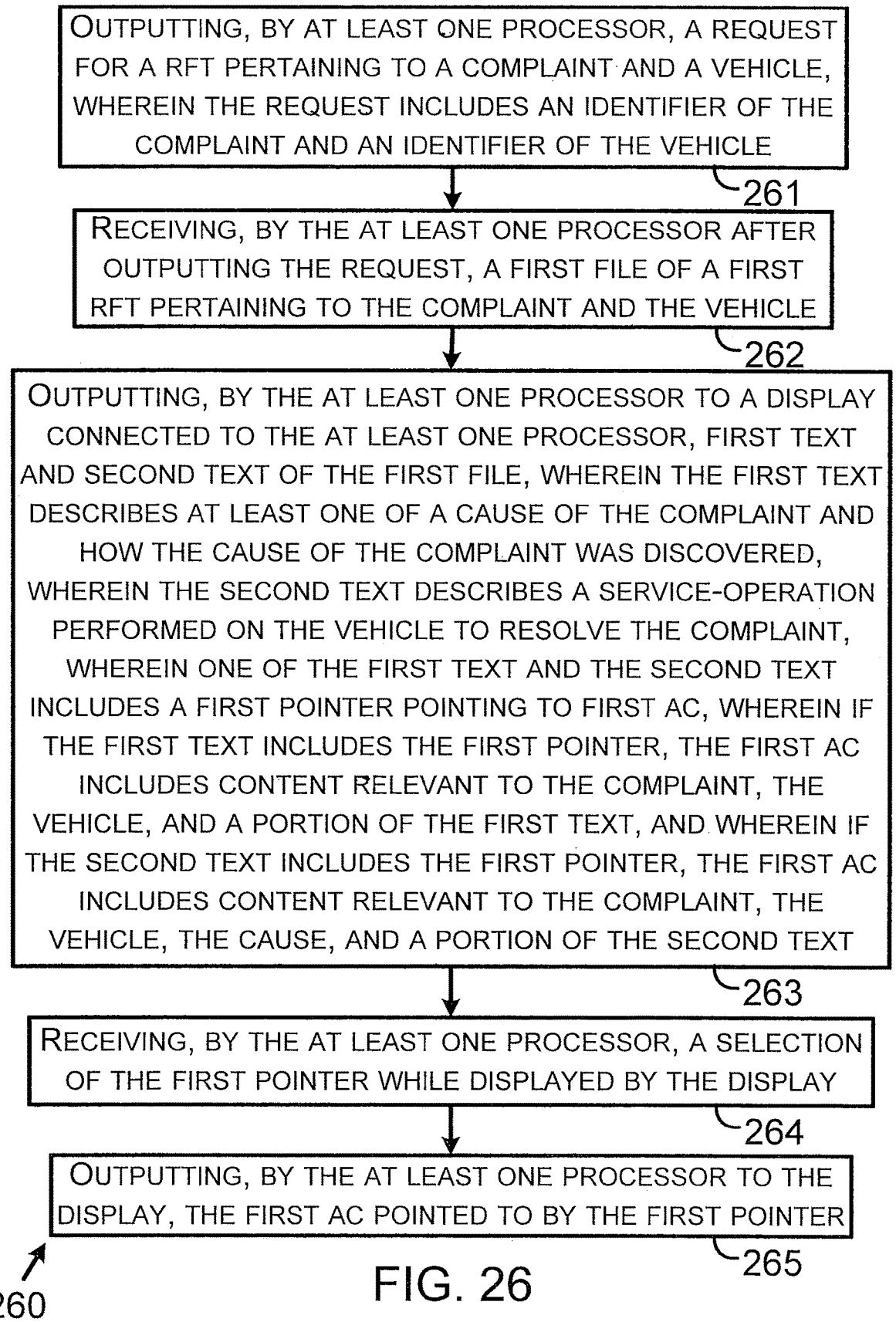

FIG. 26 shows a flowchart depicting a set of functions 260 (or more simply "the set 260") that may be carried out in accordance with the example embodiments described in this description. The set 260 includes the functions shown in blocks labeled with whole numbers 261 through 265 inclusive. The following description of the set 260 refers to items shown in other figures of this description, but the functions of the set 260 are not limited to being carried out only by those items. A number of methods may be performed using all of the functions shown in the set 260 or any proper subset of the functions shown in the set 260. Any of those methods may be performed with other functions such as one or more of the other functions described in this description. Each or any function of the set 260 that is performed by the processor 202 may include the processor executing the CRPI 212, such as the program instructions within the CRPI suite 300. The CRPI 212 may include program instructions to perform each and any function of the set 260.

Block 261 includes outputting, by at least one processor 202, a request for a real-fix tip pertaining to a complaint and a vehicle, wherein the request includes an identifier of the complaint and an identifier of the vehicle. The processor 202 for the set 260 may be the processor within the RFT display DPM 17. The processor 202 may receive selections of a complaint and vehicle from the user interface 206 while the display 214 of the RFT display DPM 17 is displaying a GUI, such as the GUI 1200. The request may include a destination address of the RFT DPM 15 or another DPM that is configured to search the RO/RFT database 106 for RFT. The request may include a source address of the RFT display DPM 17 so that the destination may provide responses to the RFT display DPM 17.

Block 262 includes receiving, by the at least one processor 202 after outputting the request, a first file of a first real-fix tip pertaining to the complaint and the vehicle. The at least one processor 202 may receive the first file from another component of the RFT display DPM 17, such as the network transceiver 204 or the CRM 208. The network transceiver 204 may receive the first file from the communication network 11 as transmitted by the RFT DPM 17 or another DPM that obtained the first file from the RO/RFT database 16. The at least one processor 202 may receive other parts of an RFT that includes the first file, such as metadata that identifies how to display the first file.

Block 263 includes outputting, by the at least one processor to a display connected to the at least one processor, first text and second text of the first file, wherein the first text describes at least one of a cause of the complaint and how the cause of the complaint was discovered, wherein the second text describes a service-operation performed on the vehicle to resolve the complaint, wherein one of the first text and the second text includes a first pointer (e.g., pointer 41 or pointer 45) pointing to first additional content (e.g., the additional content shown in the ACV 61 or 81), wherein if the first text includes the first pointer, the first additional content includes content relevant to the complaint, the vehicle, and a portion of the first text, and wherein if the second text includes the first pointer, the first additional content includes content relevant to the complaint, the vehicle, the cause, and a portion of the second text.

Block 264 includes receiving, by the at least one processor 202, a selection of the first pointer while displayed by the display 214. The selector 216 may receive or detect the selection and provide the selection to the processor 202.

Block 265 includes outputting, by the at least one processor 202 to the display 214, the first additional content pointed to by the first pointer. Outputting the first additional content may include transmitting the first additional content over the connection mechanism 210 from the processor 202 to the display 214. The display 214 may receive and display the first additional content. Displaying the first additional content may include displaying the first additional content overlaid upon at least a portion of the first text and second text of the first file of the RFT.

Additional functions can be performed in conjunction with one of more functions of the set 260. The additional functions may be performed for a case in which the first additional content displayed by the display 214 includes a parameter identifier associated with vehicle data the at least one processor 202 may request. As an example, the additional functions may include receiving, by the at least one processor 202, an input selecting the vehicle data parameter identifier, requesting, by the at least one processor 202, the vehicle data associated with the parameter identifier, receiving, by the at least one processor 202, the vehicle data requested by the at least one processor 202, and outputting to the display a value determined from the vehicle data received by the at least one processor 202. In this example case, the network transceiver 204 may include a transmitter and receiver that are connectable to a vehicle communication link within the vehicle 19. A transmitter of the network transceiver 204 may transmit a request for the vehicle data over the vehicle communication link. A receiver of the network transceiver 204 may receive the vehicle data requested by the at least one processor 202. As an example, the displayed value may represent a signal level detected by a sensor within the vehicle 19 or a status of whether a DTC is active within the vehicle.

As another example, the additional functions may include the processor 202 receiving a selection of a closer viewer box (e.g., closer viewer box 65) or a selection of a portion of the display outside of an ACV and responsively remove the ACV from the display and return to displaying the RFT which includes the pointer selected to display the additional convent viewer. The processor 202 may receive selection of the same or another pointer displayed in the RFT, transmit a request for the additional content pointed to by the pointer, receive the additional content, and display the additional content within an ACV.

As another example, the additional functions may include the processor 202 receiving a selection from within the ACV. The selection from within the ACV may include a selection of a pointer to other additional content not currently displayed. In response to receiving that selection, the processor 202 may transmit a request for the additional content pointed to by the pointer selected from within the ACV, receive the additional content, and display the additional content within a different ACV.

As another example, the selection from within the ACV may include a measurement selection for a first measurement the at least one processor 202 may perform. In response to receiving that selection, the processor may receive an input selecting the measurement selection, perform the first measurement, and output to the display 214 a value determined by performing the first measurement. The display 214 may display the measurement value.

C. RFT Generator DPM Functions

A DPM, such as the RFT generator DPM 108 or the RFT DPM 15, may perform one or more of the following functions pertaining to an RFT. Since the RFT generator DPM 108 and the RFT DPM 15 may be arranged like the DPM 200, elements of the DPM 200 are discussed with regard to the RFT generator DPM 108 or the RFT DPM 15 performing those functions.

The display 214 may display a logon GUI that allows a user to enter data for logging onto the RO/RFT database 106. The RO/RFT database 106 may include account data that may be compared to data entered using the RFT generator DPM 108 to ensure that the user has permission to access the RO/RFT database 106.

The processor 202 may search the additional content database 13 to identify additional content to be pointed to by a pointer within an RFT, select the identified additional content, and add a pointer to the additional content within an RFT, or generated an RFT with the pointer to the additional content. The additional content may remain stored in the additional content database. A copy of the additional content pointed to by a pointer may be stored in the RO/RFT database 106 or in another CRM. As an example, the additional content may include an image of a vehicle component, a schematic diagram of electrical circuitry, or some other image. The display 214 may display the RFT and a user may confirm that the additional content pointed to by the pointer is appropriate additional content for the RFT. The processor 202 may remove a pointer to additional content from an RFT if the additional content is determined to be inappropriate for the RFT or for some other reason.

Figure 19:
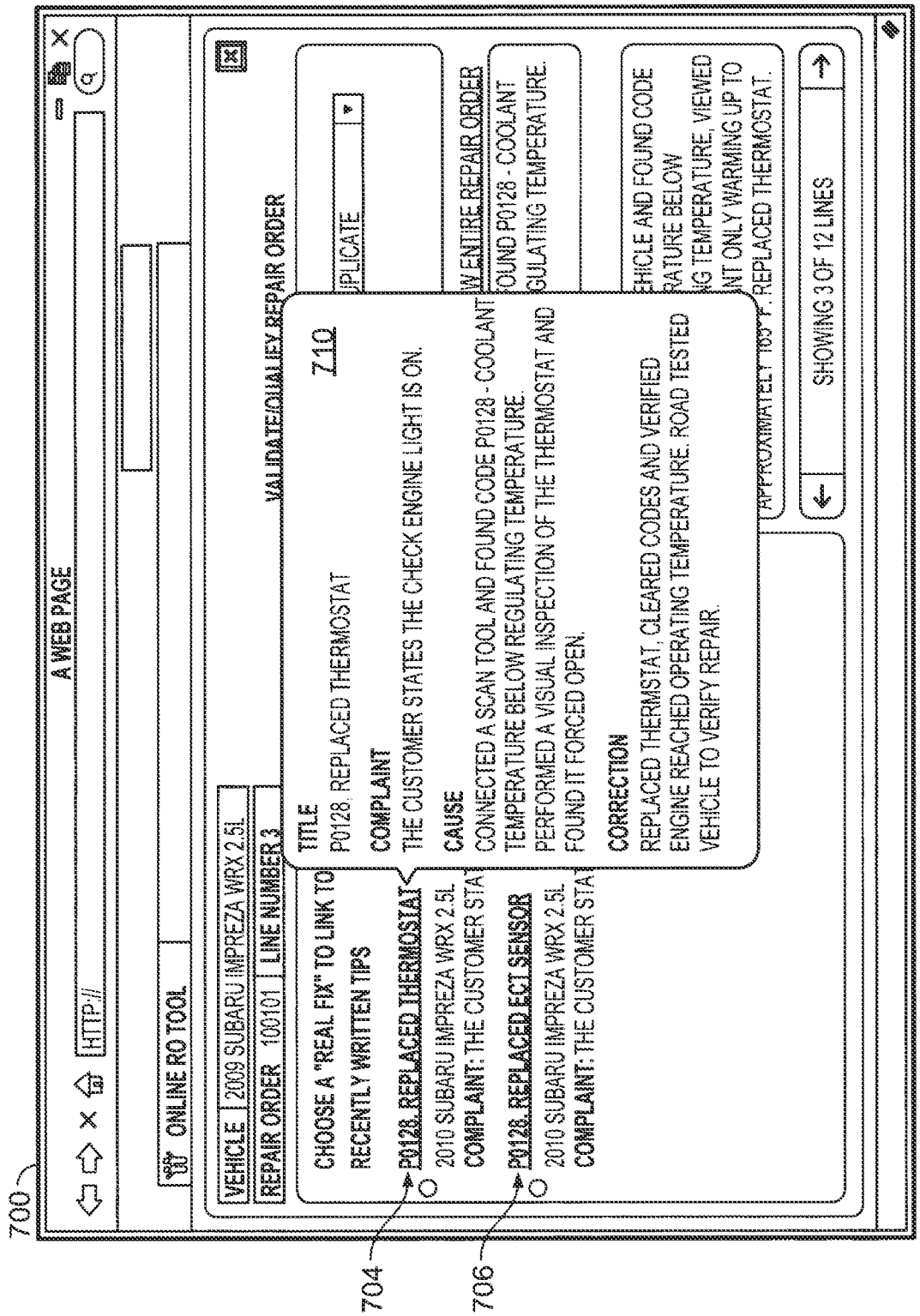

The processor 202 may produce a hover view within a GUI to display an RFT. FIG. 19 shows a hover view 710 for the GUI 700. The selector 216 may control an element pointer, such as a mouse pointer displayed on a GUI, to cause the display 214 to display the hover view. As an example, a pointer (not shown) displayed on the GUI 700 may be moved into close proximity to a title of a selectable RFT 704. When the pointer is within a threshold distance of any portion of the title, a hover view showing the RFT in its entirety may be displayed without closing the GUI 700 or changing to another GUI. When the pointer is moved beyond the threshold distance away from the title while the hover view is displaying the RFT, the hover view may close so that the RFT is no longer presented within a hover view.

D. Coordinator DPM Functions

A DPM, such as the coordinator DPM 110 may perform one or more of the following functions described in this section of the description. Since coordinator DPM 110 may be arranged like DPM 200, elements of DPM 200 are discussed with regard to coordinator DPM 110 performing those functions. The processor 202 executing the CRPI 212 may receive selections or other data input by a user of a DPM and carry out functions in response to receiving the selections or other data. The coordinator DPM 110 may be configured to perform any function that the RFT generator DPM 108 may perform.

The display 214 may display a logon GUI that allows a user to enter data for logging onto the RO/RFT database 106. The RO/RFT database 106 may include account data that may be compared to data entered using the coordinator DPM 110 to ensure that a user of the DPM coordinator DPM 110 has permission to access the RO/RFT database 106.

The coordinator DPM 110 may be used to navigate the RO/RFT database 106 to select RFT awaiting publication. That navigation may occur using the GUI 500.

The coordinator DPM 110 may display a list of RFT on the display 214, and receive a selection of an RFT being displayed. As an example, the coordinator DPM 110 may display the list of RFT using the GUI 600 or another GUI. The list may include a title of the RFT and a time stamp that indicates, a date and time that the RFT was submitted for publication or approved for publication. The RFTs in the list may be sorted by a vehicle name (most recent year first), then by symptom, and then by RFT tile. Other examples of criteria for sorting RFTs are also possible. As another example, the coordinator may enter the RFT selection using an input device, such as a mouse or touch screen, of the coordinator DPM 110. Selecting a displayed RFT may via the GUI 600 or another GUI.

The coordinator DPM 110 may receive a selection of an RFT from the GUI 600 or another GUI. The coordinator may enter that selection using the selector 216.

The coordinator DPM 110 may display the RFT, selected via the coordinator DPM 110, and text of an RO. The coordinator DPM 110 may present the QC GUI 900 to return an RFT to a user and to publish an RFT for presentation at the RFT display DPM 17. The QC GUI 900 may include a prompt to add notes and to receive notes entered by at the user interface 206 The QC GUI 900 may include a prompt to confirm submission of entered notes and a request to return the RFT to the fix-generator for editing. The QC GUI 900 may receive a selection to confirm submission of the entered notes and request to return the RFT. The QC GUI 900 may also receive a selection to cancel entering the notes or returning the RFT. The coordinator DPM 110 may further be arranged to present a GUI, such as the QC GUI 900, to create or edit an RFT.

VI. RO Pre-Mapping

One or more of the example embodiments described herein may include elements or functions pertaining to pre-mapping of RO. Pre-mapping an RO may include a processor executing RO mapping CRPI 320 to compare text or symbols of a computer-readable RO stored in the RO/RFT database 106 to mapping terms, standard terms, context terms, or data record fields and to generate a searchable database record associated with the RO. Pre-mapping an RO may include generating a mapped RO that includes standard terms or phrases in place of non-standard terms or phrases that are part of the un-mapped RO. After pre-mapping RO, data records generated during the pre-mapping may be searched to locate RO within the RO/RFT database 106 instead of searching the RO themselves.

FIG. 20 shows an example RO 180. RO 180 may be generated by the RO provider DPM 102 and provided to the RO collector DPM 104 as a non-computer-readable RO (e.g., a paper RO) or as a computer-readable RO storable in a CRM, such as the CRM of the RO/RFT database 106. The computer-readable RO may be arranged as a structured query language (SQL) file. Alternatively, the computer-readable RO may be arranged as an extensible markup language (XML) file. An original computer-readable RO provided by the RO provider DPM 102 is an un-mapped RO. Similarly, an original computer-readable RO generated by the RO collector DPM 104 prior to any pre-mapping of that RO is also an un-mapped RO.

The RO 180 includes a service provider identifier 181, a date of service identifier 182, a customer indicator 183 that indicates a customer seeking service of a given vehicle, vehicle information 184 that indicates the given vehicle, a service request 185 indicating the complaint or service requested by the customer, parts information 186 indicating parts obtained for servicing the given vehicle, and service-operation information 187, 188, and 189 carried out on the given vehicle.

The service provider identifier 181 may include information that indicates a name and geographic location of the service provider. The vehicle information 184 may include a vehicle identification number (VIN) associated with the given vehicle and a description of the given vehicle. The service-operation information 187, 188, and 189 may include information within distinct sections 190, 191, and 192, respectively, of the RO 180. The service-operation information within any one distinct section 190, 191, and 192 may be unrelated to the service-operation information with any other distinct section. Alternatively, two or more distinct sections including service-operation information may pertain to related service operations performed on the given vehicle.

Some RO stored within the RO/RFT database 106 may be arranged in a configuration that differs from the RO 180. Nevertheless, the RO arranged in another configuration typically includes at least one of the types of information described above as being a part of the RO 180.

The RO stored within the RO/RFT database 106 may include searchable text or symbols (e.g., text, symbols, or text and symbols). As an example, a symbol on an RO may include an empty check box or a checkbox and a checkmark inside the checkbox.

Multiple portions of text on a RO may be grouped as phrases. When comparing contents of an RO to various terms, such as mapping terms, standard terms, or context terms, words within a given proximity to one or more other words may be grouped as a phrase to be compared to the mapping, standard, or context terms. The given proximity may be within X words, where X equals 1, 2, 3, 4, 5, or some other number of words. As an example, service-operation information 187 states "Check starter/ignition system." The words "Check" and "ignition system" are within 3 words of one another. In accordance with an embodiment in which the given proximity is greater than 1 word, the words "Check" and "ignition system" may be grouped as the phrase "Check ignition system" for comparison to mapping, standard, or context terms.

The RO 180 includes labor operation codes (LOC). The labor operation codes may conform to those defined by a vehicle manufacturer, a service provider that generates an RO, a service information provider, such as Mitchell Repair Information, LLC, Poway, Calif., or some other entity. For simplicity of FIG. 20, the labor operation codes are shown within parenthesis, such as (C45) and (C117). Each LOC may refer to a particular operation performed to the given vehicle. A DPM within the system 100 may use a LOC to determine what type of operation was performed to the given vehicle if other information regarding that operation is incomplete or described using non-standard phrases or terms. A DPM may also use LOC to determine context for a service line of the RO.

Figure 21:
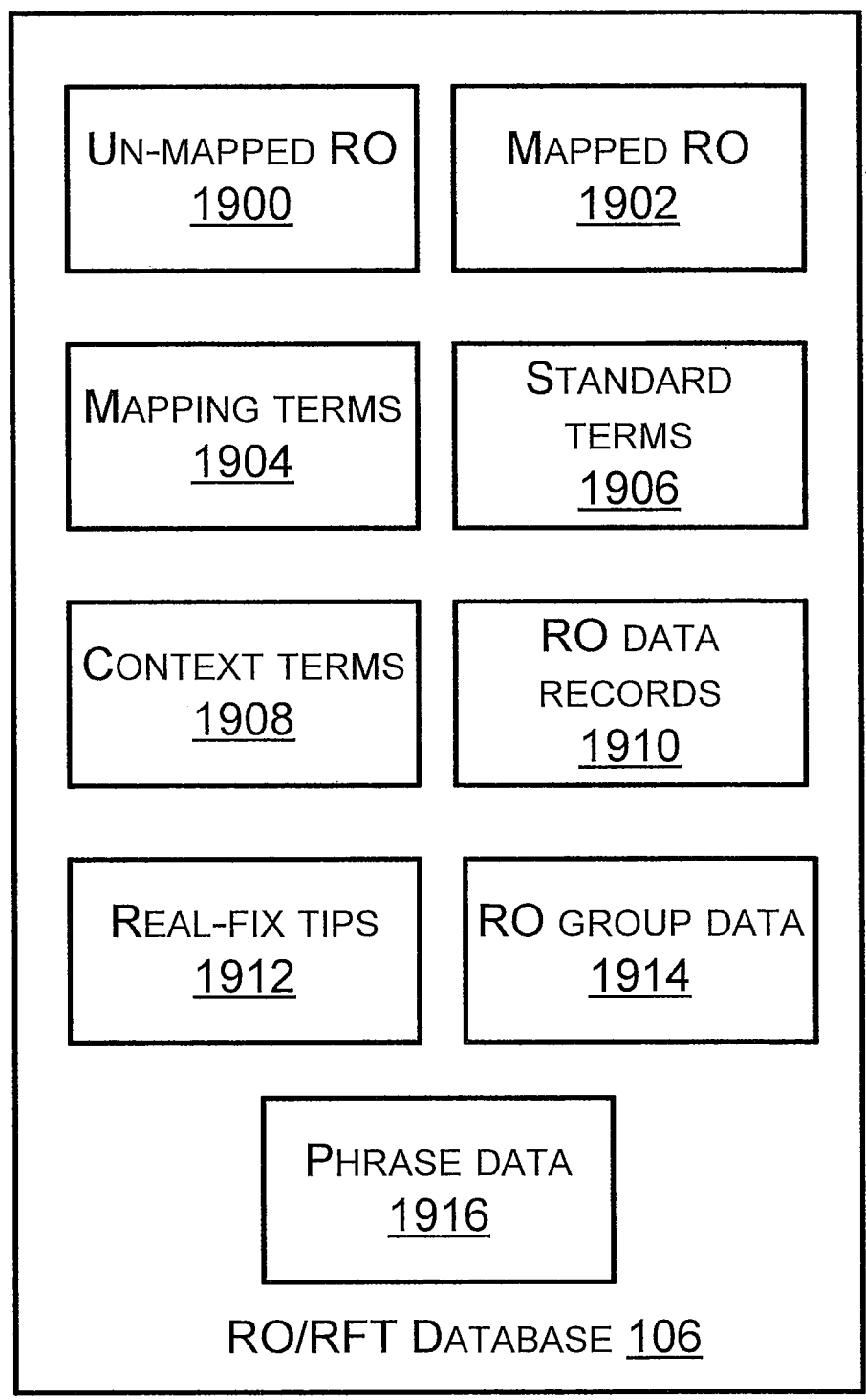
FIG. 21 is a block diagram of a database in accordance with the example embodiments.

FIG. 21 shows additional details of the RO/RFT database 106 in accordance with one or more example embodiments. As shown in FIG. 21, the RO/RFT database 106 includes un-mapped RO 1900, mapped RO 1902, mapping terms 1904, standard terms 1906, context terms 1908, RO data records 1910, RFT 1912, RO group data 1914, and phrase data 1916. In alternative arrangements, the mapping terms 1904, the standard terms 1906, the context terms 1908, the RO data records 1910, the RFT 1912, the RO group data 1914, or the phrase data 1916 may be stored within a CRM other than the CRM storing another portion of the RO/RFT database 106. The RFT 1912 may include unpublished RFT and published RFT.

The un-mapped RO 1900 may include original computer-readable RO received from the RO provider DPM 102 or original computer-readable RO generated from a non-computer-readable RO received from the RO provider DPM 102. In accordance with one or more of the example embodiments, the RO provided to the RO display DPM 114, the RFT generator DPM 108 or the coordinator DPM 110 may be limited to RO from the un-mapped RO 1900. In accordance with one or more other example embodiments, the RO provided to the RO display DPM 114, the RFT generator DPM 108 or the coordinator DPM 110 may be limited to RO from the mapped RO 1902. In accordance with yet one or more other example embodiments, the RO provided to the RO display DPM 114, the RFT generator DPM 108 or the coordinator DPM 110 may be RO from the un-mapped RO 1900 and RO from the mapped RO 1902. A DPM shown in FIG. 5, or another DPM, may execute CRPI to pre-map un-mapped RO within the un-mapped RO 1900 into mapped RO for storage as part of the mapped RO 1902.

The mapped RO 1902 includes RO generated from an un-mapped RO. A mapped RO may be arranged like an un-mapped RO, although any non-standard terms identified on the un-mapped RO are replaced with standard terms from within the standard terms 1906. Furthermore, if the un-mapped RO is incomplete in any respect, such as the un-mapped RO does not include the model year of the vehicle referred to on the RO, a processor may determine data to complete incomplete portions of the un-mapped RO. For example, if the RO 180 did not recite the model year 2012, the processor may determine the model year from the VIN recited on the RO 180.

In response to the RO distributor DPM 112 receiving, from the RO display DPM 114, a request for an RO, the RO distributor DPM 112 may retrieve from the RO/RFT database 106 and provide to the RO display DPM 114 a mapped RO with standard terms from the RO/RFT database 106. Alternatively, the RO distributor DPM 112 may retrieve from the RO/RFT database 106 and provide to the RO display DPM 114 an un-mapped RO from the RO/RFT database 106. The RO display DPM 114 may offer to a user a selection of whether to receive a mapped RO or an un-mapped RO.

The mapping terms 1904 may include terms that may be entered into a data record field. The mapping terms 1904 may include data that identifies which data record each mapping term may be entered. Additionally or alternatively, the arrangement of the mapping terms 1904 may define which data record each mapping term may be entered.

As an example, the mapping terms 1904 may include terms that may be entered into a model year field of a data record (e.g., Field C of FIG. 22). The model year terms may be a predefined set of years, such as the years 1980 through 2013. As each new model year of vehicles is introduced, the predefined set of model years may be modified to include the new model year. Similarly, the predefined set of model years may be modified to include model years earlier than the earliest model year currently in the set of model years.

As another example, the mapping terms 1904 may include terms that may be entered into a location field of a data record (e.g., Field M of FIG. 22). The location terms may be a predefined set of locations, such as locations where the RO provider DPM 102 is located. As additional RO provider DPM begin providing RO to the RO collector DPM 104, the predefined set of locations may be modified to include locations of the additional RO provider DPM if those locations are not currently within the set of locations.

A mapping term within a predefined set of mapping terms may be added as a result of that mapping term being on an RO. For example, an un-mapped RO may include data indicating city: Madison, state: Wisconsin, and zip code: 53562. While searching contents of that un-mapped RO, the RO collector DPM 104 may identify the city, state, and zip code data on the RO and determine that the mapping terms 1904 does not include the identified city, state, and zip code data on the RO and modify the mapping terms 1904 to include data, representing the identified city, state, or zip code, that may be entered into the location field of a data record. The RFT generator DPM 108 or the coordinator DPM 110 may be configured to approve modifying the mapping terms 1904 with new mapping terms.

At least some of the mapping terms 1904 may be identical to (e.g., match) filter criteria selectable via a GUI described herein. For example, the mapping terms 1904 may include model year terms for the years between and including 1990 to 2012. As shown in FIG. 8, the model year selectors 1220 on the GUI 1200 include selectors for model years 1990 through 2012. In this way, after selecting model years 1990 through 2012, as shown on FIG. 8, the RO mapped to a model year between 1990 through 2012 may be identified as an RO that matches the selected filter criteria. If no other filter criteria is selected, the RO that matches the selected filter criteria based on model year are the RO on which a response to the search requester is provided. If other filter criteria have been selected, the response to the search requester will be based on the RO data records with data that matches the selected filter criteria.

The standard terms 1906 may include standard terms to use on a mapped RO instead of a non-standard term on an un-mapped RO. Table 2 includes example standard terms (ST) and non-standard terms (NST) associated with the standard terms. As shown in Table 2, a standard term may be (i) a diagnostic trouble code identifier, such as DTC P0117 or DTC P0101, (ii) a labor operation, such as check battery or remove and replace, and (iii) a component name, such as ignition switch, service engine soon light, coolant temperature sensor, and oxygen sensor. The other terms in each row of Table 2 including an ST are NST.

TABLE 2

| ST | NST | NST | NST | NST | NST |
|---|---|---|---|---|---|
| DTC P0117 | Code 117 | Code 0117 | DTC 117 | DTC P117 | P0117 |
| Check battery | Test battery | Measure battery | Measure battery volts | Check battery acid | (C45) |

TABLE 2-continued

| | | | | | |
|---|---|---|---|---|---|
| Remove and Replace | R/R | R & R | R and R | Remove and install | Swap |
| Ignition Switch | Starter Switch | Ign. Sw. | Ign. Switch | Starter Sw. | Start switch |
| Service Engine Soon Light | SES Light | Check Engine Light | Emissions Light | SES Bulb | SES Lamp |
| Coolant Temperature Sensor | ECT sensor | Coolant Sensor | Coolant Temp. Sensor | Radiator Temperature Sensor | Eng. Coolant Temp. Sen. |
| Oxygen Sensor | O2 sensor | O2 senser | 02 sensor | Oxy. sensor | O2 sens. |
| DTC P0101 | Code 101 | Code 0101 | DTC 101 | DTC P101 | P0101 |
| MAF Sensor | Mass air flow sensor | Air flow sensor | MAF | Vane meter sensor | VAF sensor |

Although Table 2 shows five NST for each ST, the standard terms 1906 may include another number of NST for each ST. The standard terms 1906 do not need to have the same number of NST for each ST. The standard terms 1906 may include ST and NST for other information on an RO, such as customer complaints, vehicle make information, vehicle model information, or other information on the RO. A NST may include a misspelled word such as "O2 sensor." A NST may include terms with a typographical error such as "O2 sensor" where "O2 sensor" was the intended term.

The RO provided to the RO display DPM 114 may be original un-mapped RO that include non-standard terms. Additionally or alternatively, the RO provide to the RO display DPM 114 may include mapped RO in which a non-standard term on an RO provided to the RO display DPM 114 was replaced with a standard term. The system 100 may be used configured to allow a given RO display DPM to change a standard term for RO provided to the given RO receiver. Changing the standard term for the given RO receiver allows for use of different terms based on, e.g., geographical location or language.

As an example, users of an RO display DPM 114 in Boston, Mass. may refer to a switch that allows for starting a vehicle as a starter switch, whereas users of an RO display DPM 114 in San Jose, Calif. may refer to that same switch as an ignition switch. As another example, users of an RO display DPM 114 in Detroit, Mich. may want to use English-language standard terms, whereas users of an RO display DPM 114 in San Antonio, Tex. may want to use Spanish-language standard terms, and users in Montreal, Quebec may want to use French-language standard terms. The RO/RFT database 106 may include versions of un-mapped RO or mapped RO and other content, such as standard terms, in multiple languages so that the RO provided to an RO receiver may be in a language desired by users of that RO receiver.

The context terms 1908 may include context terms to associate with an RO line based on contents of that RO line on the original RO. A context term associated with an RO line may be stored within field H of a data record for that RO line. The processor 202 of a DPM may execute CRPI to compare the content of the RO line to context hints within the context terms 1908. If the processor finds a match between the contents of the RO line and a context hint, the processor may associate the context term associated with that context hint as a context term for the RO line. Table 3 includes example context terms and context hints. Other examples of the context terms and context hints are also possible. A context term may also be a context hint for that context term.

TABLE 3

| Context Term | Context Hint | Context Hint | Context Hint | Context Hint |
|---|---|---|---|---|
| Electrical | Open Circuit | Shorted Circuit | Grounded Circuit | Wire |
| Mechanical | Stuck | Rotate | Movement | Turn |
| Hydraulic | Fluid | Leak | Oil pressure | Dripping |

As described above, an RO line may be displayed on the display 214 of a DPM, such as the RFT generator DPM 108. While an RO line associated with a context term is being displayed by the display 214, the display 214 may display a prompt to confirm that the context term associated with the RO line is appropriate for the RO line. The RFT generator DPM 108 may be configured to prevent submitting the RO comprising the RO line associated with the context term until the context term is confirmed to be appropriate. Accordingly, the RFT generator DPM 108 may be arranged to include entering a selection of whether the context term is appropriate or is not appropriate. If a selection of context term is not appropriate is selected, the RFT generator DPM 108 may provide a selector to change or remove the context term associated with the RO line. For example, if the RO line 187 pertains to a mechanical problem with an ignition switch, but the context associated with the RO line 187 is electrical, the RFT generator DPM 108 may change the context term from electrical to mechanical. If, while an RO line is being reviewed at the RFT generator DPM 108, it is determined that no context term is appropriate for the RO line, the RFT generator DPM 108 may un-associate the context term associated with RO line.

The RO data records 1910 may include data for a plurality of data record fields. The data within those fields map an RO or a line for a distinct service-operation identified on an RO. The RO data records 1910 may be searched to identify RO or a line on an RO that matches filter criteria selected using a DPM. Searching the RO data records 1910 to identify RO within the RO/RFT database 106 that match the selected filter criteria may be carried out more quickly than searching the un-mapped RO 1900 or the mapped RO 1902 directly.

The RO group data 1914 may include data for one or more RO groups stored within the RO/RFT database 106. For each RO group, the RO group data 1914 may include identifier of the RO or RO lines numbers belonging to that RO group. For each RO group, the RO group data 1914 may include an identifier of an RFT that is associated with the RO and RO lines numbers of that RO group.

The phrase data 1916 may include complete phrases or incomplete phrases for use in generating real fix tips. The processor 202 may select a phrase from the phrase data 1916, based on RO terms on an RO, and include the selected phrase within an RFT being generated for the RO. The processor 202 may complete incomplete phrases while generating the RFT.

FIG. 22 illustrates example field names 211 and data records 213 and 215 that may be stored within the RO/RFT database 106. The data records 213 and 215 may be stored as part of the RO data records 1910. The field names 211 may be stored within the mapping terms 1904 or within the RO data records 1910. The data records 213 and 215 pertain to the RO 180.

The letters A through N above the field names 211 are provided for reference to individual field contents within a data record. For example, field A of the data record 213 is 100200. One or more fields within a data record may have a null value when no other data is available or when no other data has been written into that field. As an example, fields I and J of the data record 213 are shown as including a null value. A null value within a data field may be changed to a non-null value. For instance, upon an RFT being assigned to the data record 213, field I of the data record 213 may be changed from a null value to an RFT identifier.

Field A is for RO identifiers. Field B is for line numbers assigned to lines of an RO. Field C is for a model year (or more simply, year) of a vehicle referred to on an RO. Field D is for the make (e.g., the manufacturer) of the vehicle referred to on an RO. Field E is for the model name of the vehicle referred to on an RO. Field F is for engine identifiers of an engine within the vehicle referred to on an RO. Field G is for system identifiers of a system within the vehicle referred to on an RO. Field H is for context identifiers. Field I is for RFT identifiers. Field J is for diagnostic trouble code (DTC) identifiers. Field K is for component identifiers. Field L is for service date identifiers. Field M is for location identifiers, such as a location identifier that identifies where the vehicle referenced on the RO was serviced. Although FIG. 22 shows the data within Field M is a city name and state abbreviation for a state within the United States, other data, such as a zip code or GPS location, may be used instead of or in combination with a city and state abbreviation. Field N is for Labor Operation Code (LOC) identifiers.

One or more of the data fields shown in FIG. 22 may not be included within a data record for one or more of the example embodiments. Moreover, a data record in accordance with the example embodiments may include other fields than the fields shown in FIG. 22.

For example, a data record may include a Field O for recording data that identifies a technician that performed service operations described on an RO. The technician identifier may be a pseudonym for the technician. The data for recording within a technician identifier field may be identified while contents of an RO are searched. The RO display DPM 114 may submit a query based at least in part on a particular technician identifier if a person operating the RO display DPM 114 perceives that comments on an RO performed by the particular technician are more reliable or helpful than comments from another technician.

As another example, a data record may include a Field P for recording data that indicates whether or not the RO associated with the data record is a duplicate RO.

As another example, a data record may include a Field Q for recording data that indicates whether the RO has been classified to be within an RO group. Field Q may include data that identifies the RO group(s) to which the RO belongs.

As another example, a data record may include a Field R for recording data that indicates a quantity of characters or words for a line on the RO to which the data record is associated. For a group of RO being considered for writing an RFT, the RO line having the greatest quantity of characters or words may be ranked as being most appropriate for generating the RFT.

As another example, a data record may include a Field S for recording data that indicates a validation selection selected for a line on the RO to which the data record is associated. If no validation selection has been selected for the line, Field S may be a null value. Otherwise, Field S may indicate (i) "Useable" if the usable RO selection 612 was selected for the line, (ii) "Not Usable" if non-usable RO selection 614 was selected for the line, or (iii) "Duplicate" if the duplication RO selection 616 was selected for the line.

As another example, a data record may include a Field T for recording data that indicates whether or not the RO, to which the data record is associated, is published for presentation to RO display DPM 114. The data recorded in Field T may be changed when the status of the RO changes from published to un-published or from un-published to published.

VII. Automatic Phrase Selection

The processor 202 of a DPM, such as the RFT generator DPM 108 or the RFT DPM 15, may execute the CRPI 212 to select phrases for RFT. FIG. 23 is a Table 2300 showing example phrase data. The phrase data 1916 may be arranged like the example phrase data of Table 2300, but the phrase data 1916 is not so limited. For example, the phrase data 1916 does not have to be stored in a table, but may be stored in some other configuration.

Table 2300 includes columns A through E and rows 0 through 8. Row 0 identifies types of data within columns A through E, namely RO terms in columns A, B, and C, phrases in column D, and RFT applicability in column E. RO terms in column A are DTC. RO terms in column B are component names of components within a vehicle. RO terms in column C are customer complaints. The identifier in row 1 of column C is "RO Term N," where N represents an integer. In that regard, more than 3 RO terms may be associated with a single phrase within the phrase data 1916. Furthermore, more than 3 types of RO terms may be included within the phrase data 1916. For example, another type of RO term may be labor operation codes.

As discussed with respect to FIG. 1, an RFT may include the title field 29, the complaint field 35, the cause field 37, and the correction field 39. The RFT applicability data for each row in table 2300 indicates which RFT field the phrase of that row applies (e.g., may be used). For instance, the phrases of rows 1 and 2 of table 2300 may be used (e.g., inserted into) in the title field of an RFT. Although each phrase of table 2300 is applicable to only one RFT field, one or more other phrases (not shown) could be applicable to multiple RFT fields.

The RO terms and RFT applicability of Table 2300 may be used to select a phrase for inserting into an RFT regarding a service-operation on an RO. The processor 202 may execute phrase selection CRPI 322 to identify the RO terms within the service-operation described on the RO and find matching terms within the phrase data 1916 to locate a phrase for populating into a field within an RFT for the RO.

One or more phrases may include a phrase portion that is based on RO terms listed on an RO and a phrase portion that is based on assumptions regarding the RO. The phrase in row 3 may include a phrase portion (e.g., "the car runs rough") that is based on an assumption. That assumption may be based on past experience of system users defining the phrase data 1916 or from other ROs. As an example, when a vehicle has P0300 set to a current state such that a customer would complain the check engine light is on, an assumption may be made that the vehicle (e.g., a car) runs rough. An RFT field may be populated with a phrase having a phrase portion based on an assumption. That RFT may be reviewed during a QC review of the RFT. If desired, the portion of the phrase based on assumption may be modified during the QC review.

Figure 24:
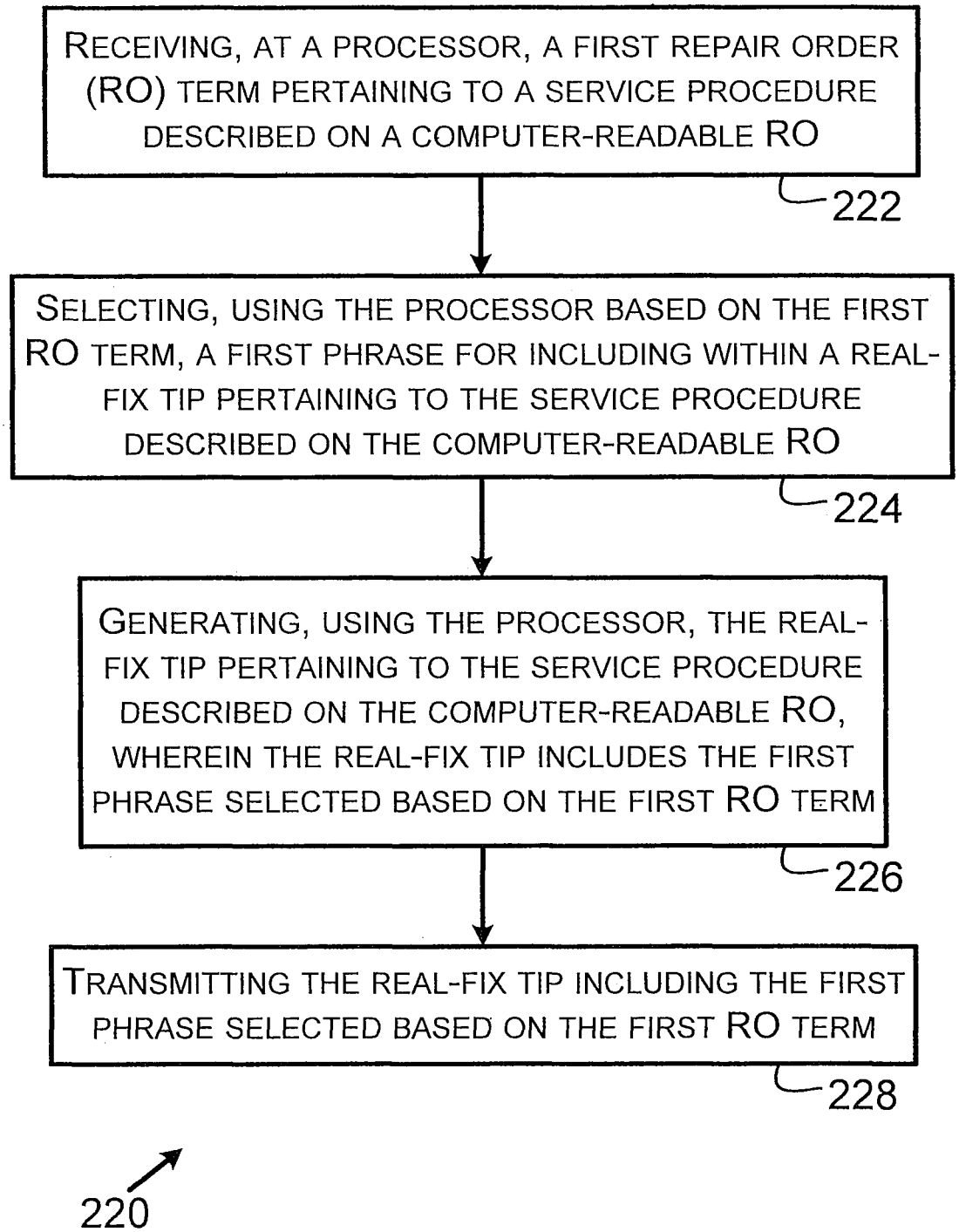

FIG. 24 shows a flowchart depicting a set of functions 220 (or more simply "the set 220") that may be carried out in accordance with the example embodiments described in this description. The set 220 includes the functions shown in blocks labeled with even whole numbers 222 through 228 inclusive. The following description of the set 220 refers to items shown in other figures of this description, but the functions of the set 220 are not limited to being carried out only by those items. A number of methods may be performed using all of the functions shown in the set 220 or any proper subset of the functions shown in the set 220. Any of those methods may be performed with other functions such as one or more of the other functions described in this description. In accordance with one or more of the example embodiments, the processor 202 of the RO collector DPM 104 may execute the CRPI 212 to perform the set 220. In accordance with one or more other example embodiments, a processor of another DPM in combination with the processor of the RO collector DPM 104 may execute the CRPI 212 to perform the set of functions 220. Other examples of one or more DPM that may execute the CRPI 212 to perform the set 220 are also possible.

Block 222 includes receiving, at a processor (e.g., the processor 202), a first repair order (RO) term pertaining to a service procedure (i.e., a service-operation) described on a computer-readable RO. The processor that receives the first RO term may be a processor within a DPM that generates RFT. For example, the processor that receives the first RO may be the processor 202 within the RFT DPM 15, the RO collector DPM 104, the RFT generator DPM 108, the coordinator DPM 110 or the RO distributor DPM 112.

The first RO term may include one or more RO terms pertaining to the service procedure described on the RO. Moreover, the first RO term may include a standard term or a non-standard term. A standard term of the first RO term may be defined within the standard terms 1906. A non-standard term of the first RO term may be associated with a standard term defined within the standard terms 1906 and may be used to select the standard term associated with the non-standard term.

As an example, receiving the first RO term may include the processor 202 receiving the RO term "DTC P0101," a standard term identified in Table 2. As another example, receiving the first RO term may include the processor 202 receiving a non-standard RO term, such as "Code 101," "Code 0101," "DTC 101," "DTC P101," or "P0101," and the processor 202 executing the CRPI 212 to select and receive from the standard terms 1906 a standard term such as "DTC P0101." For purposes of this description, the standard term received at the processor 202 may be referred to as a first RO term and the non-standard term received at the processor 202 may be referred to as a second RO term, although the standard and non-standard terms are no so limited.

Receiving the first RO term may include receiving sufficient RO terms so that the processor 202 may select a phrase pertaining to the service procedure on the RO. As an example, receiving the first RO term may include the processor 202 receiving the RO terms "DTC P0101" and "MAF Sensor" so that the processor 202 may select a phrase for inserting into the title field 29, the complaint field 35, the cause field 37, or the correction field 39 from Table 2300.

Next, block 224 includes selecting, using the processor 202 based on the first RO term, a first phrase for including within an RFT pertaining to the service procedure described on the computer-readable RO. The processor 202 may execute the phrase selection CRPI 322 to select the first phrase (e.g., one or more phrases).

Continuing with the example in which the received RO terms include "DTC P0101" and "MAF Sensor," the processor 202 may be arranged to select (i) the phrase of row 1 or row 2 for inserting into the title field 29 of an RFT, (ii) the phrase of row 4 for inserting into the complaint field 35 of the RFT, (iii) the phrase of row 5 for inserting into the cause field 37 of the RFT, and (iv) the phrase of row 6 for inserting into the correction field 39 of the RFT, as those selected phrases are associated with the RO terms "DTC P0101" and "MAF Sensor."

Next, block 226 includes generating, using the processor 202, the RFT pertaining to the service procedure described on the computer-readable RO, wherein the RFT includes the first phrase selected based on the first RO term. The processor 202 may execute the RFT generation CRPI 308 to generate the RFT. Generating the RFT may include selecting a phrase from the phrase data 1916 for each field of the RFT. Alternatively, generating the RFT may include generating only a portion of the RFT by selecting a phrase from the phrase data 1916 for one or more, but not all, fields of the RFT. The RFT DPM 15, the RFT generator DPM 108, or the coordinator DPM 110 may be used to populate any fields of the RFT that are not populated with a phrase from the phrase data 1916.

In accordance with one or more example embodiments in which an incomplete phrase of the phrase data 1916 is selected for populating a field of the RFT, generating the RFT may include completing the incomplete phrase. For example, if the phrase of Table 2300, row 1, is selected, the RO term in column A, row 1 (that is, DTC P0101), may be inserted into the incomplete phrase to identify a DTC between % DTC % in the incomplete phrase, and the RO term in column B, row 1 (that is, MAF Sensor), may be inserted into the incomplete phrase to identify a component name between % component name % in the incomplete phrase.

Next, block 228 includes transmitting the RFT including the first phrase selected based on the first RO term. The processor 202 may execute the CRPI 212 to cause the network transceiver 204 to transmit the RFT. As an example, transmitting the RFT may include transmitting the RFT from a DPM that generates the RFT to the RO/RFT database 106 for storing within the RFT 1912. As another example, transmitting the RFT may include transmitting the RFT from the RO/RFT database 106 to the RFT DPM 15 or from the RFT DPM 15 to the RFT display DPM 17. As yet another example, transmitting the RFT may include transmitting the RFT from the RO/RFT database 106 to the RFT generator DPM 108 or the coordinator DPM 110.

Various events may trigger transmitting the RFT. As an example, the triggering event may be generating the RFT at block 226. As another example, the triggering event may be the processor 202 of the RFT DPM 15 receiving a selection of the RFT or receiving a selection of the RO for which the RFT was generated. Those selections may come from any of a variety of devices, such as the RFT display DPM 17, the RO display DPM 114, the RO distributor DPM 112, the RFT generator DPM 108 or the coordinator DPM. A device that receives the RFT, such as the RFT display DPM 17 or the RO display DPM 114, may display the RFT transmitted to that DPM on the display 214.

VIII. Conclusion

Example embodiments have been described above. Those skilled in the art will understand that changes and modifications may be made to the described embodiments without departing from the true scope and spirit of the present invention, which is defined by the claims.

We claim:

1. A method comprising:
connecting a first computing device to a data link connector in a vehicle, wherein the first computing device includes one or more processors, a non-transitory computer-readable medium, a display, and a first transceiver that is connectable to the data link connector in the vehicle in order to transmit a message to an electronic control unit (ECU) in the vehicle and a second transceiver configured to communicate with a second computing device;
storing, by the computer-readable medium, instructions executable by the one or more processors to perform multiple scan tool functions that include the first transceiver transmitting a message to the ECU in the vehicle via the data link connector, and a measurement instruction executable by the one or more processors to perform a voltage, current, or resistance measurement;
receiving, by the one or more processors, an identifier of the vehicle and an identifier of a complaint pertaining to the vehicle;
transmitting, to the second computing device, a computer-readable request including the identifier of the vehicle and the identifier of the complaint pertaining to the vehicle;
receiving, by the first computing device in response to the request, a computer-readable real-fix tip file that includes: (i) computer-readable data representing a first pointer, and (ii) computer-readable data representing human-readable text indicative of a complaint, cause and correction pertaining to a different vehicle similar to the vehicle connected to the first computing device, wherein the first pointer points to a first automated function selector that is associated with the stored measurement instruction executable by the one or more processors to perform a voltage, current, or resistance measurement;
displaying, on the display, the real-fix tip file, wherein displaying the real-fix tip file includes displaying on the display the first pointer and the human-readable text;
receiving, by the one or more processors, a selection of the first pointer while the first pointer is displayed on the display;
displaying, on the display in response to the selection of the first pointer, the first automated function selector that is associated with the measurement instruction executable by the one or more processors to perform a voltage, current, or resistance measurement;
receiving, by the one or more processors, a selection of the displayed first automated function selector that is associated with the measurement instruction executable by the one or more processors to perform a voltage, current, or resistance measurement; and
performing, by the one or more processors executing the measurement instruction executable by the one or more processors to perform a voltage, current or resistance measurement in response to the selection of the displayed first automated function selector, a voltage, current or resistance measurement of a circuit to which test leads are connected to the vehicle.

2. The method of claim 1, wherein displaying the first automated function selector includes displaying the first automated function selector overlaid upon at least a portion of the human-readable text displayed on the display.

3. The method of claim 1, further comprising:
displaying, on the display, a value determined by performing the voltage, current or resistance measurement.

4. The method of claim 1,
wherein the computer-readable real-fix tip further includes a second pointer,
wherein the second pointer points to a second automated function selector,
the method further comprising:
displaying, on the display, the second automated function selector in response to a selection of the second pointer;
receiving, by the one or more processors, an input selecting the second automated function selector;
requesting, by the one or more processors from the vehicle in response to receiving the input, data associated with a data parameter identifier;
receiving, by the one or more processors from the vehicle, the data associated with the data parameter identifier; and
displaying, on the display a value determined from the data associated with the data parameter identifier.

5. The method of claim 4, wherein displaying the value includes displaying a status of whether a diagnostic trouble code is active.

6. The method of claim 1, further comprising:
receiving, in response to transmitting the message to the ECU in the vehicle, diagnostic information from the vehicle; and
displaying, by the display, the diagnostic information.

7. The method of claim 1, further comprising:
transmitting, to the ECU in the vehicle, a message having a request for a diagnostic trouble code from the ECU.

8. The method of claim 1, further comprising:
transmitting, to the ECU in the vehicle, a request to clear a diagnostic trouble code at the ECU.

9. The method of claim 1, further comprising:
transmitting, to the ECU in the vehicle, a message to reprogram the ECU.

10. The method of claim 1, wherein the message to the vehicle includes an on-board diagnostic II mode 8 control message.

11. The method of claim 1, wherein the identifier of the complaint pertaining to the vehicle is indicative of a diagnostic trouble code identifier.

12. The method of claim 1, wherein the identifier of the vehicle is indicative of a year, make and model of the vehicle.

13. A first computing device configured to connect to a data link connector in a vehicle, the first computing device comprising:
a display;
one or more processors coupled to the display and configured to receive an identifier of the vehicle and an identifier of a complaint pertaining to the vehicle;
a first transceiver that is connectable to the data link connector in the vehicle in order to transmit a message to an electronic control unit (ECU) in the vehicle;

a second transceiver configured to communicate with a second computing device; and a non-transitory computer-readable medium that stores first executable instructions and second executable instructions and a measurement instruction executable by the one or more processors to perform a voltage, current, or resistance measurement, wherein the first executable instructions when executed by the one or more processors, cause the first computing device to perform multiple scan tool functions that include the first transceiver transmitting a message to the ECU in the vehicle via the data link connector, and wherein the second executable instructions, when executed by the one or more processors, cause the first computing device to perform additional functions comprising:

transmitting, to the second computing device, a computer-readable request including the identifier of the vehicle and the identifier of the complaint pertaining to the vehicle;

receiving, in response to the request, a computer-readable real-fix tip file that includes: (i) computer-readable data representing a first pointer, and (ii) computer-readable data representing human-readable text indicative of a complaint, cause and correction pertaining to a different vehicle similar to the vehicle connected to the first computing device, wherein the first pointer points to a first automated function selector associated with the stored measurement instruction executable by the one or more processors to perform a voltage, current, or resistance measurement;

displaying, on the display, the real-fix tip file, wherein displaying the real-fix tip file includes displaying on the display the first pointer and the human-readable text;

receiving a selection of the first pointer while the first pointer is displayed on the display;

displaying, on the display in response to the selection of the first pointer, the first automated function selector that is associated with the measurement instruction executable by the one or more processors to perform a voltage, current, or resistance measurement;

receiving a selection of the displayed first automated function selector that is associated with the measurement instruction executable by the one or more processors to perform a voltage, current, or resistance measurement; and performing, by the one or more processors executing the measurement instruction executable by the one or more processors to perform a voltage, current or resistance measurement in response to the selection of the displayed first automated function selector, a voltage, current or resistance measurement of a circuit to which test leads are connected to the vehicle.

14. The first computing device of claim 13, wherein displaying the first automated function selector includes displaying the first automated function selector overlaid upon at least a portion of the human-readable text displayed on the display.

15. The first computing device of claim 13,
wherein the one or more processors are programmed to:
receive an input selecting the measurement selection for the first measurement;
perform the first measurement; and
output to the display a value determined by performing the voltage, current or resistance measurement.

16. The first computing device of claim 13,
wherein the computer-readable real-fix tip further includes a second pointer,
wherein the second pointer points to a second automated function selector,
wherein the one or more processors are programmed to:
output, to the display, the second automated function selector in response to a selection of the second pointer;
receive an input selecting the second automated function selector;
request, from the vehicle in response to receiving the input, data associated with a data parameter identifier;
receive the data associated with the data parameter identifier; and
output, to the display, a value determined from the data associated with the data parameter identifier.

17. The first computing device of claim 16, wherein the value determined from the data received by the one or more processors is indicative of whether a diagnostic trouble code is active.

18. The first computing device of claim 13, wherein the additional functions further comprise:
receiving, in response to transmitting the message to the ECU in the vehicle connected to the first computing device, diagnostic information from the vehicle connected to the first computing device; and
displaying, by the display, the diagnostic information.

19. The first computing device of claim 13, wherein the additional functions include transmitting, to the ECU in the vehicle, a message having a request for a diagnostic trouble code from the ECU.

20. The first computing device of claim 13, wherein the additional functions including transmitting, to the ECU in the vehicle, a message that includes a request to clear a diagnostic trouble code at the ECU.

21. The first computing device of claim 13, wherein the additional functions include transmitting, to the ECU in the vehicle, a message to reprogram the ECU.

22. The first computing device of claim 13, wherein the message to the ECU in the vehicle includes an on-board diagnostic II mode 8 control message.

23. The first computing device of claim 13, wherein the identifier of the complaint pertaining to the vehicle is indicative of a diagnostic trouble code identifier.

24. The first computing device of claim 13, wherein the identifier of the vehicle is indicative of a year, make and model of the vehicle.

* * * * *